US011172715B2

(12) United States Patent
Kanamori

(10) Patent No.: US 11,172,715 B2
(45) Date of Patent: Nov. 16, 2021

(54) APPARATUS FOR PRODUCING AND PUTTING ON GLOVES, METHOD OF PRODUCING AND PUTTING ON GLOVES, AND GLOVE

(71) Applicant: Kayama Co., Ltd., Tokyo (JP)

(72) Inventor: Keishiroh Kanamori, Tokyo (JP)

(73) Assignee: KAYAMA CO., LTD, Tokyo (JP)

( * ) Notice: Subject to any disclaimer, the term of this patent is extended or adjusted under 35 U.S.C. 154(b) by 0 days.

(21) Appl. No.: 16/094,747

(22) PCT Filed: Jul. 31, 2017

(86) PCT No.: PCT/JP2017/027669
§ 371 (c)(1),
(2) Date: Oct. 18, 2018

(87) PCT Pub. No.: WO2019/026122
PCT Pub. Date: Feb. 7, 2019

(65) Prior Publication Data
US 2020/0397076 A1  Dec. 24, 2020

(51) Int. Cl.
*A41D 19/04* (2006.01)
*A41D 19/015* (2006.01)
(Continued)

(52) U.S. Cl.
CPC .......... *A41D 19/04* (2013.01); *A41D 19/015* (2013.01); *B29C 65/22* (2013.01); *B29C 65/74* (2013.01); *A41D 19/0006* (2013.01)

(58) Field of Classification Search
CPC .. A41D 19/015; A41D 19/0006; A41D 19/00; A41D 19/04; A41D 19/0055; B29C 65/74; B29C 65/22; B29C 65/7841; B29C 66/71; B29C 66/81431; B29C 66/919; B29C 66/8221; B29C 65/7453;
(Continued)

(56) References Cited

U.S. PATENT DOCUMENTS

2011/0283439 A1* 11/2011 Backhaus .............. A61B 42/40
2/159

FOREIGN PATENT DOCUMENTS

GB 2458133 A * 9/2009 ......... B29C 66/8322
JP 60-259602 A 12/1985
(Continued)

OTHER PUBLICATIONS

Japan Patent Office, ISA, International Search Report for PCT Application No. PCT/JP2017/027669, dated Sep. 19, 2017.
(Continued)

*Primary Examiner* — Vishal I Patel
(74) *Attorney, Agent, or Firm* — Socal IP Law Group LLP; Brian Tamsut

(57) ABSTRACT

The present invention provides an apparatus for producing and putting on gloves capable of producing gloves that fit an individual hand shape and also putting the glove on the hands, and a method for producing and putting on gloves. The apparatus [1] for producing and putting on gloves comprises welding and cutting means which welds and cuts a first elastic film and a second elastic film at a position on the outer side of a contour of a user's hand in a state in which the user's hand is sandwiched between the first elastic film and the second elastic film.

19 Claims, 82 Drawing Sheets

(51) Int. Cl.
  *B29C 65/22* (2006.01)
  *B29C 65/74* (2006.01)
  *A41D 19/00* (2006.01)

(58) Field of Classification Search
  CPC .......... B29C 66/73711; B29C 66/8167; B29C 66/8432; B29C 66/244; B29C 66/81821; B29C 66/8223; B29C 66/225; B29C 66/73715; B29C 66/841; B29C 66/8742; B29C 66/43; B29C 66/9672; B29C 66/229; B29C 61/02; B29C 66/723; B29C 66/221; B29C 65/224; B29C 66/81427; B29C 66/431; B29C 66/8122; B29C 66/83221; B29C 65/7412; B29C 65/223; B29C 66/944; B29C 66/8322; B29C 66/0044; B29C 66/872; B29C 66/8748; B29C 66/1122; B29C 66/91231; B29C 65/7433; B29C 66/91423; B29C 66/949; B29C 66/433; B29C 66/232; B29C 66/8324; B29L 2031/4864; B29K 2023/0633; B29K 2023/12; B29K 2023/083; B29K 2027/06; B29K 2025/06; B29K 2067/003; B29K 2023/06; B29K 2023/00; B29K 2883/00; B29K 2827/12
  See application file for complete search history.

(56) References Cited

FOREIGN PATENT DOCUMENTS

| | | |
|---|---|---|
| JP | 2012-503105 A | 2/2012 |
| JP | 6177490 B1 | 8/2017 |

OTHER PUBLICATIONS

Japan Patent Office, ISA, Written Opinion of the International Searching Authority for PCT Application No. PCT/JP2017/027669, dated Sep. 19, 2017.

* cited by examiner

FIG.15
(a)
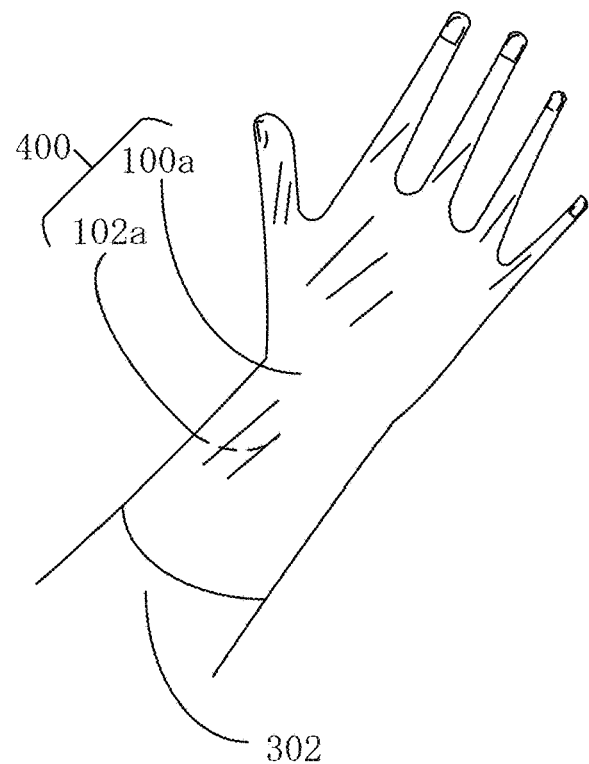
(b)
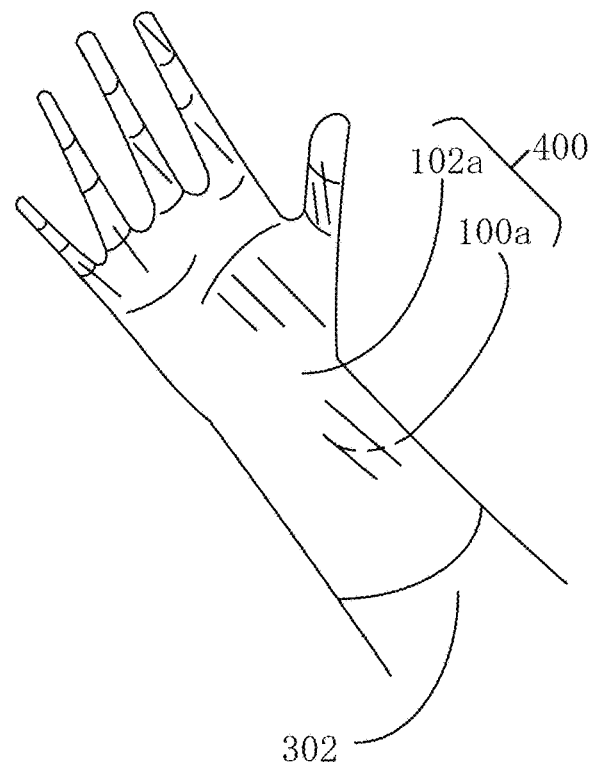

FIG.18
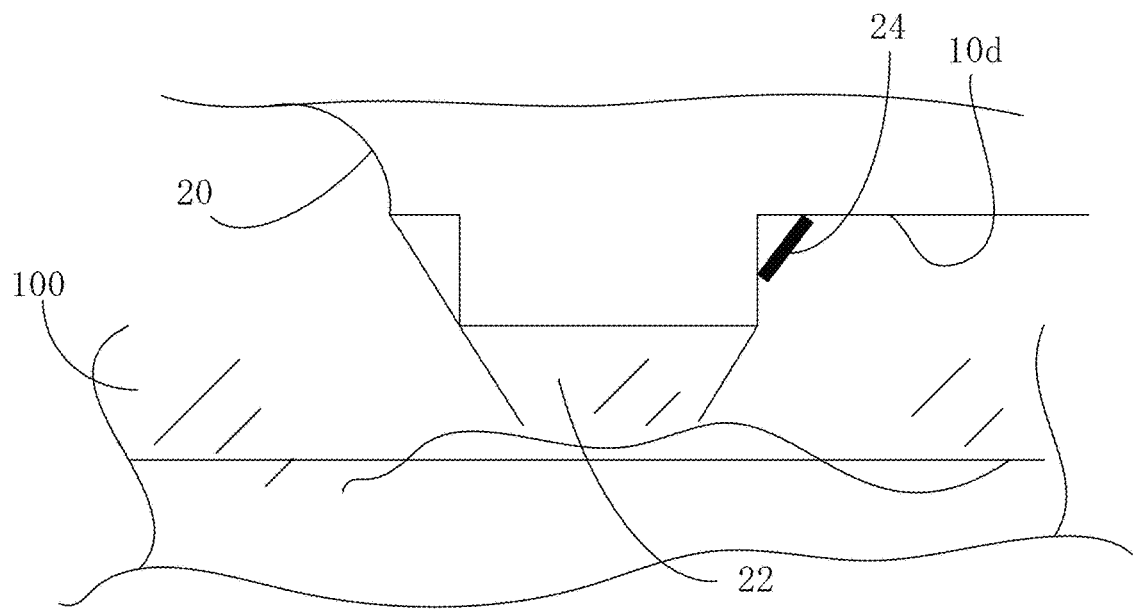
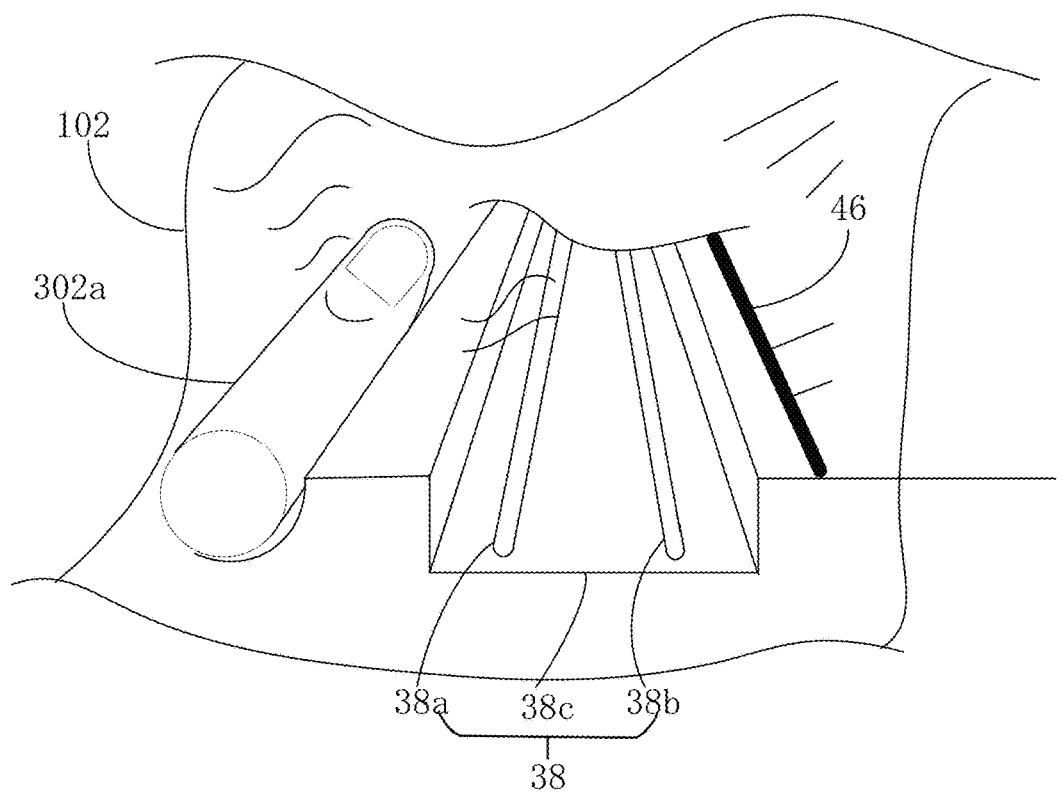

FIG.24
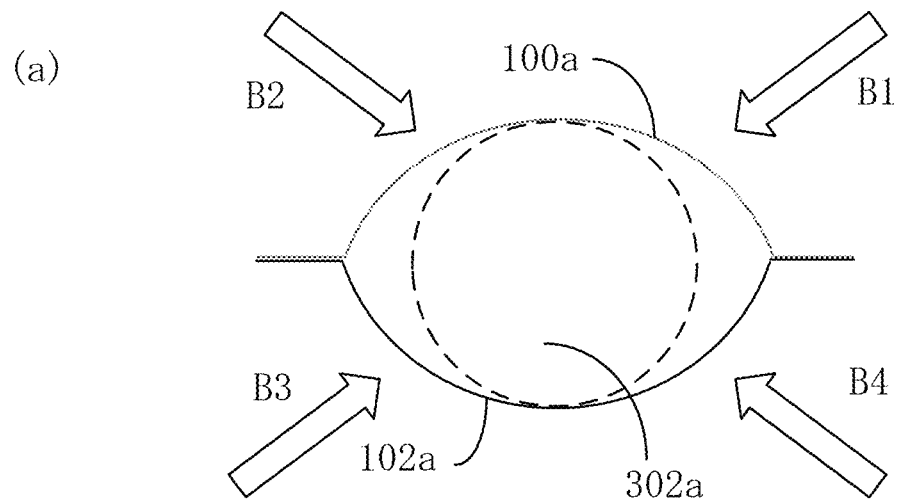
(a)
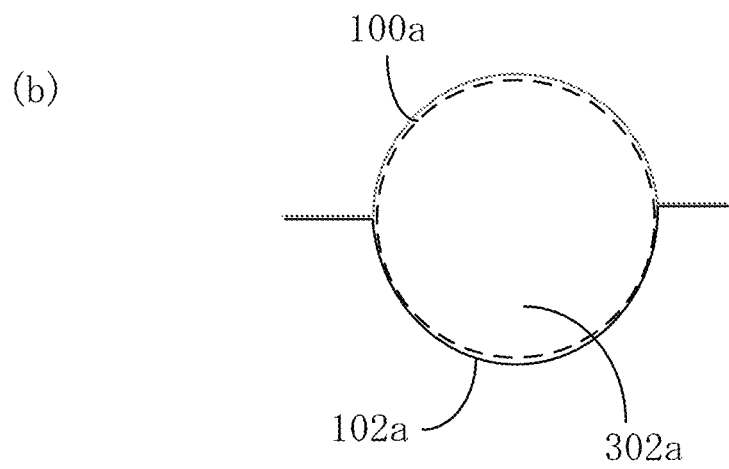
(b)

FIG.27
(a)
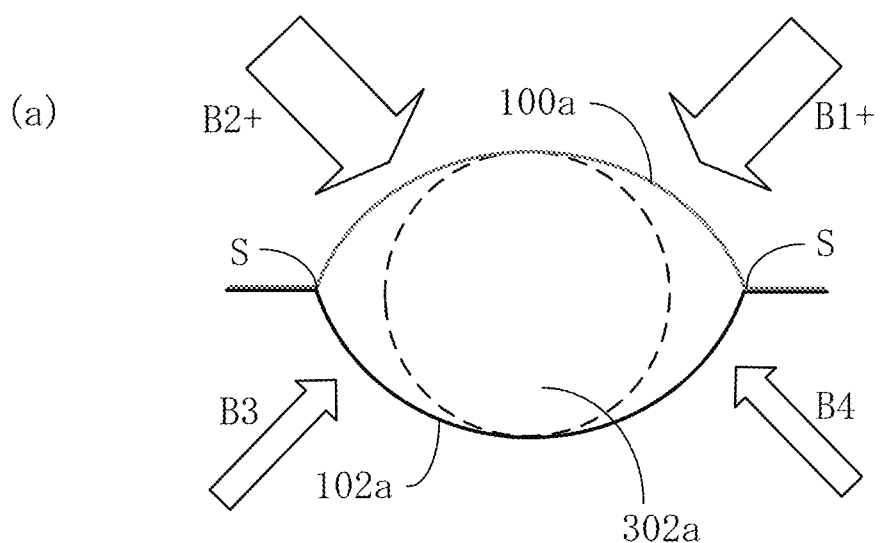
(b)
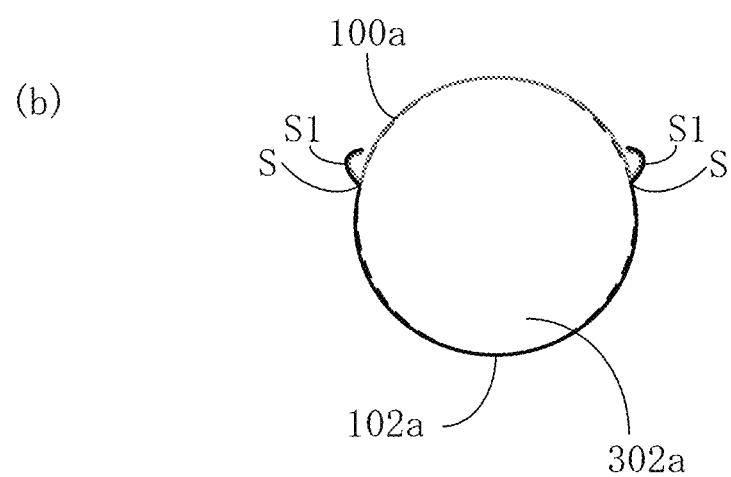

FIG.33
(a)
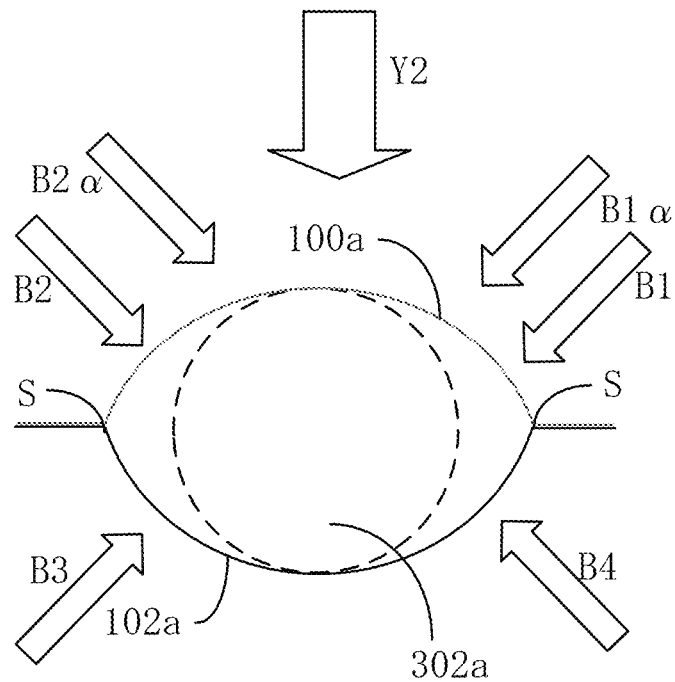
(b)
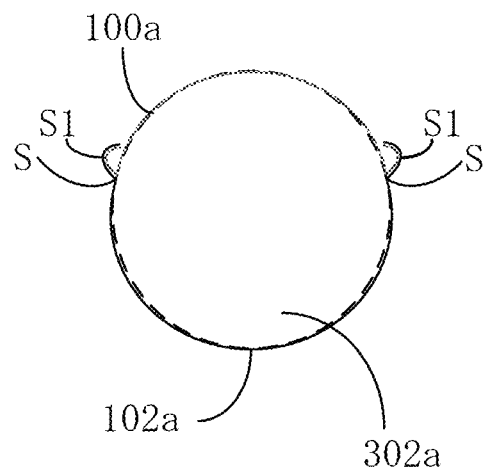

FIG.40
(a)
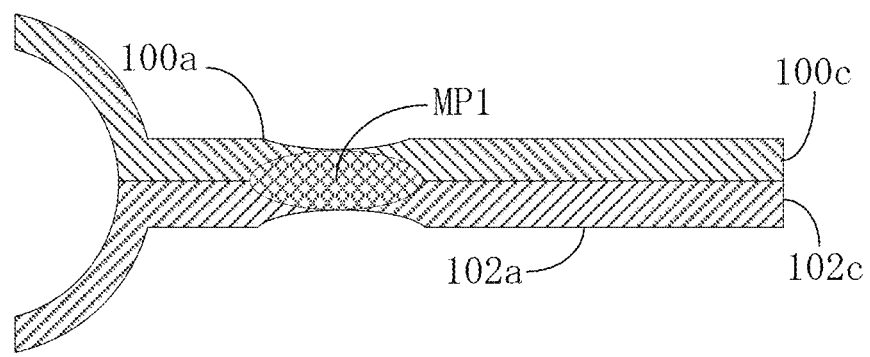
(b)
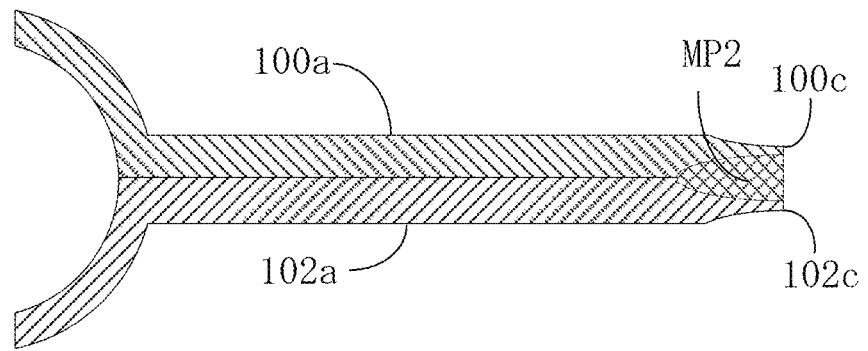

FIG.43
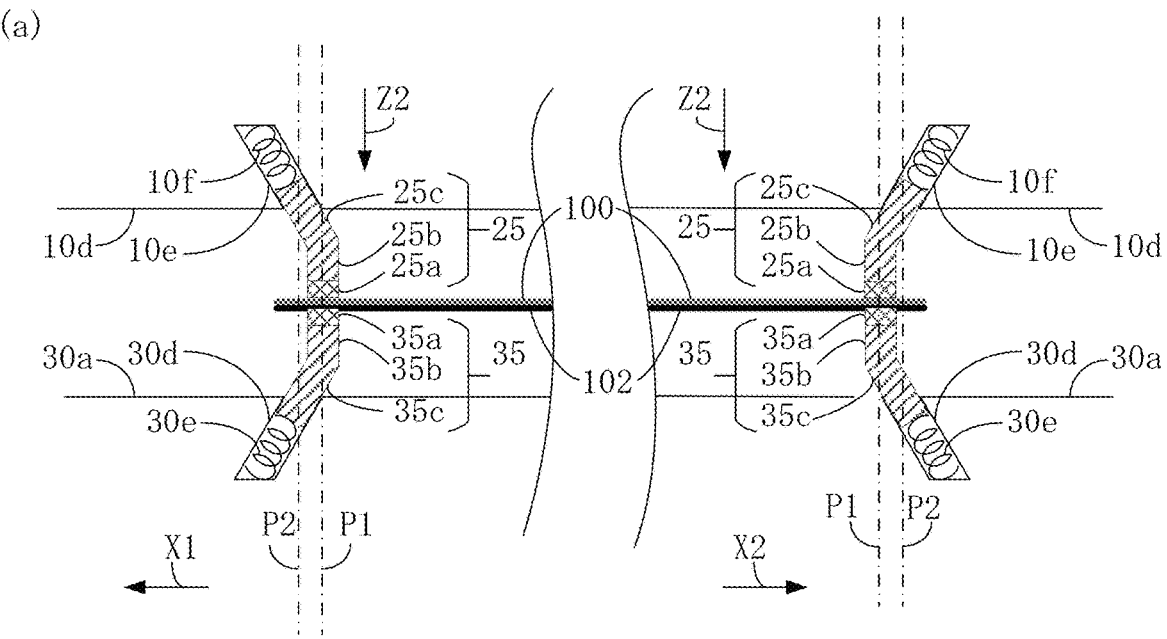
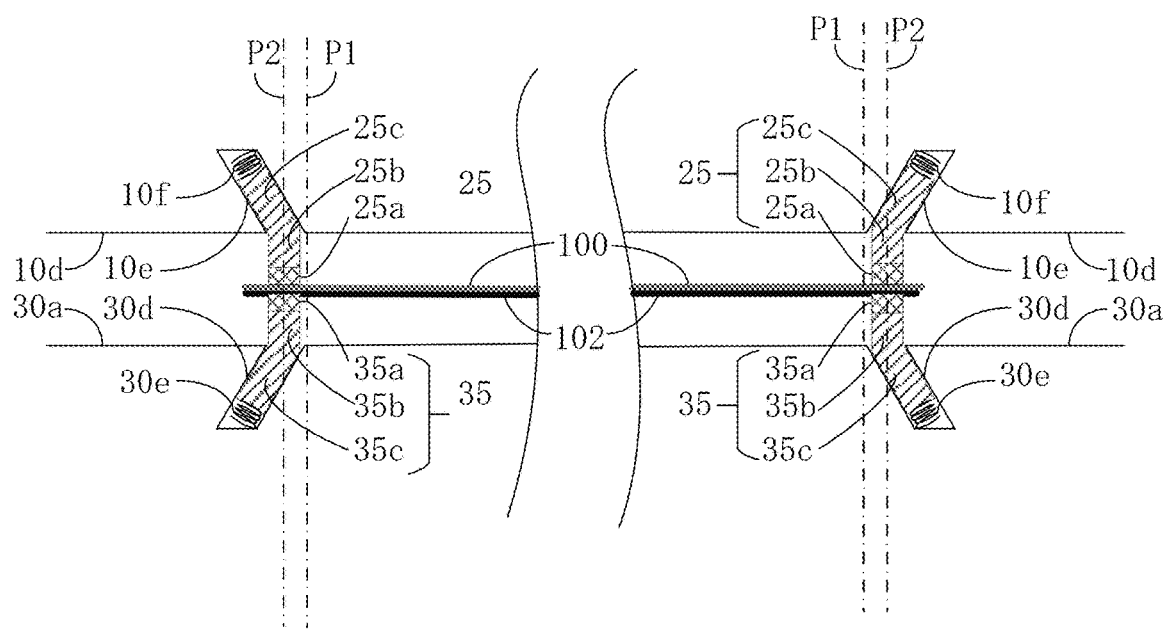

FIG.44
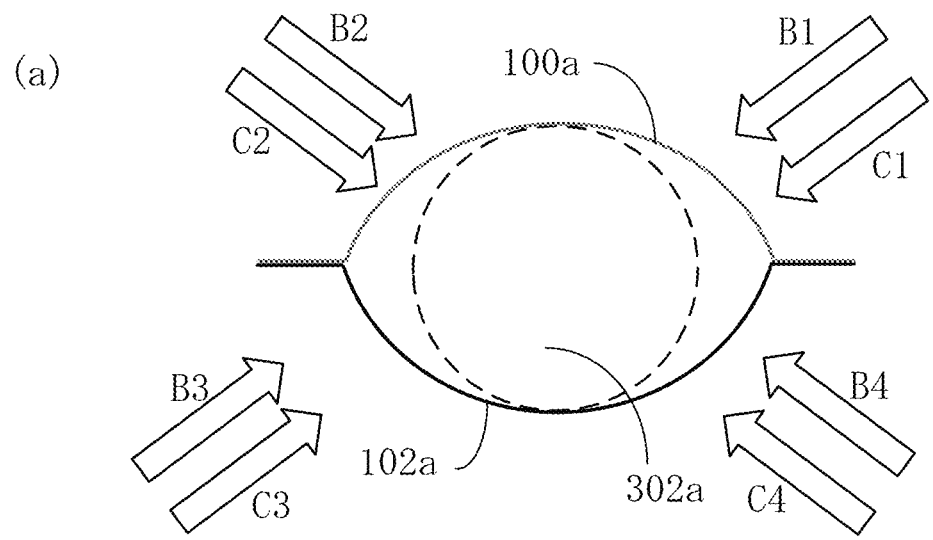
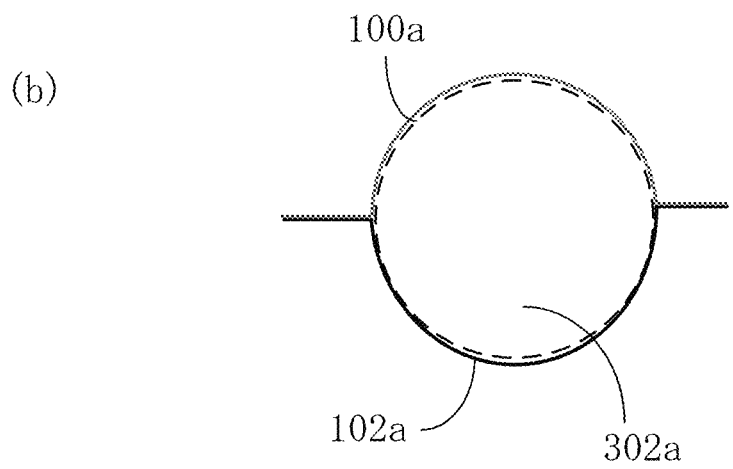

FIG.52
(a)
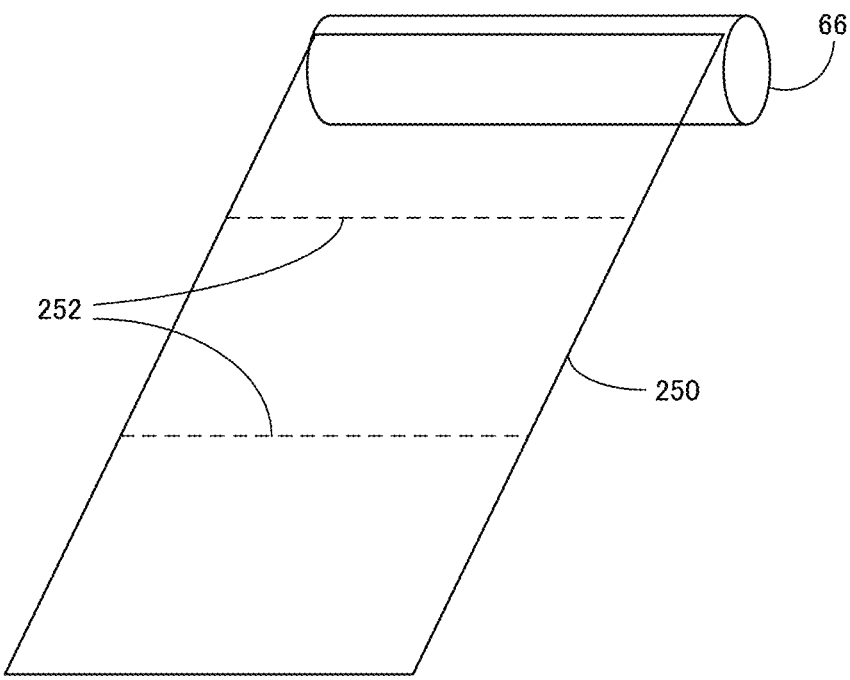
(b)
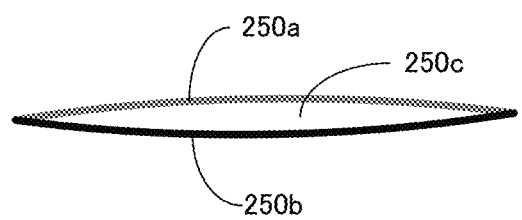

FIG.56
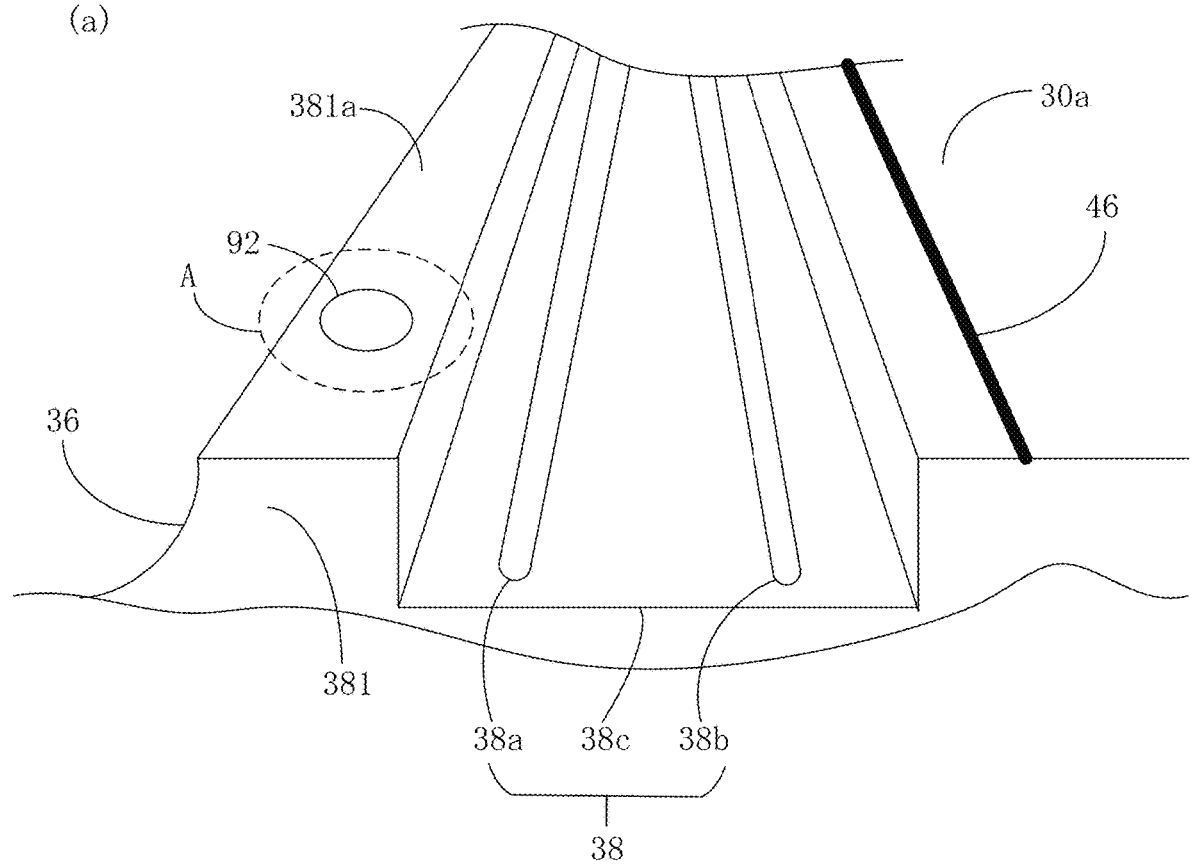
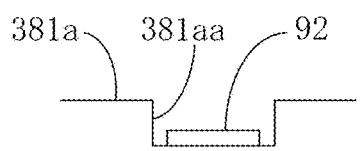

FIG.65
(a)
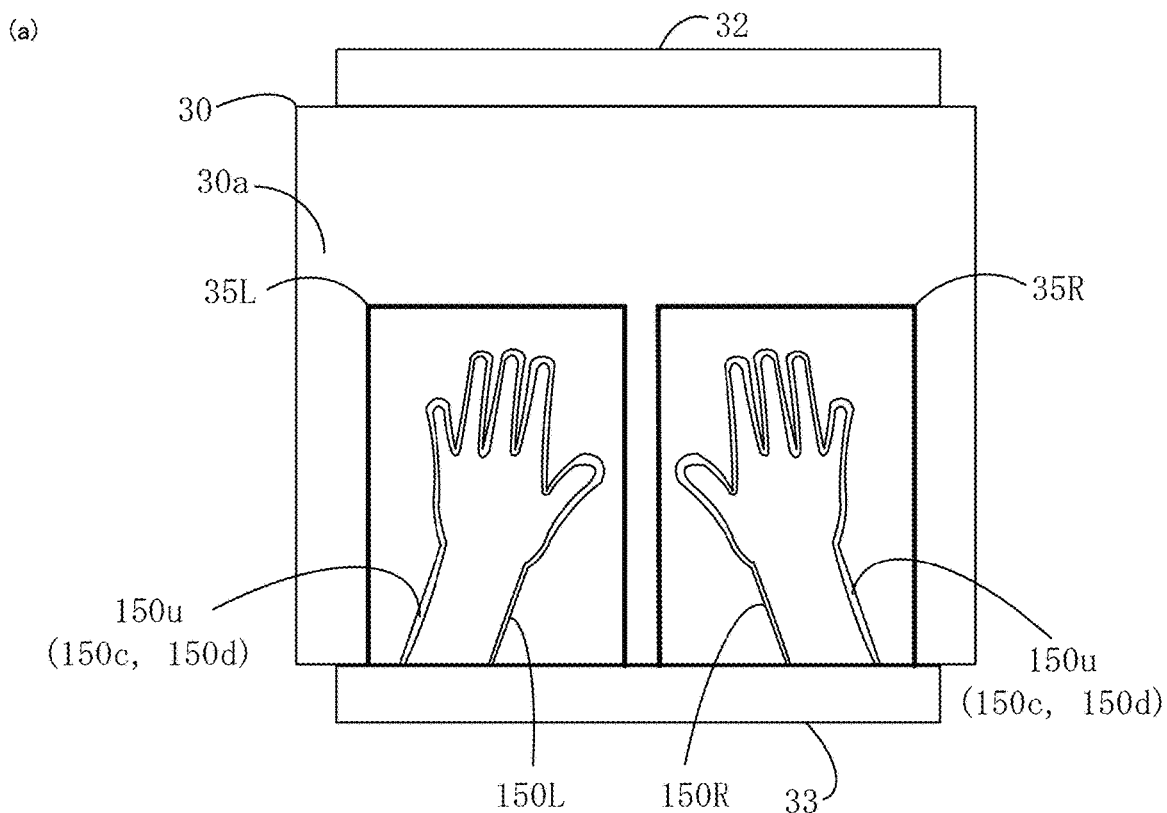
(b)
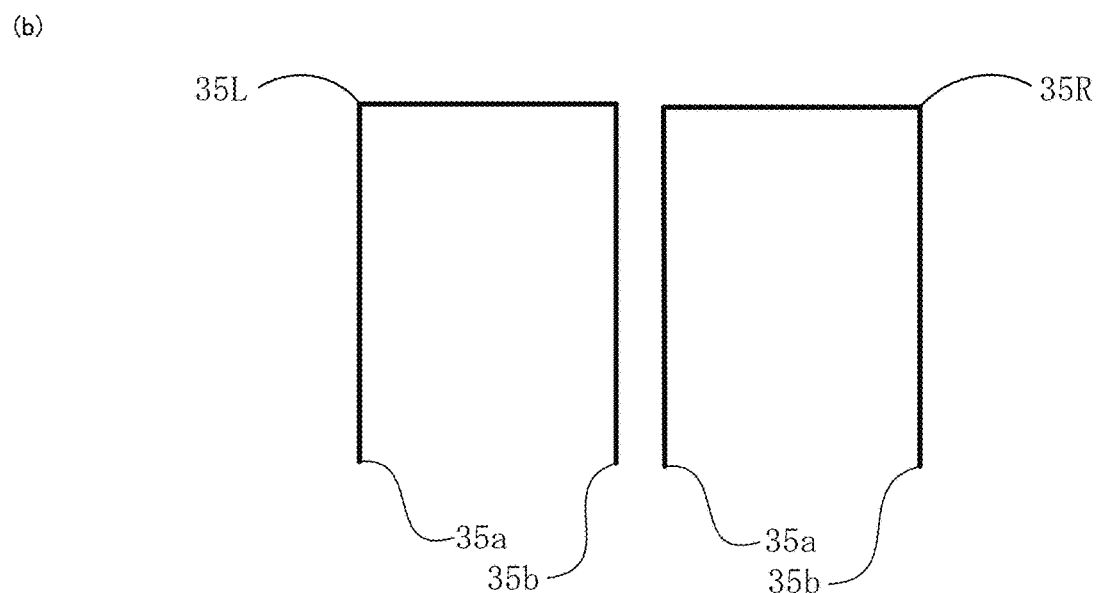

FIG.66
(a)
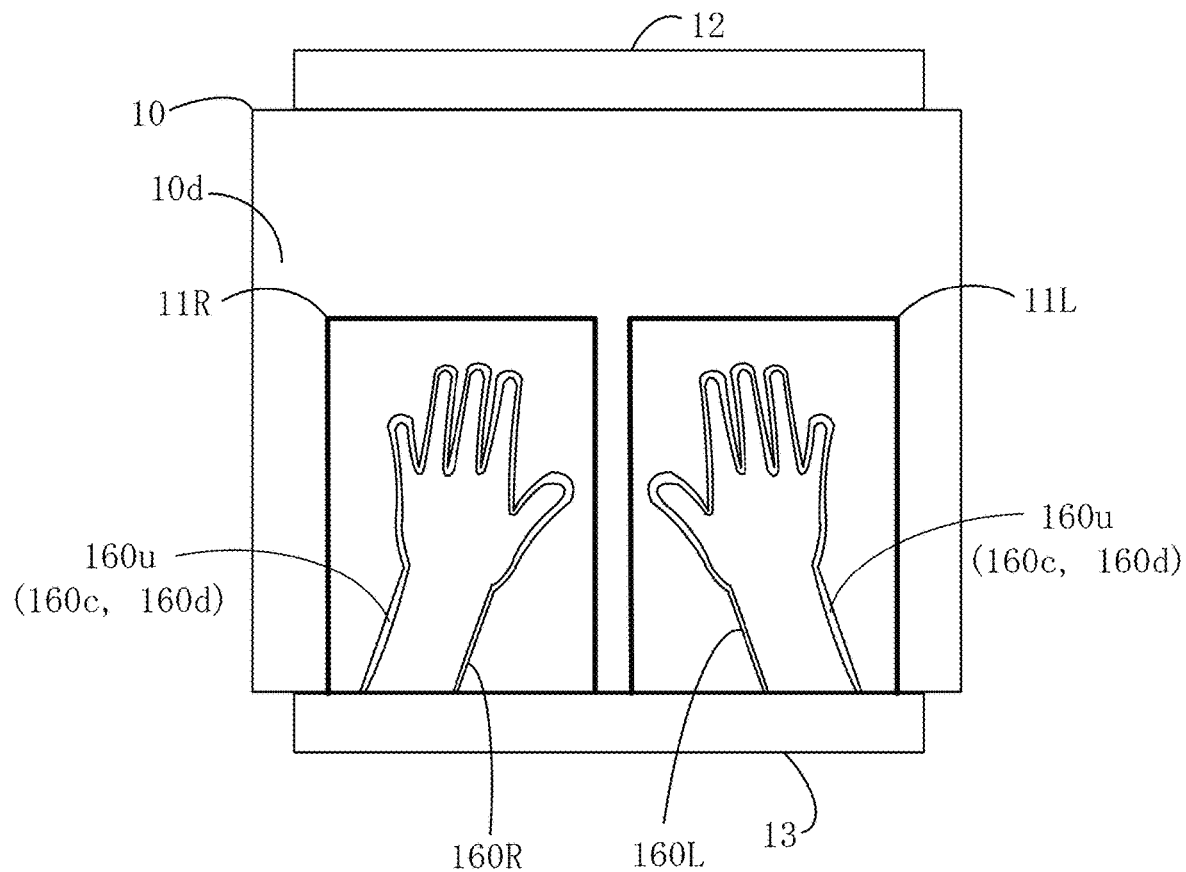
(b)
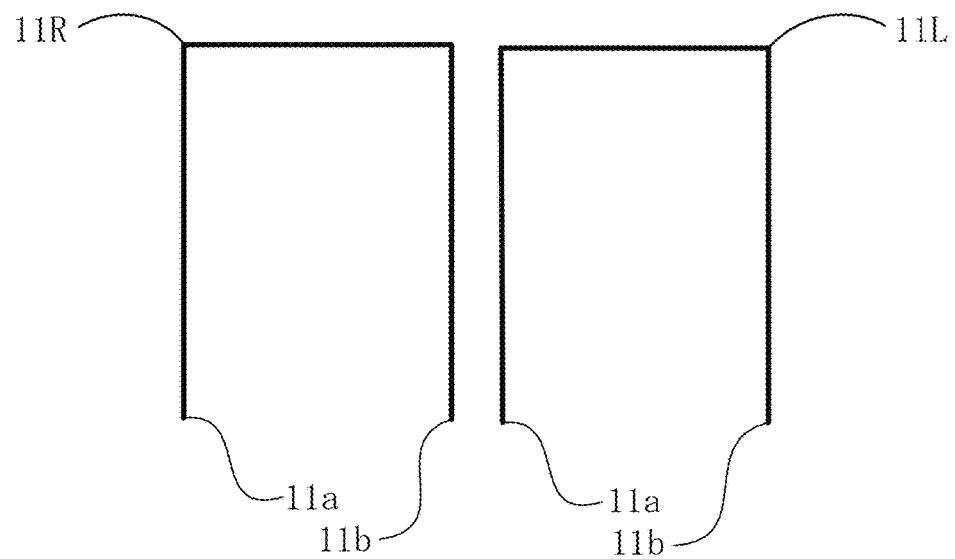

FIG.67
(a)
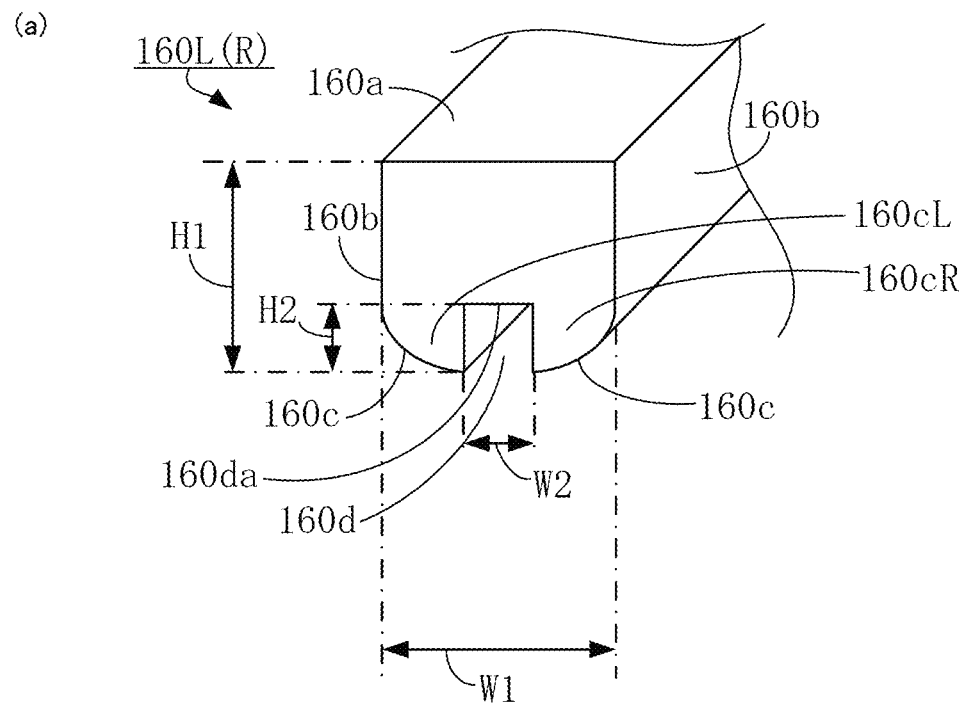
(b)
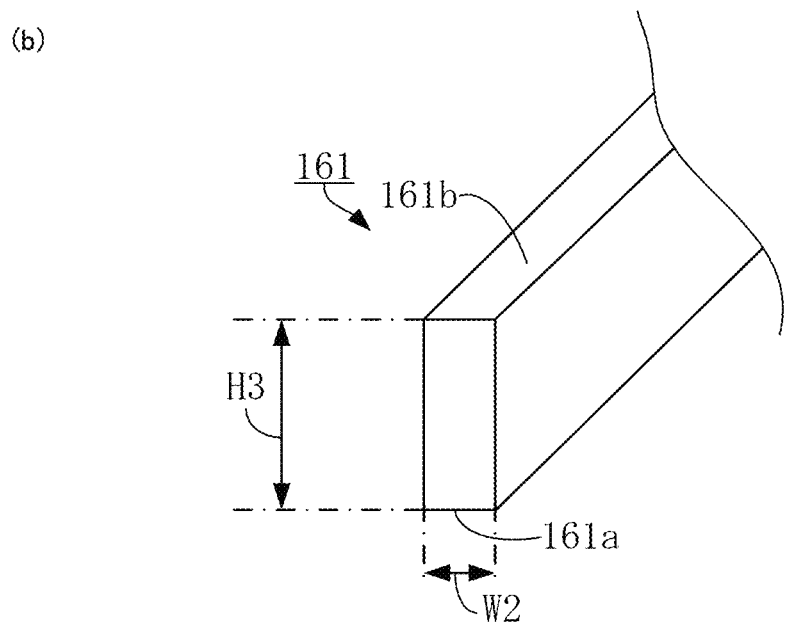

FIG.71
(a)
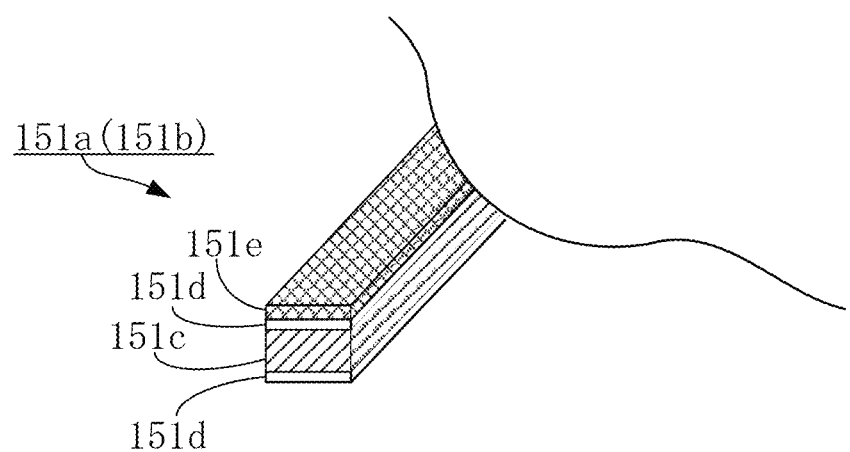
(b)
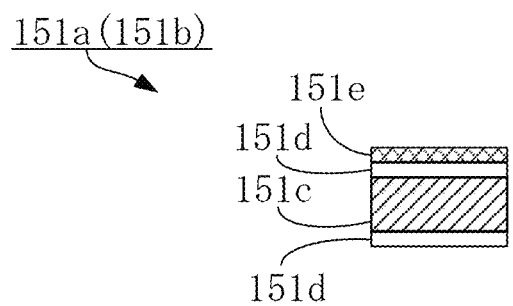

FIG.72
(a)
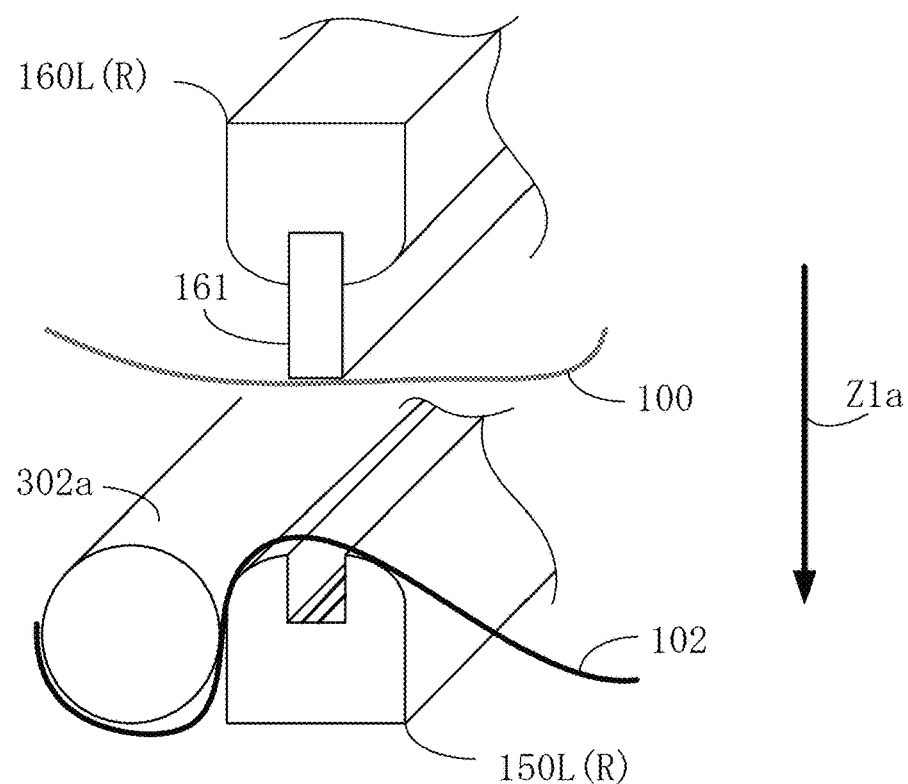
(b)
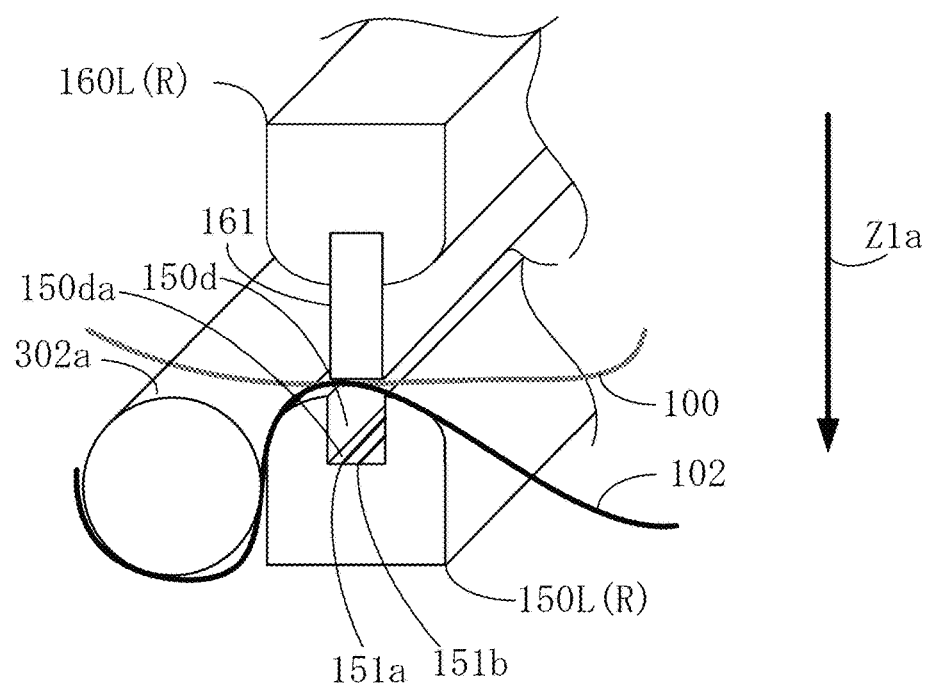

FIG.74
(a)
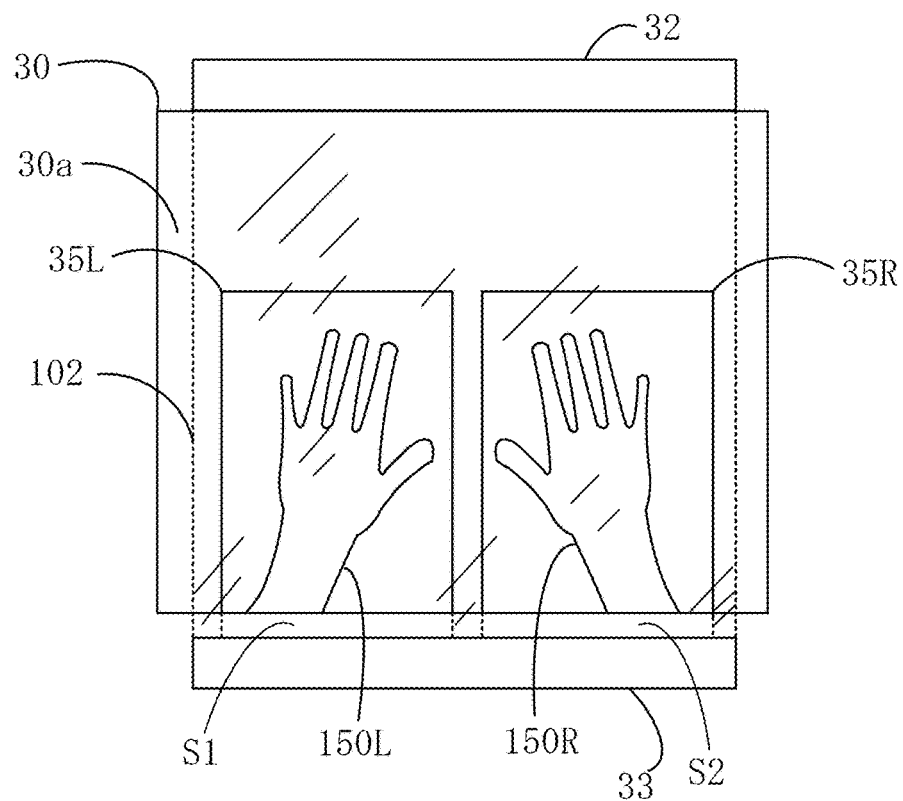
(b)
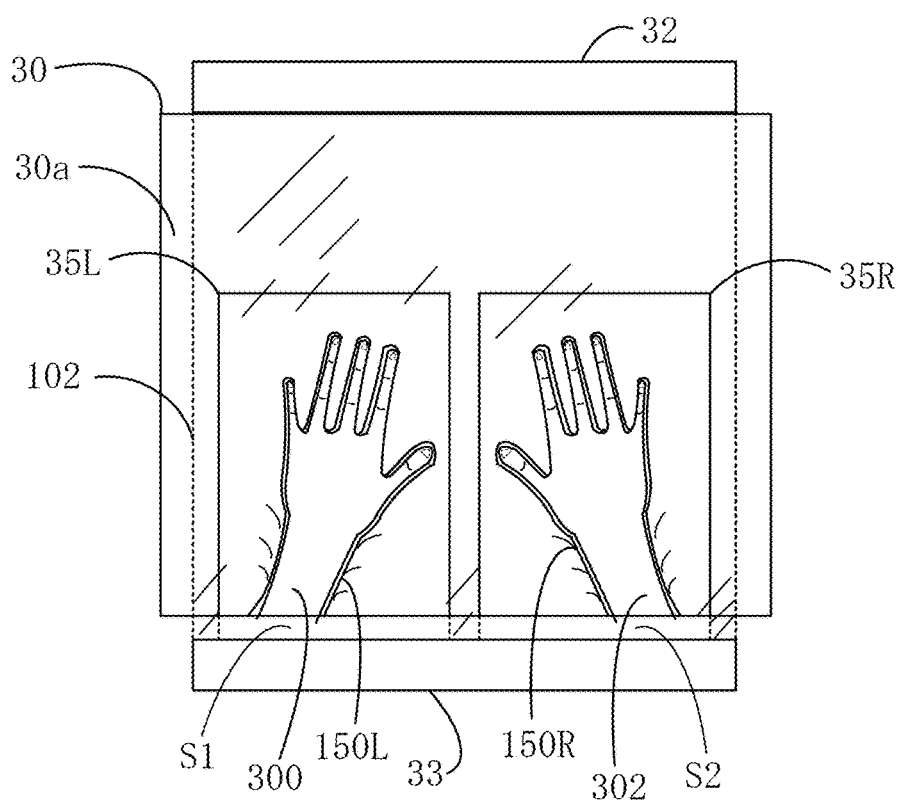

FIG.75
(a)
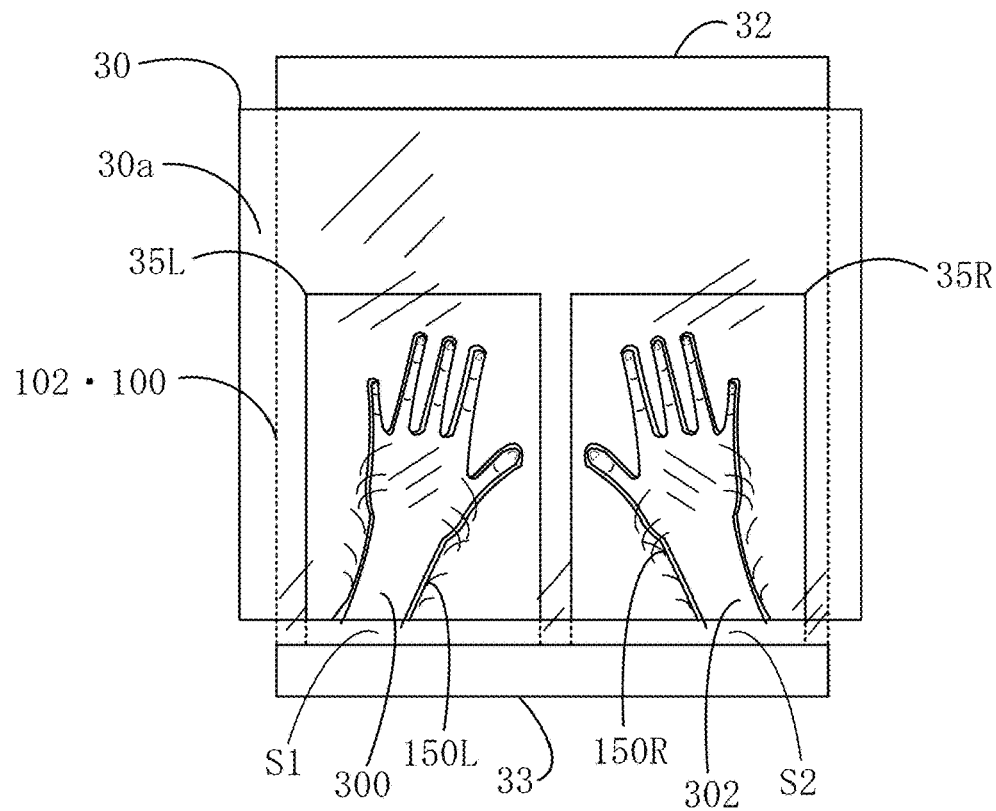
(b)
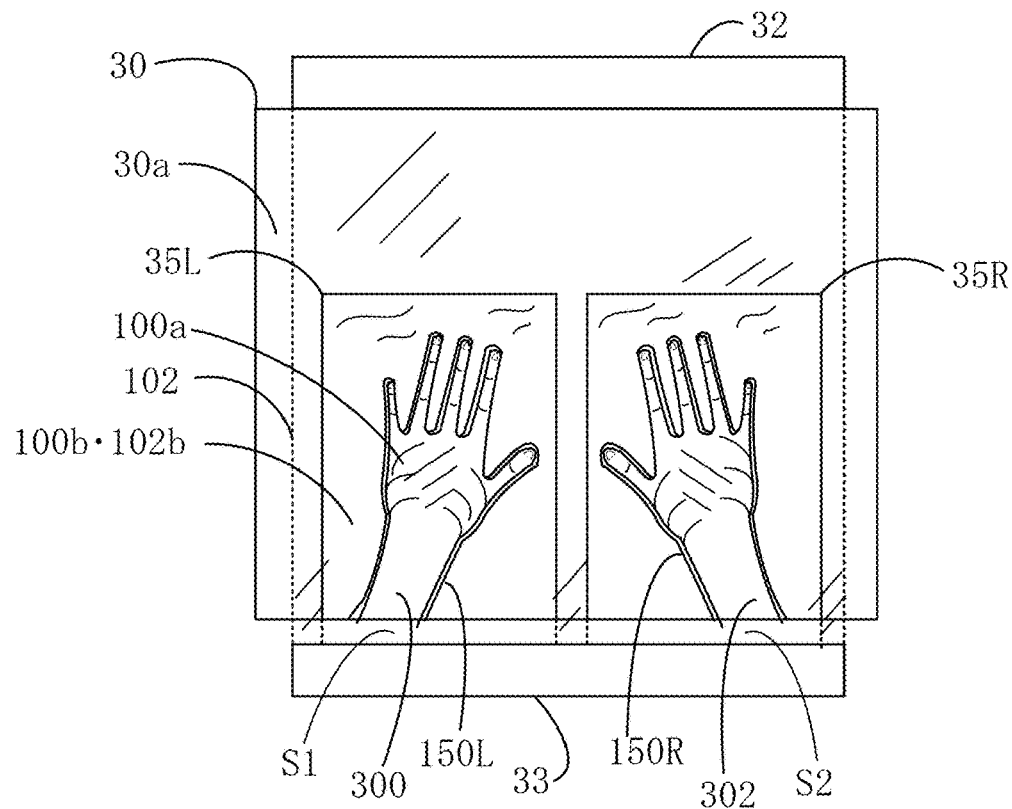

FIG.77
(a)
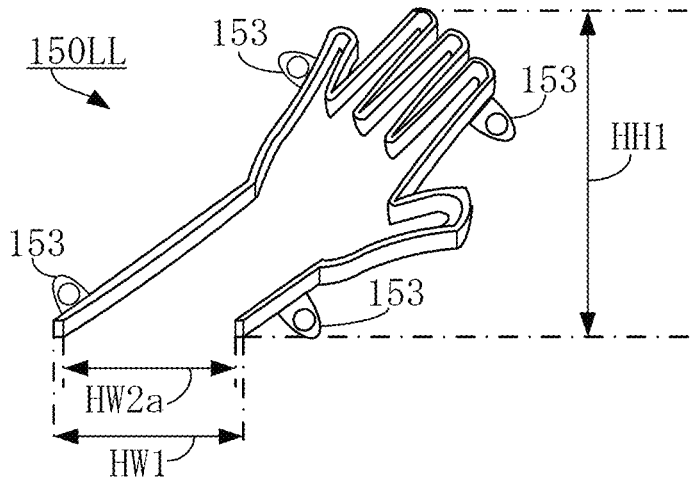
(b)
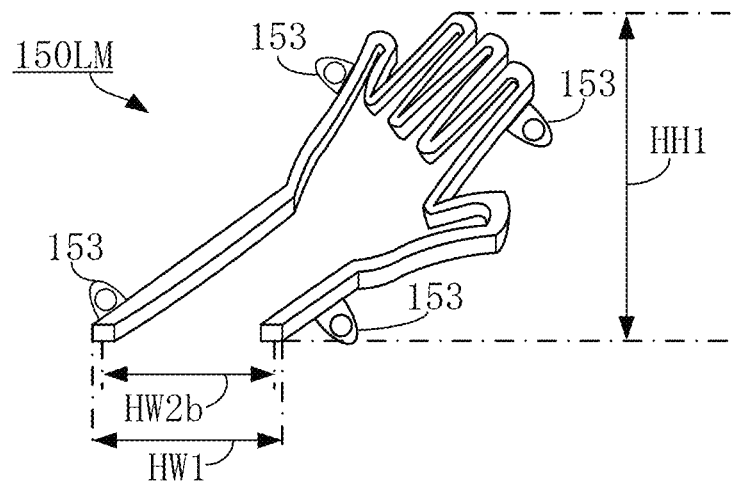
(c)
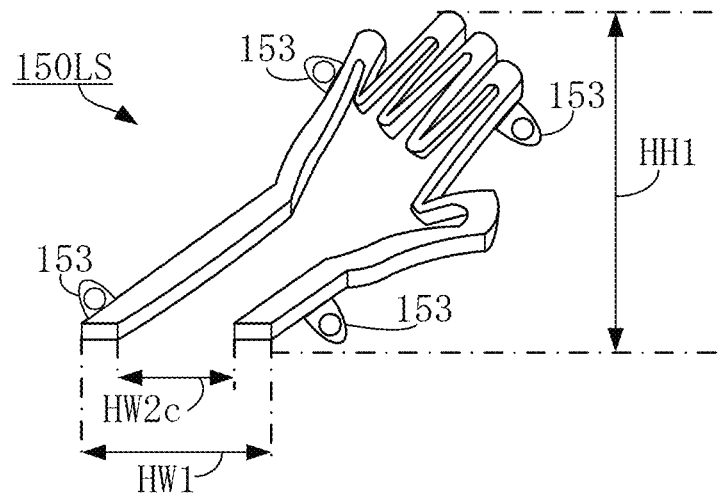

FIG.78
(a)
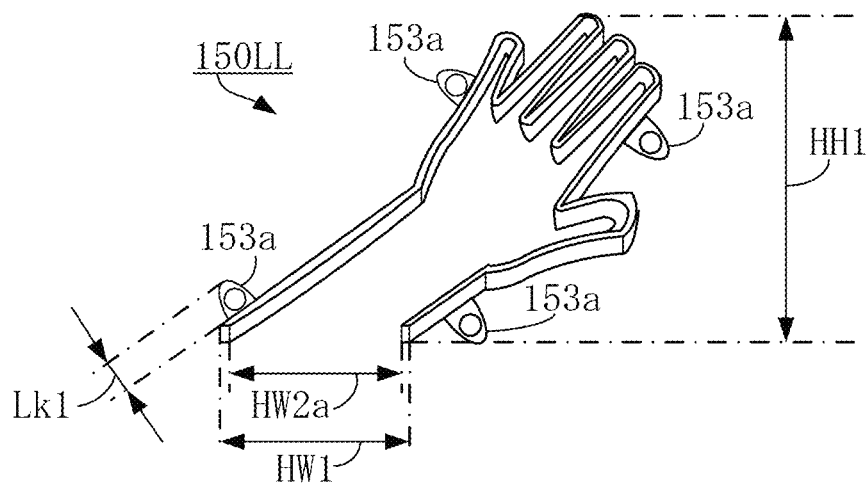
(b)
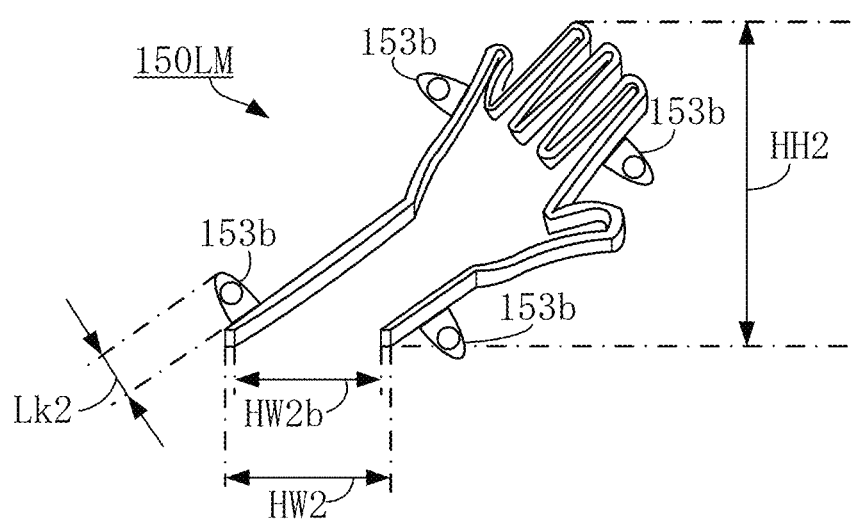
(c)
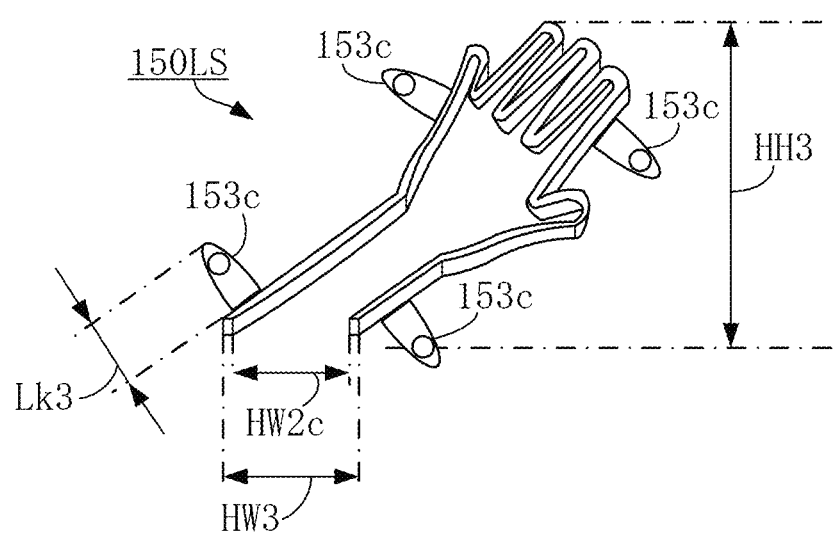

FIG.79
(a)
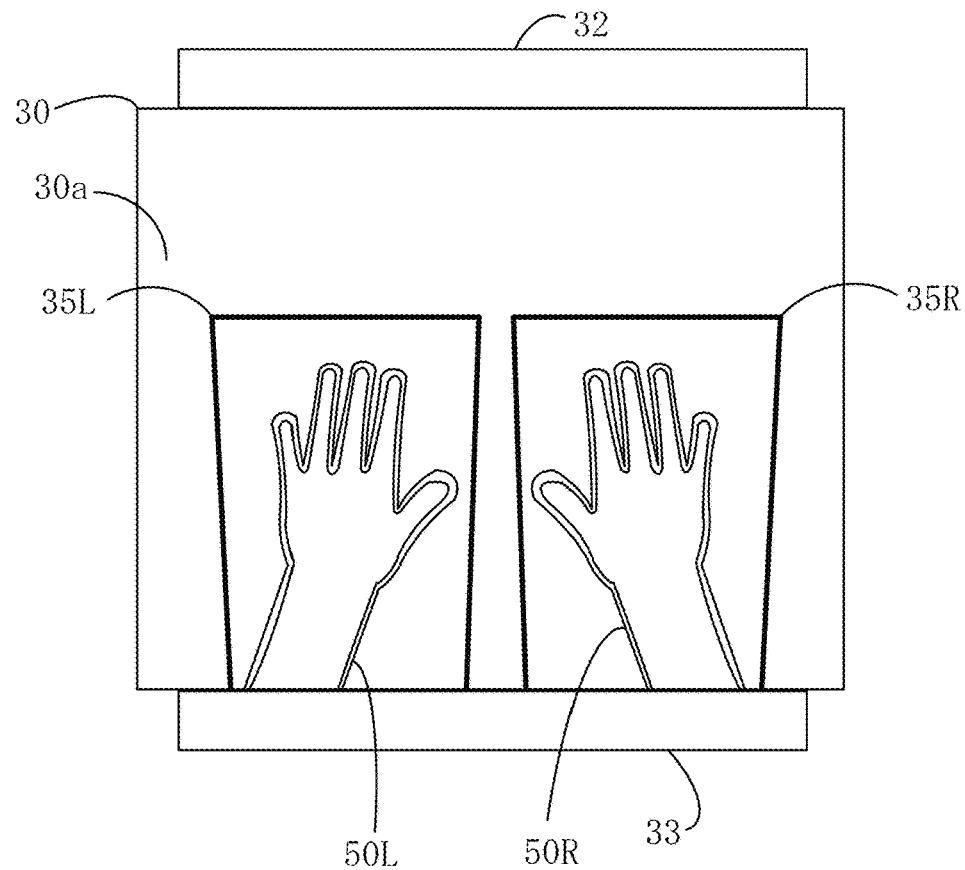
(b)
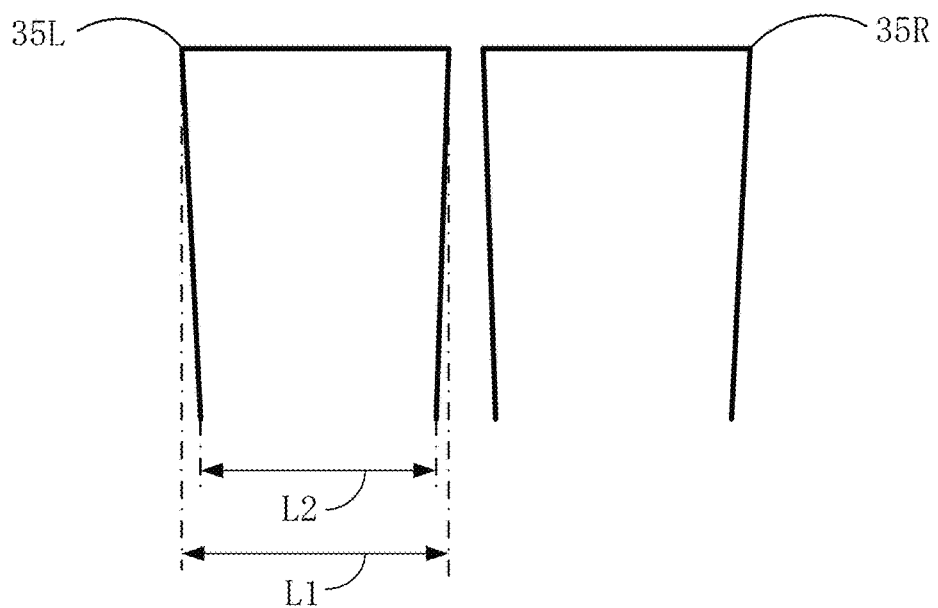

FIG.80
(a)
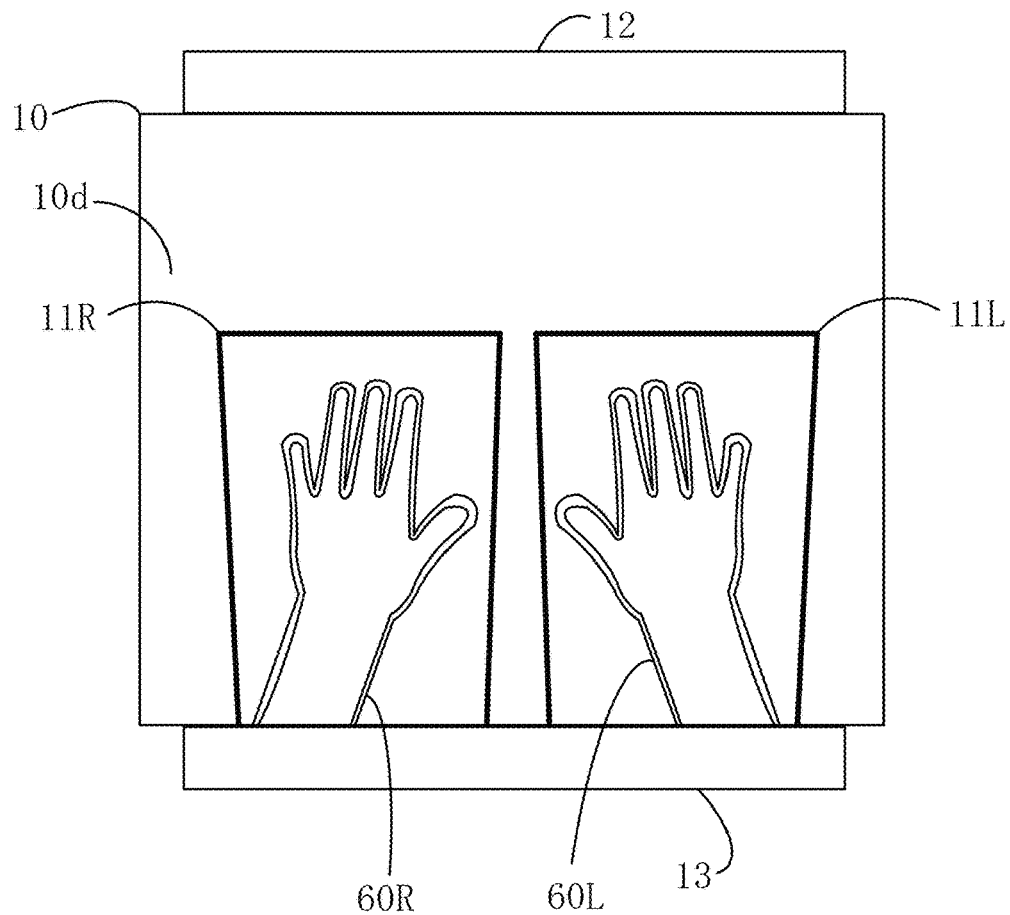
(b)
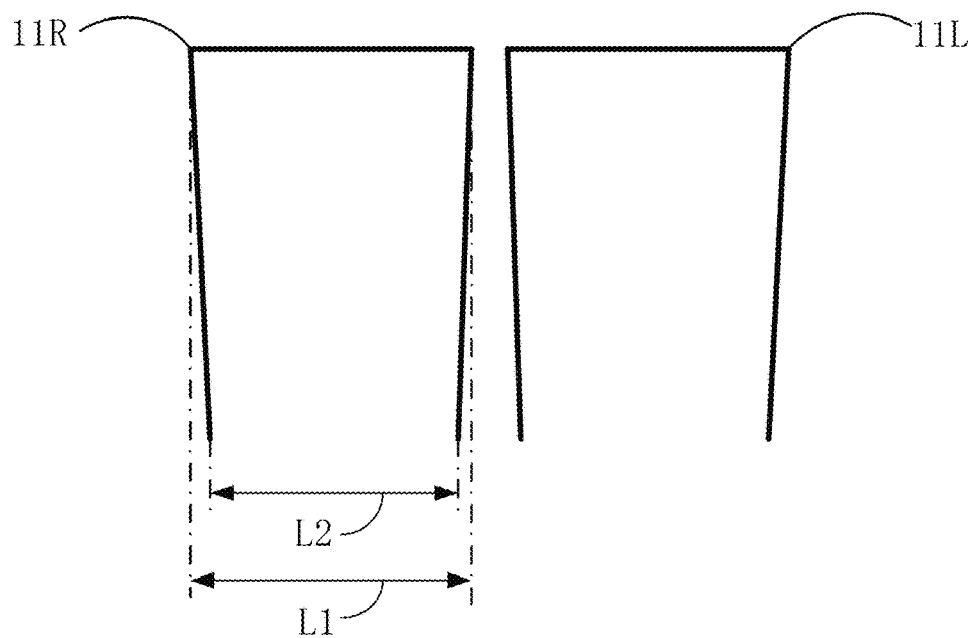

FIG.81
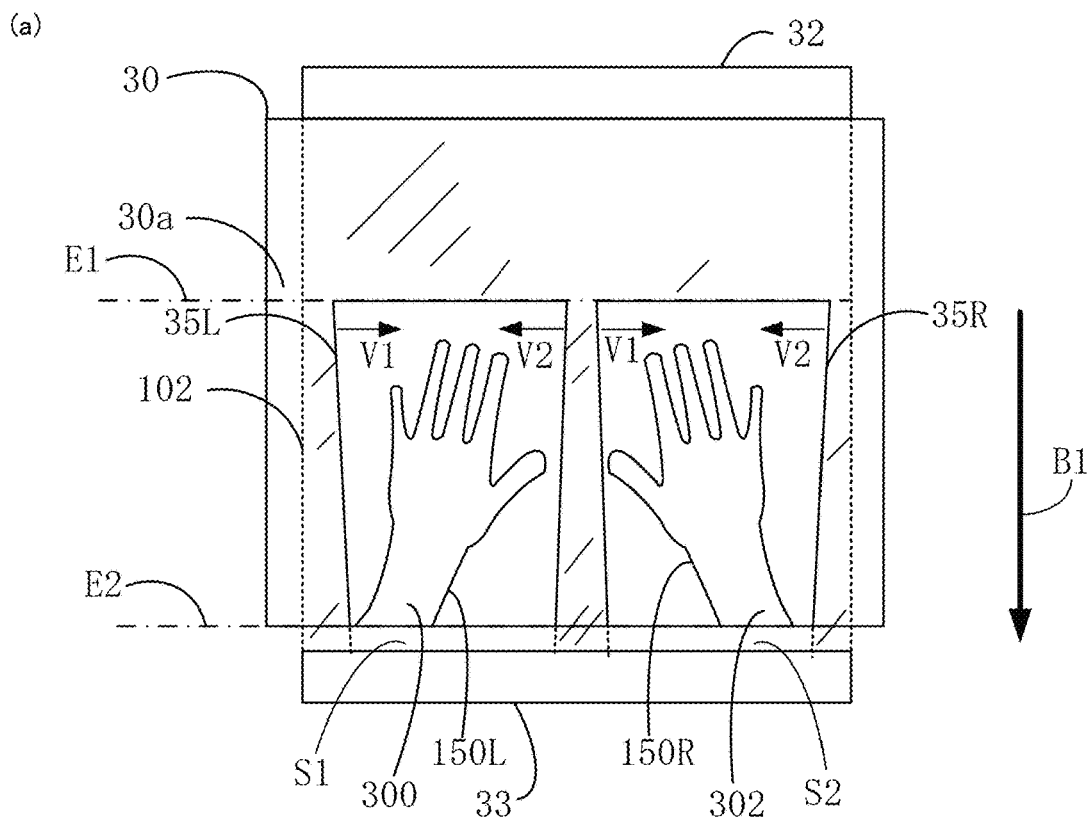
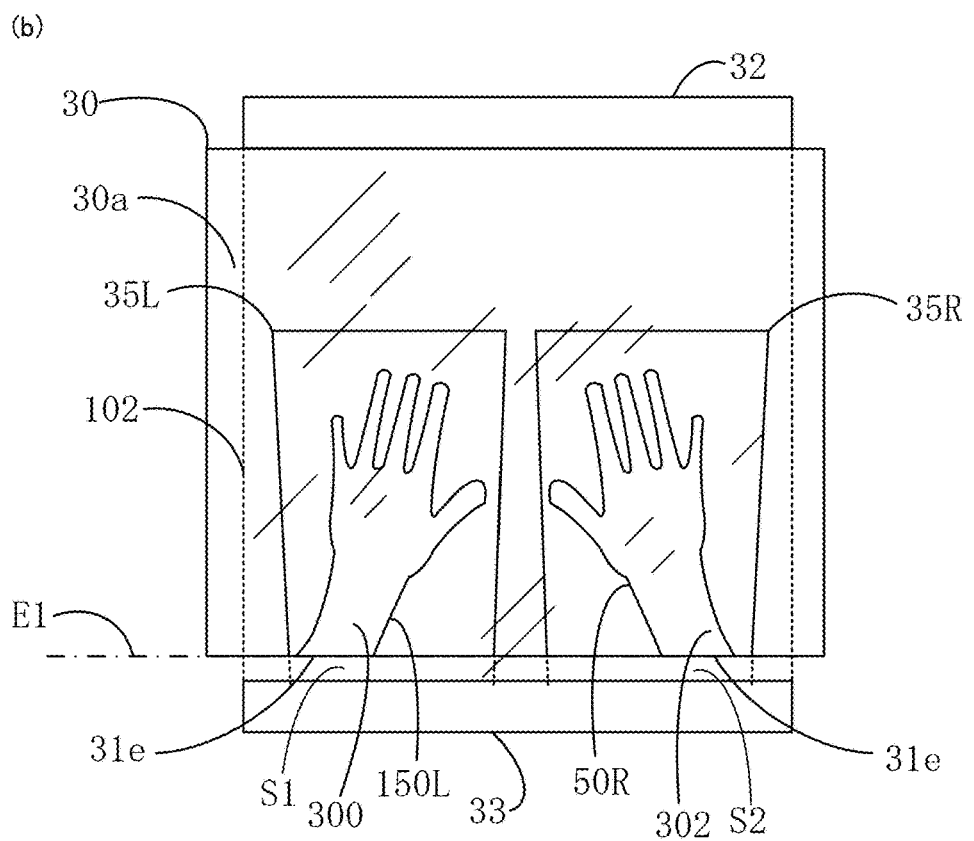

APPARATUS FOR PRODUCING AND PUTTING ON GLOVES, METHOD OF PRODUCING AND PUTTING ON GLOVES, AND GLOVE

This application claims priority to International Application PCT/JP2017/027669, with an international filing date of Jul. 31, 2017, the disclosures and figures of which are incorporated by reference as if set forth herein in their entirety.

TECHNICAL FIELD

The present invention relates to an apparatus for producing and putting on gloves, a method of producing and putting on gloves, and a glove.

BACKGROUND ART

Conventionally, disposable gloves produced by cutting two plastic films into a glove shape, and thermally welding the contour thereof have been proposed (e.g., Patent Literature 1).

CITATION LIST

Patent Literature

[Patent Literature 1] Japanese Patent No. 3763123

SUMMARY OF INVENTION

Technical Problem

Since there are various shapes of human hands, the basic shape of the glove itself will not fit an individual hand shape even if the glove shape and the ease of attachment and detachment thereof are improved.

An object of the present invention is to provide an apparatus for producing and putting on gloves capable of producing gloves that fit an individual hand shape and also putting the glove on the hands, a method for producing and putting on gloves, and a glove.

Solution to Problem

A first invention is an apparatus for producing and putting on gloves which comprises welding and cutting means for welding and cutting a first elastic film and a second elastic film at a position on the outer side of the contour of a user's hand in a state in which the user's hand is sandwiched between the first elastic film and the second elastic film.

According to the first invention, the first elastic film and the second elastic film are welded and cut at a position on the outer side of the contour of the user's hand in a state where the hand is sandwiched between the first elastic film and the second elastic film. Since the first elastic film and the second elastic film have elasticity, the films adhere to the hand through their elastic resilience. Accordingly, it is possible to produce the gloves that fit the individual hand shape, and put the gloves on the hands.

A second invention is the apparatus for producing and putting on gloves according to the first invention, which has a first member on which the first elastic film is arranged; and a second member on which the second elastic film is arranged; wherein the welding and cutting means has welding means for welding the first elastic film and the second elastic film at a first outer side position that is a position on the outer side of a contour of a user's hand in a state where the hand is sandwiched between the first elastic film and the second elastic film; and cutting means for cutting the first elastic film and the second elastic film at a second outer side position that is a position further on the outer side than the first outer side position; a first hand holding portion that can house a portion of the back side of a hand is formed in the first member; a second hand holding portion that can house a portion of the palm side is formed in the second member; wherein a face on the hand back side makes contact with the first elastic film, a face on the palm side makes contact with the second elastic film, and the hand is housed in a space formed by the first hand holding portion and the second hand holding portion in a state where the hand is sandwiched between the first member and the second member.

A third invention is the apparatus for producing and putting on gloves according to the second invention, wherein the first hand holding portion is a space formed by a first frame member in an outline shape of a hand and the face of the first member; and the second hand holding portion is a space formed by a second frame member in an outline shape of a hand and the face of the second member A fourth invention is the apparatus for producing and putting on gloves according to the third invention, wherein the first frame member and the second frame member are configured to be closest to a position having a predetermined distance from the user's hand when the first frame member and the second frame member approach each other.

A fifth invention is the apparatus for producing and putting on gloves according to the third invention, wherein: the welding and cutting means is fixed to a recess formed on the second frame member; and pressing means for pressing the welding and cutting means is disposed inserted in the recess on the second frame member.

A sixth invention is the apparatus for producing and putting on gloves according to the first invention, wherein: the welding and cutting means, in a state where user's hands are sandwiched between the first elastic film and the second elastic film, at a position outside of an outline of the hand, is configured to weld and cut the first elastic film and the second elastic film similar in shape to the user's hand; the welding and cutting means has outside cutting means for cutting the first elastic film and the second elastic film into a quadrilateral shape outside a portion where the first elastic film and the second elastic film; and the outside cutting means is configured so as to cut in a direction perpendicular to a film winding direction in which the first elastic film and the second elastic film are wound so that both ends and a center portion of the first elastic film and the second elastic film are left.

The seventh invention is the apparatus for producing and putting on gloves according to the sixth invention, wherein: the winding direction of the first elastic film and the second elastic film is configured such that the first elastic film and the second elastic film are wound up so that the side forming the top end of the portion cut into the quadrilateral shape when the previous gloves were produced and put on is disposed at the bottom end position of the portion cut into the quadrilateral shape when the current gloves are produced and put on.

The eighth invention is the apparatus for producing and putting on gloves according to the seventh invention, wherein: the outer side cutting means is configured so as to cut the first elastic film and the second elastic film so that the side forming the top end is longer than the side forming the bottom end in the winding direction of the first elastic film and the second elastic film.

The ninth invention is the apparatus for producing and putting on gloves according to the third invention, wherein: a part coming into contact with the user's hand is configured, in the first frame member and the second frame member, so as to fit together in the shape of an individual user's hand.

The tenth invention is the apparatus for producing and putting on gloves according to the second invention, wherein: the welding and cutting means is disposed at the bottom of a groove formed on the first member or the second member; or disposed at substantially the same height as the surface of the side both members facing on either the first member or the second member.

The eleventh invention is the apparatus for producing and putting on gloves according to the second invention, having stretching means for stretching the first elastic film and the second elastic film prior to welding and cutting the first elastic film and the second elastic film by the welding and cutting means.

The twelfth invention is the apparatus for producing and putting on gloves according to the second invention, having an adjustment mechanism for adjusting the shapes of the first hand holding portion and the second hand holding portion according to the shape of the user's hand.

The thirteenth invention is the apparatus for producing and putting on gloves according to the second invention, wherein: the welding and cutting means is a thin plate-like electric heating member.

The fourteenth invention is the apparatus for producing and putting on gloves according to the second invention, having first emergency response means which detects pressure due to the user's hand touching the welding and cutting means and executes a first emergency operation to maintain the user's safety.

The fifteenth invention is the apparatus for producing and putting on gloves according to the fourteenth invention, having second emergency response means which detects that a user's hand is caught between the first member and the second member at a position other than the first hand holding portion and the second hand holding portion and executes a second emergency operation to maintain the user's safety.

The sixteenth invention is the apparatus for producing and putting on gloves according to the fifteenth invention, having third emergency response means which detects if the user's hand is properly held in the first hand holding portion and/or the second hand holding portion and executes a third emergency operation to maintain the user's safety.

The seventeenth invention is a method for producing and putting on gloves, which produces and puts onto a user's hand by welding and cutting a first elastic film and a second elastic film at a position outside the contour of the hand while in a state where the user's hand is sandwiched between the first elastic film and the second elastic film.

The eighteenth invention is a glove produced and put onto a user's hand through a method which comprises: a moving step for moving a first member on which a first elastic member is arranged and a second member on which a second elastic film is arranged so as to sandwich a user's hand; and a welding and cutting step for welding the first elastic film and the second elastic film at a first outer side position that is a position on an outer side of a contour of the hand in a state where the hand is sandwiched between the first elastic film and the second elastic film, and cutting the first elastic film and the second elastic film at a second outer side position that is a position further on the outer side than the first outer side position.

Advantageous Effect of Invention

The present invention can produce gloves that fit an individual hand shape and that can put the gloves on the hands.

BRIEF DESCRIPTION OF DRAWINGS

FIG. 15 is a schematic view illustrating a state where gloves are adhered to and put on hands.

FIG. 18 is a schematic enlarged view of a portion of the bottom member and the top member.

FIG. 24 is a schematic conceptual diagram illustrating a change in glove shape.

FIG. 27 is a schematic conceptual diagram showing a change in glove shape according to a second embodiment.

FIG. 33 is a schematic conceptual diagram illustrating a change in glove shape according to the third embodiment.

FIG. 40 is a schematic enlarged view illustrating the welding state of an elastic film.

FIG. 43 is a schematic perspective view illustrating an elastic film stretching mechanism.

FIG. 44 is a schematic conceptual diagram illustrating the change in the shape of a glove.

FIG. 52 is a schematic view illustrating elastic films.

FIG. 56 is a schematic enlarged view illustrating a portion of the bottom member.

FIG. 65 is a schematic diagram illustrating a bottom member, and the like.

FIG. 66 is a schematic diagram illustrating a top member, and the like.

FIG. 67 is a schematic view illustrating a frame member and the like of a top member.

FIG. 71 is a schematic view illustrating a heating wire for welding and a heating wire for cutting.

FIG. 72 is a schematic view illustrating a state in which the frame member of the top member and the frame member of the bottom member approach each other.

FIG. 74 is a schematic view illustrating an elastic film or the like disposed on a bottom member.

FIG. 75 is a schematic view illustrating an elastic film or the like disposed on a bottom member.

FIG. 77 is a schematic view illustrating a frame member.

FIG. 78 is a schematic view illustrating a frame member according to a nineteenth embodiment.

FIG. 79 is a schematic view illustrating a bottom member or the like of a twentieth embodiment.

FIG. 80 is a schematic view illustrating a top member or the like.

FIG. 81 is a schematic view illustrating an elastic film or the like disposed on a bottom member.

DESCRIPTION OF EMBODIMENTS

Figure 1:
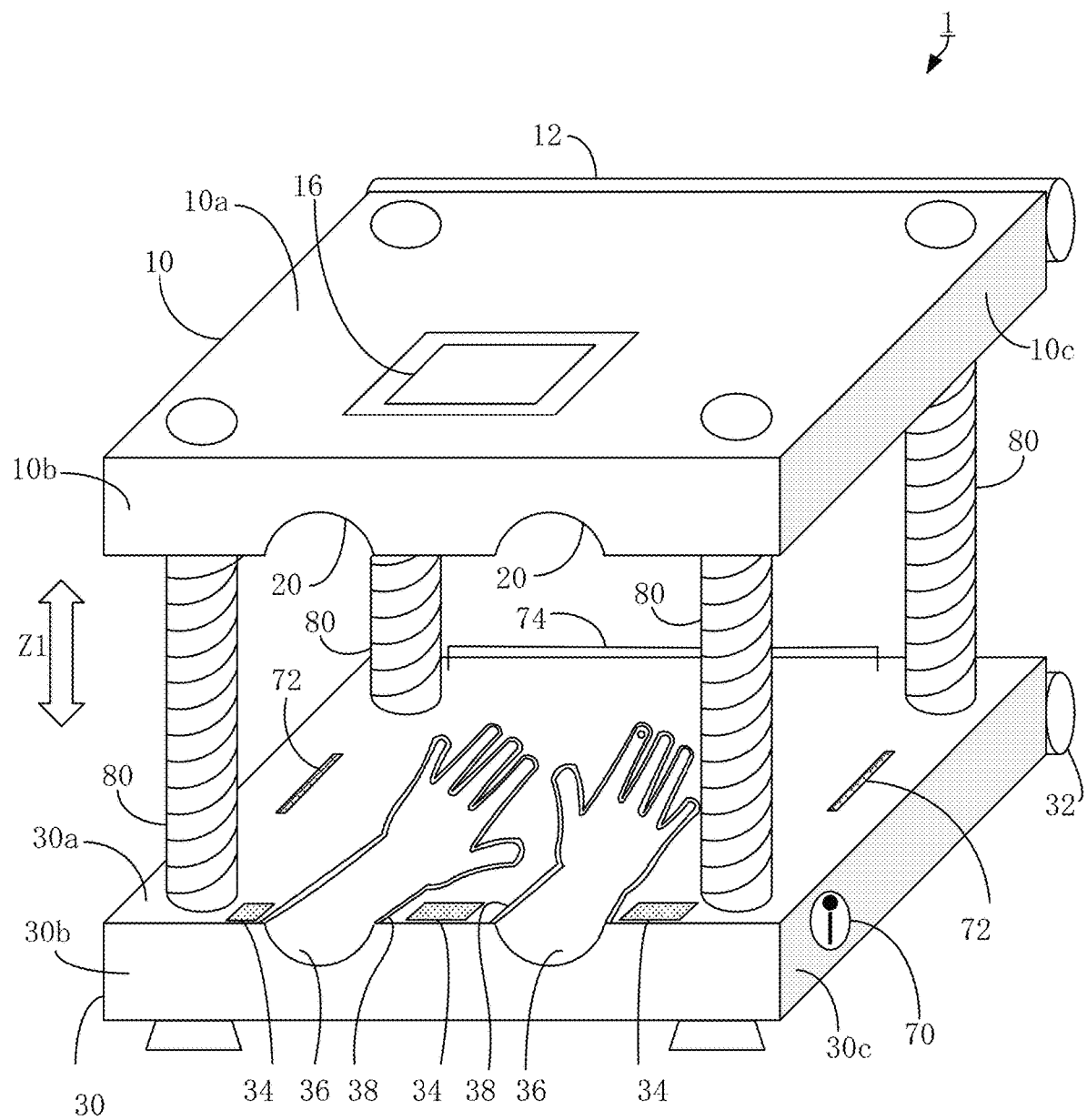
FIG. 1 is a schematic perspective view of an apparatus for producing and putting on gloves according to a first embodiment of the present invention.

Preferred embodiments of the present invention are described below referring to the drawings. Note that description of a configuration that can be implemented by a person skilled in the art as appropriate is omitted, and only the fundamental configuration of the present invention is described.

First Embodiment

Figure 2:
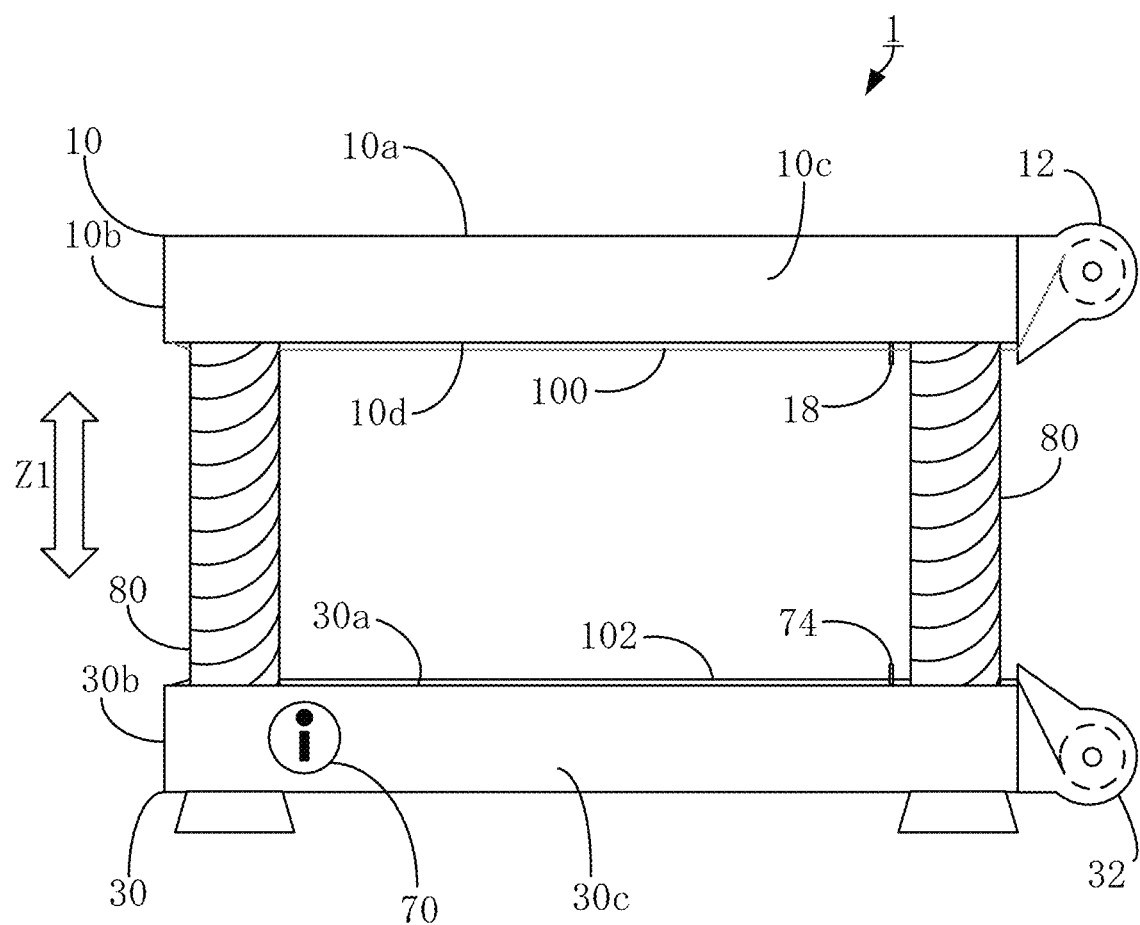
FIG. 2 is a schematic side view of the apparatus for producing and putting on gloves.

An overview of an apparatus for producing and putting on gloves 1 (hereinafter, referred to as an "apparatus 1") is described. As illustrated in FIGS. 1 and 2, the apparatus 1 includes a top member 10, a bottom member 30, and four rotating columns 80. The rotating columns 80 are each deployed in four corners of the top member 10 and the bottom member 30. The top member 10 and the bottom member 30 have a flat rectangular parallelepiped shape. An elastic film 100 is arranged on the top member 10, and an elastic film 102 is arranged on the bottom member 30. The apparatus 1 is an example of the apparatus for producing and putting on gloves; the top member 10 is an example of the first member; the elastic film 100 is an example of the first elastic film; the bottom member 30 is an example of the second member; and the elastic film 102 is an example of the second elastic film.

The elastic film 100 and the elastic film 102 are plastic films having elasticity such as low density polyethylene films, cast polypropylene films, oriented polypropylene films, and ethylene-vinyl acetate copolymer films. The elastic film 100 and the elastic film 102 are formed by such plastic films as a single layer or multiple layers.

The direction of the top member 10 is referred to as an upward direction, and the direction of the bottom member 30 is referred to as a downward direction herein. In addition, the direction of a side face 10c of the top member 10 and a side face 30c of the bottom member 30 is referred to as a right direction, and the direction opposite thereto is referred to as a left direction. The direction of a front face 10b of the top member 10 and a front face 30b of the bottom member 30 is referred to as a forward direction, and the direction opposite thereto is referred to as a backward direction. Note that the external forms of the top member 10 and the bottom member 30 are not limited to a flat rectangular parallelepiped, and may be a cube or a rounded shape, which is different from the present embodiment.

As illustrated in FIGS. 1 and 2, a film holder 12 is arranged on a side face of the top member 10 on the backward direction side, and a film holder 32 is arranged on a side face of the bottom member 30 on the backward direction side. The film holder 12 and the film holder 32 are configured to hold the elastic film 100 and the elastic film 102, respectively, such that it can be pulled out.

Figure 3:
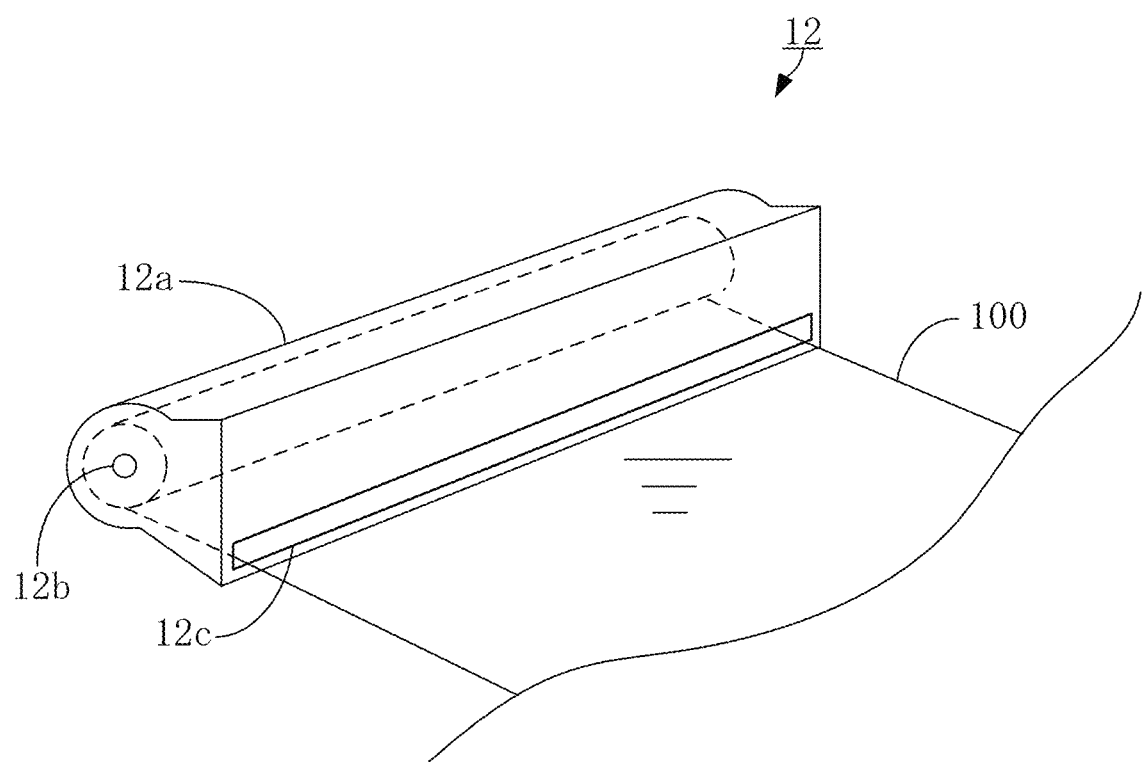
FIG. 3 is a schematic view of a film holder.

As illustrated in FIG. 3, the film holder 12 includes a housing 12a and a rotary shaft 12b. A film outlet 12c, which is an opening, is formed in the housing 12a. The elastic film 100 is wound around the rotary shaft 12b and stored in the housing 12a so that it can be pulled out from the film outlet 12c. The configuration of the film holder 32 is similar to the configuration of the film holder 12.

Figure 8:
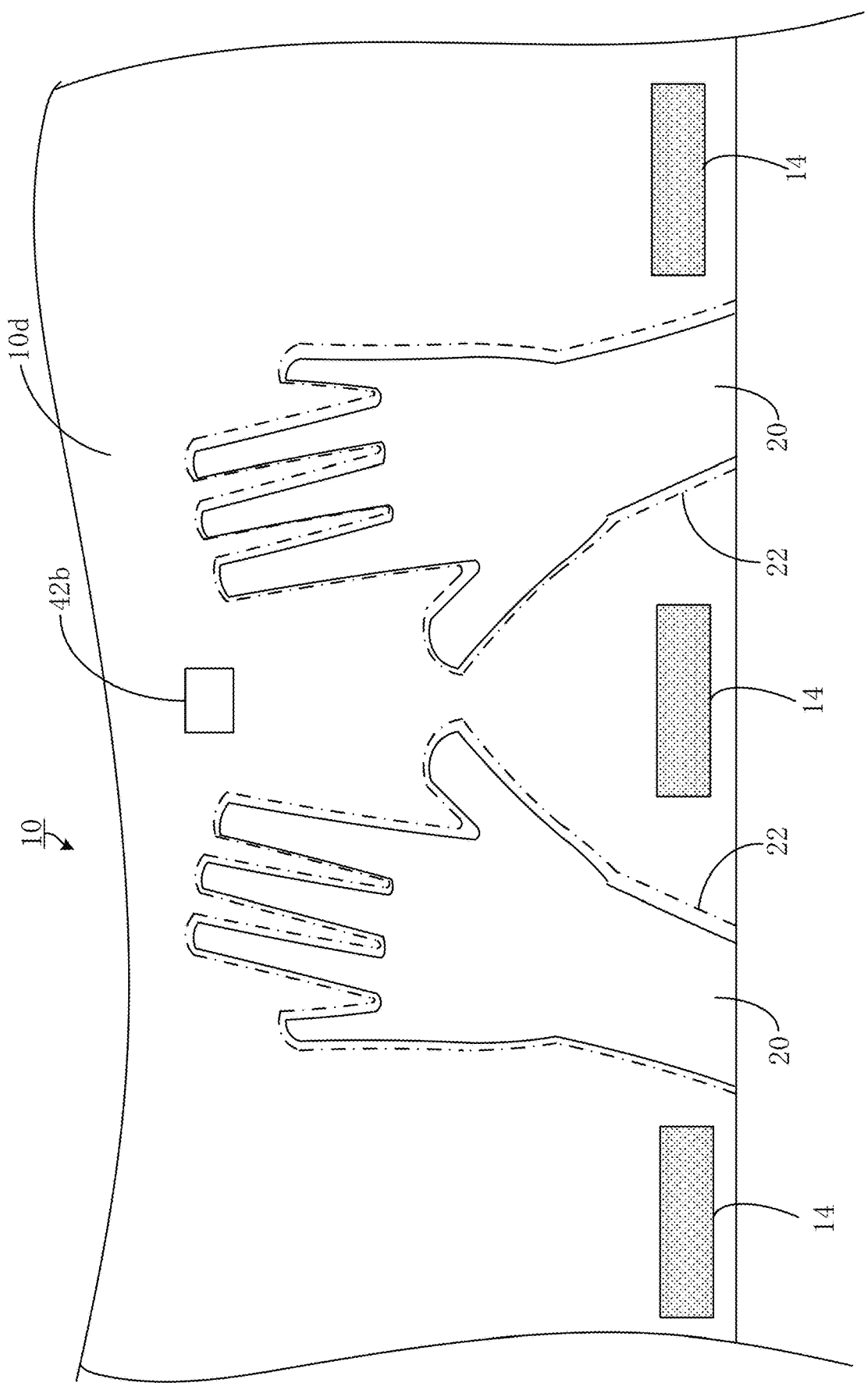
FIG. 8 is a schematic view of a portion of a top member.

FIG. 8 is a partial schematic view of the top member 10 as viewed from the direction of the bottom member 30. As illustrated in FIG. 8, a film fixing part 14 is arranged on a portion of a bottom face 10d, which is an opposing face to a top face 10a of the top member 10 on the forward direction side. Similarly, as illustrated in FIG. 1, a film fixing part 34 is arranged on a portion of a top face 30a of the bottom member 30 on the forward direction side. The film fixing part 14 and the film fixing part 34 are configured to fix the elastic film 100 and the elastic film 102, respectively. The film fixing part 14 and the film fixing part 34 are made of a material capable of fixing the elastic film 100 and the elastic film 102, such as silicone rubber.

As illustrated in FIG. 2, the elastic film 100 pulled out from the film holder 12 is pulled out in the forward direction through a guide 18, and an end thereof is fixed to the film fixing part 14 (see FIG. 8). Similarly, the elastic film 102 pulled out from the film holder 32 is pulled out in the forward direction through a guide 74, and an end thereof is fixed to the film fixing part 34 (see FIG. 5).

As illustrated in FIG. 1, a display device 16 is arranged on the top face 10a of the top member 10 to display a predetermined text including a state of each part of the apparatus 1. A foreign substance sensor 72 is arranged on the top face 30a of the bottom member 30. The foreign substance sensor 72 is, for example, an infrared sensor, configured to transmit an infrared ray toward a reception device (not illustrated) on the bottom face 10d of the top member 10, and display a text indicating an abnormality on the display device 16 when an abnormality occurs in the reception state of the infrared ray in the reception device of the top member 10.

A power switch 70 is arranged on the bottom member 30 to start and stop the entire apparatus 1.

Figure 4:
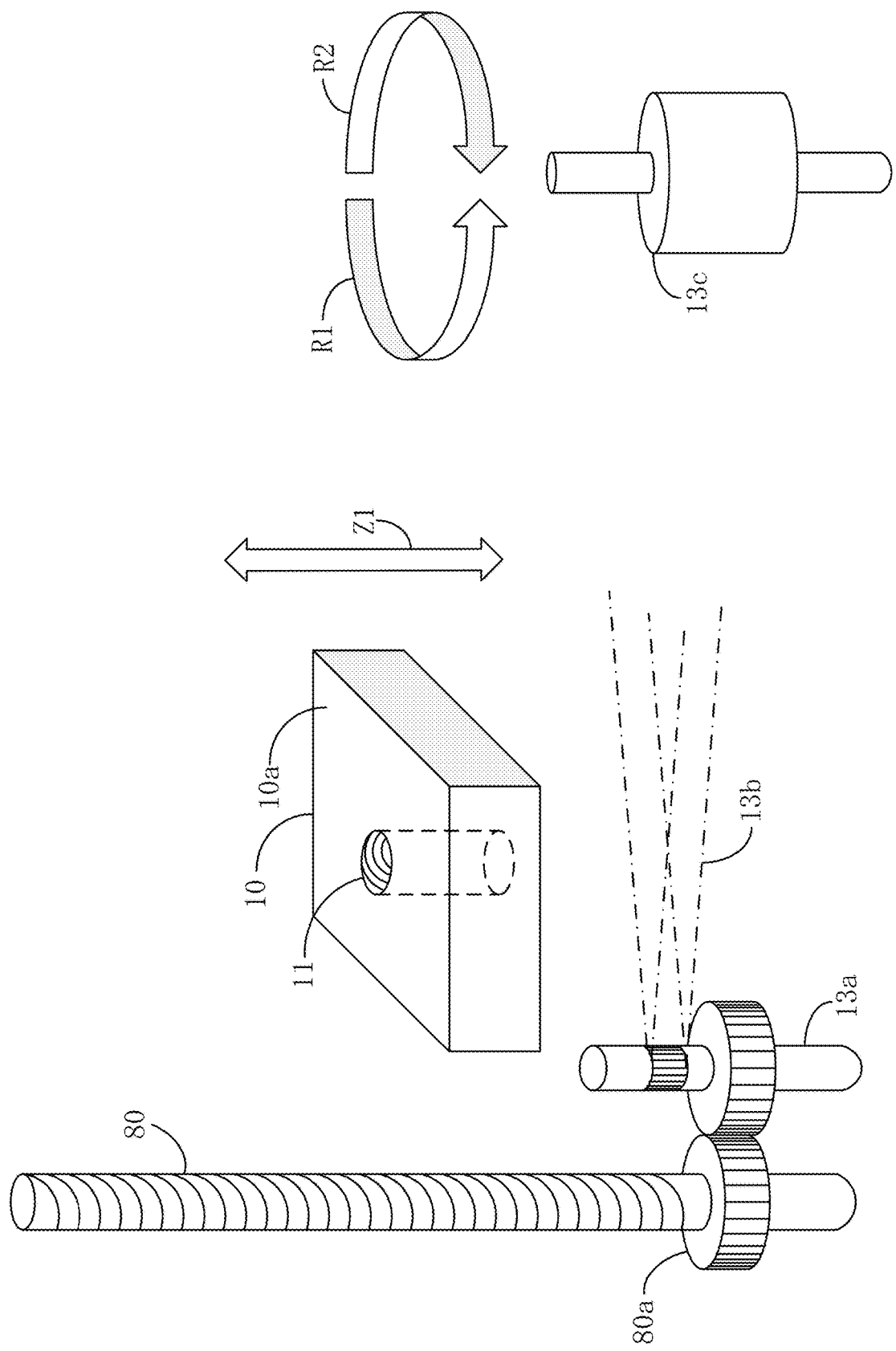
FIG. 4 is a schematic view of a lifting mechanism.

The top member 10 reciprocates (moves upward and downward) with respect to the bottom member 30 in the direction of arrow Z1 (vertical direction) in FIG. 1. FIG. 4 conceptually illustrates an example of a lifting mechanism of the top member 10. FIG. 4 illustrates a portion of the top member 10 (a portion near one of the rotating columns 80) and a portion of the interior of the bottom member 30. As illustrated in FIG. 4, a through-hole 11 is formed in the top member 10, and a female screw is formed in the through-hole 11. A through-hole (not illustrated) is formed in the bottom member 30 as well, but a female screw is not formed in the through-hole of the bottom member 30. A male screw is formed in the rotating column 80, and the top member 10 moves upward and downward with respect to the bottom member 30 as the rotating column 80 rotates. A gear 80a is formed below the rotating column 80. The gear 80a is arranged inside of the bottom member 30. The gear 80a is connected to a motor 13c placed inside of the bottom member 30 via power transmission means such as a gear 13a or a belt 13b. The rotating column 80 rotates through the rotation of the rotary shaft of the motor 13c. The rotary shaft of the motor 13c rotates in a normal rotation direction R1 and a reverse rotation direction R2, and the rotating column 80 rotates in both the normal rotation direction and the reverse rotation direction. The top member 10 moves upward and downward as a result of the rotating column 80 rotating as such. The motor 13c, the power transmission means, and the rotating column 80 are exemplary moving means (lifting means).

As illustrated in FIG. 1, depressions 36 in a hand shape are formed in the top face 30a of the bottom member 30. The depressions 36 are formed for a right hand and for a left hand, respectively. The depressions 36 are depressed in a recessed shape in the top face 30a. The depressions 36 are an example of a second hand holding portion. Welding and cutting units 38 for welding and cutting the elastic film 100 and the elastic film 102 are formed around the depressions 36.

Figure 5:
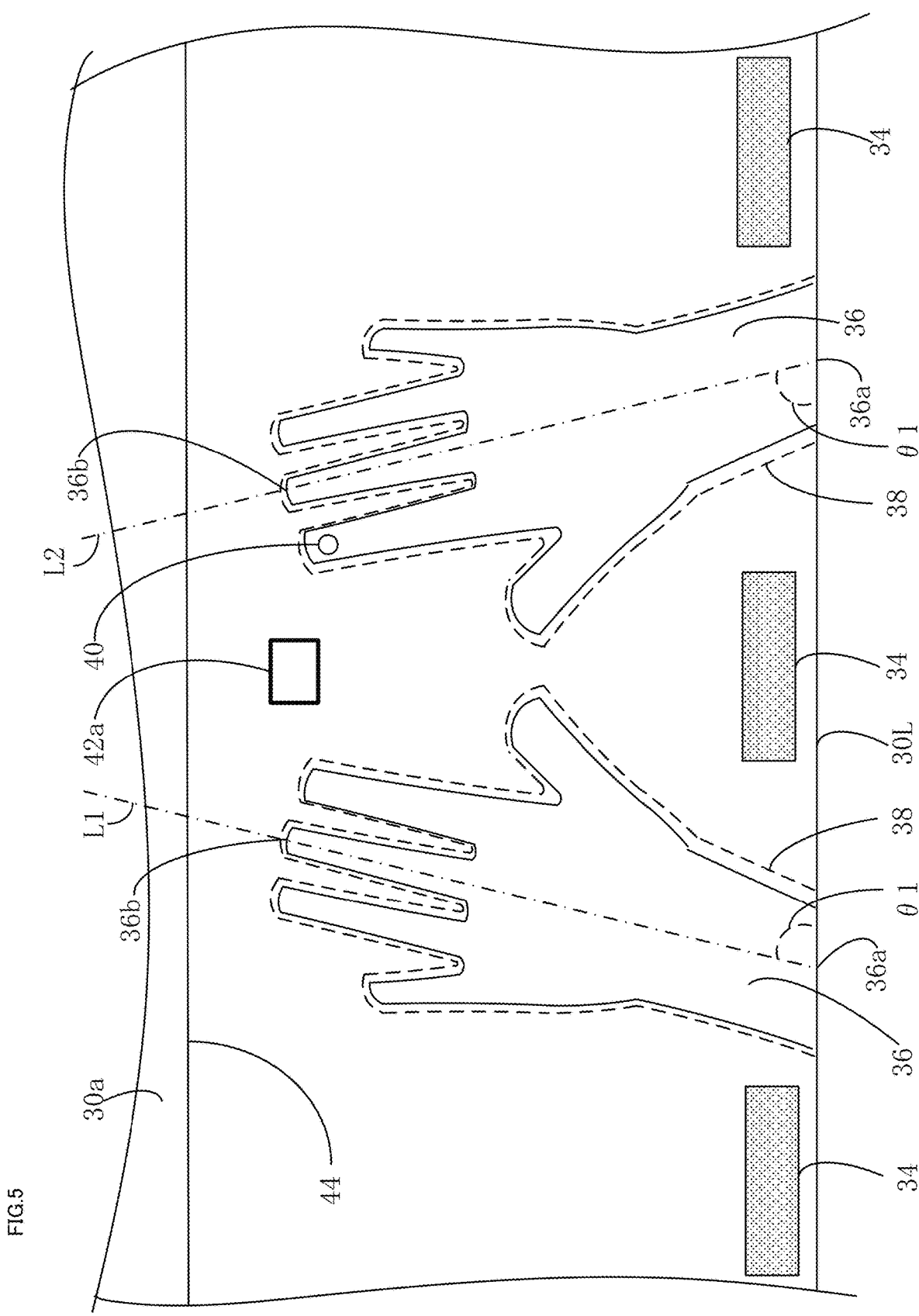
FIG. 5 is a schematic view of a portion of a bottom member.

As illustrated in FIG. 5, the depressions 36 in the bottom member 30 are formed into a shape capable of housing a user's palm and five fingers (hereinafter, referred to as a "hand shape"). A portion in which the user's palm is housed is referred to as a "palm corresponding portion"; a portion in which the thumb is housed is a "thumb corresponding portion"; a portion in which the index finger is housed is an "index finger corresponding portion"; a portion in which the middle finger is housed is a "middle finger corresponding portion"; a portion in which the ring finger is housed is a "ring finger corresponding portion" and a portion in which the little finger is housed is a "little finger corresponding portion". An operation switch 40 is deployed in the proximity of the tip of the index finger corresponding portion of the depression 36 in which the right hand is housed. The operation switch 40 controls power supply to the motor 13c (see FIG. 4) to adjust the relative positions of the top member 10 and the bottom member 30. More specifically, the user of the apparatus 1 operates the operation switch 40 to cause an upward and downward movement of the top member 10 in a state where the hands are placed in the depressions 36.

In the left and right depressions 36, straight lines L1 and L2 respectively connecting a base portion 36a and a tip part 36b of the middle finger corresponding portion are not perpendicular to, but inclined by an angle θ1 with respect to a straight line 30L that defines a portion of the top face 30a of the bottom member 30 in the forwardmost direction. The angle θ1 is, for example, an angle in a range from 60 degrees to 80 degrees. The straight lines L1 and L2 inclined by the angle θ1 with respect to the straight line 30L allow a user to place both hands in the depressions 36 in an ergonomically natural state.

Figure 6:
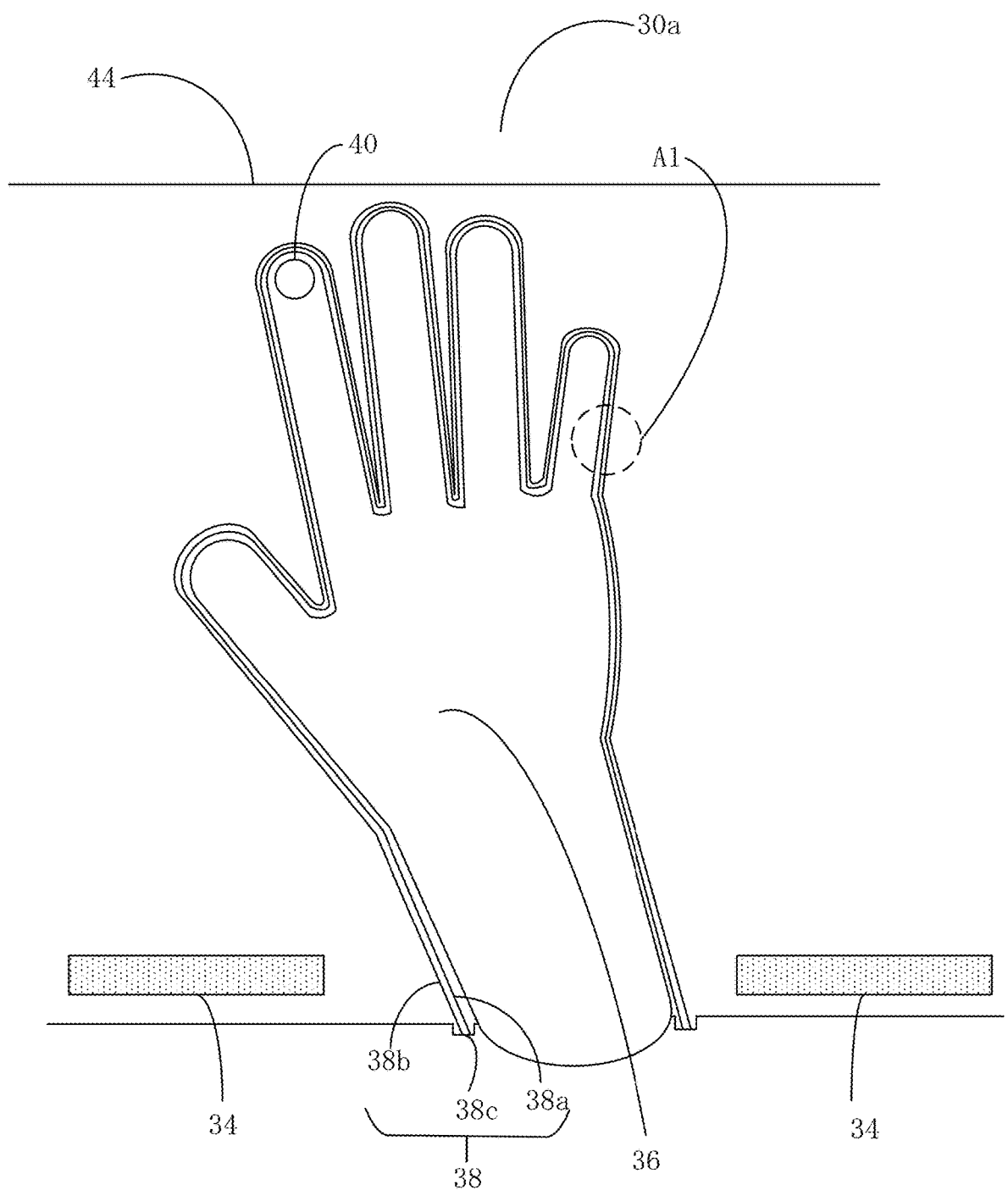
FIG. 6 is a schematic view of a portion of the bottom member.

As illustrated in FIG. 6, the welding and cutting unit 38 is formed in the outer side of the depression 36. The welding and cutting unit 38 is exemplary welding and cutting means. The welding and cutting unit 38 includes a heating wire for welding 38a, a heating wire for cutting 38b, and a groove 38c. The heating wire for welding 38a is exemplary welding means, and the heating wire for cutting 38b is exemplary cutting means. The groove 38c is formed so as to surround the hand shape on the outer side of the depression 36 formed into the hand shape. The heating wire for welding 38a and the heating wire for cutting 38b are deployed on the bottom of the groove 38c. The heating wire for welding 38a is deployed on the depression 36 side, and the heating wire for cutting 38b is deployed on the outer side of the heating wire for welding 38a. While FIG. 6 illustrates the depression 36 in which a right hand 302 (see FIG. 11) is housed, the configuration of the depression 36 in which a left hand 300 (see FIG. 11) is housed is similar to the configuration of the depression 36 in which the right hand 302 is housed, except that the operation switch 40 is not deployed.

When the user places his/her right hand 302 in the depression 36, the heating wire for welding 38a is positioned on the outer side (first outer side position) of the contour of the right hand 302, and the heating wire for cutting 38b is positioned further on the outer side (second outer side position) than that position. A position on the outer side of the depression 36 at which the heating wire for welding 38a is deployed in the groove 38c is an example of the first outer side position. A position on the outer side of the heating wire for welding 38a at which the heating wire for cutting 38b is deployed in the groove 38c is an example of the second outer side position.

The heating wire for welding 38a and the heating wire for cutting 38b are nichrome wires, for example, and subjected to a safety measure to prevent problems such as getting burned. For example, the heating wire for welding 38a and the heating wire for cutting 38b are wrapped with an insulating material such as magnesium oxide, and enclosed in a metal pipe such as stainless steel. The heating wire for cutting 38b generates heat at a temperature sufficient for cutting the elastic film 100 and the elastic film 102, for example, generating heat in a temperature range from 60 degrees Celsius (° C.) to 150 degrees Celsius (° C.). The heating wire for cutting 38b preferably generates heat in a temperature range from 80 degrees Celsius (° C.) to 120 degrees Celsius (° C.). The heating wire for welding 38a generates heat at a temperature sufficient for welding the elastic film 100 and the elastic film 102, and the heat generation temperature is equal to or lower than the heat generation temperature of the heating wire for cutting 38b, for example, generating heat in a temperature range from 40 degrees Celsius (° C.) to 110 degrees Celsius (° C.). The heating wire for welding 38a preferably generates heat in a temperature range from 50 degrees Celsius (° C.) to 70 degrees Celsius (° C.). In the present embodiment, the heating wire for cutting 38b generates heat at 110 degrees Celsius (° C.) for 0.5 seconds (s), and the heating wire for welding 38a generates heat at 65 degrees Celsius (° C.) for 0.5 seconds to 1 second. The heat generation temperature of the heating wire for welding 38a and the heating wire for cutting 38b and the duration of heat generation are adjusted depending on the characteristics of the elastic films 100 and 102. The heating wire for welding 38a may also be caused to generate heat at the same heat generation temperature as the heating wire for cutting 38b; and the duration of heat generation for the heating wire for welding 38a may be shorter than the duration of heat generation for the heating wire for cutting 38b.

The operation switch 40 is deployed near the tip of the index finger corresponding portion in the depression 36 for the right hand, and can control the power supply to the motor 13c (see FIG. 4) so as to operate an upward and downward movement of the top member 10.

As illustrated in FIG. 6, a heating wire for cutting 44 for linearly cutting the elastic films 100 and 102 is deployed in a portion on the backward direction side of the outer side of the depression 36. It is possible to use the elastic films 100 and 102 that are sufficient for producing the gloves by cutting the elastic films 100 and 102 using the heating wire for cutting 44.

As illustrated in FIG. 5, a contact sensor 42a is arranged on the bottom member 30, and as illustrated in FIG. 8, a contact sensitive member 42b is arranged on the top member 10. The contact sensor 42a may be configured to sense contact of the contact sensitive member 42b, but for example, in the contact sensor 42a, an electric circuit is divided into two sections, which are connected through contact of a conductive member that is arranged on the contact sensitive member 42b so as to allow the electric current to flow.

Next, the depression 36 and the welding and cutting unit 38 are described in detail with reference to FIG. 7. The configuration of the depression 36 and the welding and cutting unit 38 is similar to any of the portions along the contour of the hand shape, but a region A1 near the little finger corresponding portion illustrated in FIG. 6 is described as an example.

Figure 7:
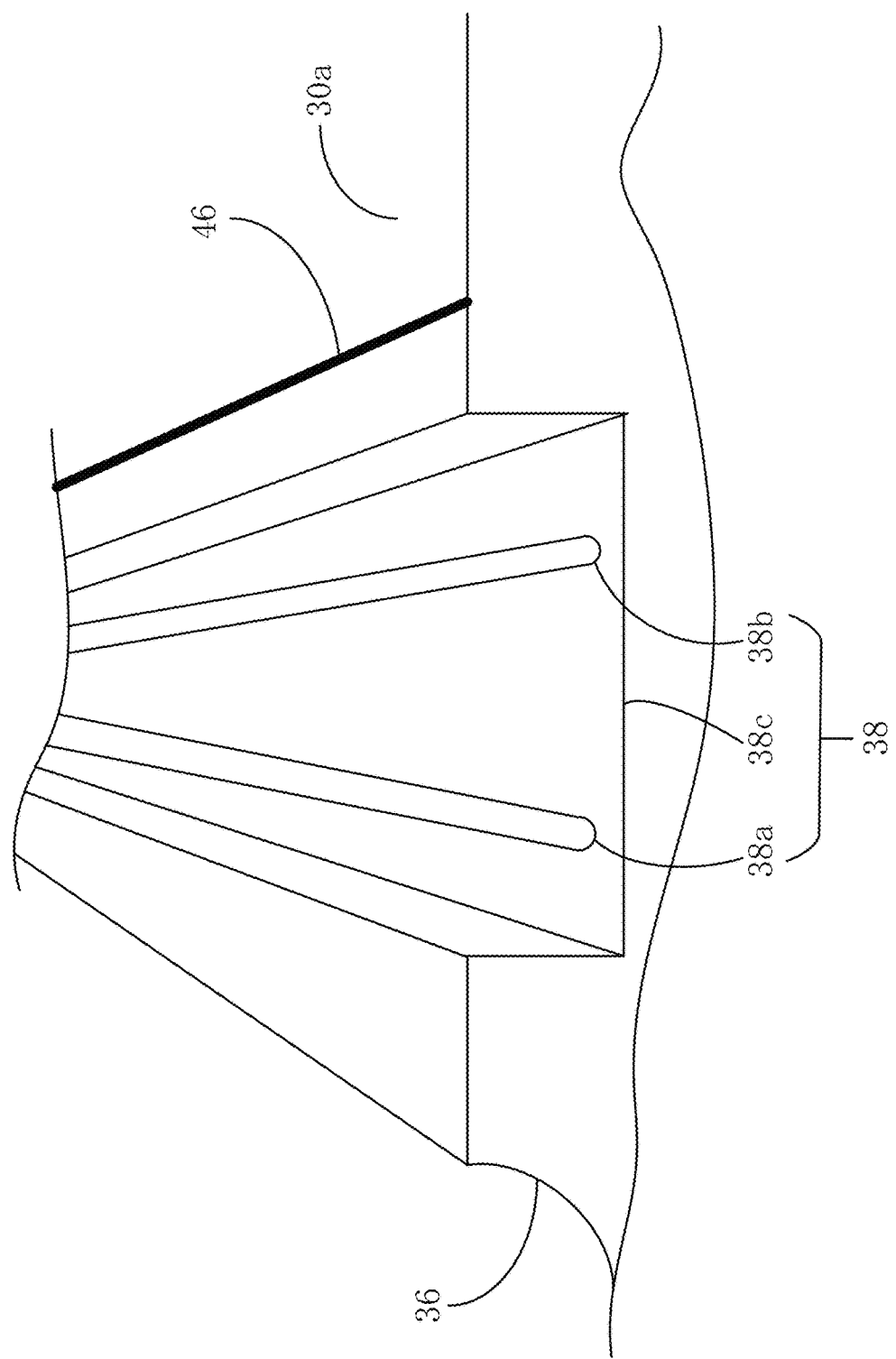
FIG. 7 is a schematic enlarged view of a portion of the bottom member.

As illustrated in FIG. 7, a slip-preventing member 46 for preventing the elastic film 102 from slipping is arranged on the top face 30a on the outer side of the depression 36. The slip-preventing member 46 is formed of a material that can prevent the elastic film 102 from slipping, for example, formed of silicone rubber. The position of the slip-preventing member 46 is a position on the top face 30a on the outer side of the groove 38c and the depression 36. In other words, the groove 38c is sandwiched between the depression 36 and the slip-preventing member 46. The slip-preventing member 46 is disposed so as to surround the groove 38c. The slip-preventing member 46 is an example of the second slip-preventing means.

As illustrated in FIG. 8, hand-shaped depressions 20 are formed on the bottom face 10d side of the top member 10. Projections 22 are formed on the outer side of the depressions 20 so as to surround the depressions 20. Each of the projections 22 is configured to enter the recessed groove 38c in the bottom member 30 when the top member 10 and the bottom member 30 come close to each other. The depression 20 is an example of a first hand holding portion. When the projection 22 enters near the bottom part of the groove 38c, the elastic film 100 and the elastic film 102 are sandwiched by the heating wire for welding 38a, the heating wire for cutting 38b, and the tip portion of the projection 22 so as to pressurize the films (hereinafter, referred to as a "pressurized state"). In the pressurized state, the elastic film 100 and the elastic film 102 are welded by the heating wire for welding 38a. Moreover, the elastic film 100 and the elastic film 102 are cut by the heating wire for cutting 38b in the pressurized state. The elastic film 100 and the elastic film 102 are welded and cut into a shape similar to the outline of the user's hand.

A functional block of the apparatus 1 is described with reference to FIG. 9. The apparatus 1 includes a central processing unit (CPU) 200, a memory unit 202, a lifting motor 204, a heating wire for welding unit 206, a heating wire for cutting unit 208, a temperature sensor 210, a top and bottom member contact sensor 212, a timer 214, a foreign substance sensor 216, and a power supply 230.

Programs and data for controlling the operation of the entire apparatus 1 are stored in the memory unit 202. The lifting motor 204 controls the rotation of the motor 13c (see FIG. 4) to control the rotation of the rotating column 80, that is, the upward and downward movement of the top member 10. The heating wire for welding unit 206 controls power supply to the heating wire for welding 38a. The heating wire for cutting unit 208 controls power supply to the heating wire for cutting 38b. The temperature sensor 210 receives a signal indicating a temperature from a temperature sensor (not illustrated) deployed in the vicinity of the heating wire for welding 38a and the heating wire for cutting 38b. The top and bottom member contact sensor 212 receives a signal indicating contact between the contact sensor 42a (see FIG. 5) deployed on the bottom member 30 and the contact sensitive member 42b (see FIG. 8) deployed on the top member 10. The timer 214 measures the time period detected by the top and bottom member contact sensor 212 during which the top member 10 and the bottom member 30 continue to be in contact with each other.

When a user arranges the elastic film 100 and the elastic film 102 on the top member 10 and the bottom member 30, respectively, and the power switch 70 is pressed, the apparatus 1 starts supplying power to the heating wire for welding 38a and the heating wire for cutting 38b by the heating wire for welding unit 206 and the heating wire for cutting unit 208, respectively. Once it is determined that the heat generated by the heating wire for welding 38a and the heating wire for cutting 38b reaches the temperature allowing welding and cutting of the elastic film 100 and the elastic film 102 based on the signal received by the temperature sensor 210, the apparatus 1 displays a text "Usable temperature is reached" indicating preparation completion on the display device 16. The top member 10 is lowered by the lifting motor 204 when the user viewing the text indicating preparation completion pushes both hands down in the depressions 36 from above the elastic film 102 so as to press the operation switch 40.

When the top and bottom member contact sensor 212 has determined that the top member 10 and the bottom member 30 are in contact with each other, the apparatus 1 controls the timer 214 to start counting time. When a predetermined time t1 elapses after the top member 10 and the bottom member 30 are in contact each other, the apparatus 1 controls the lifting motor 204 to move the top member 10 upward. The predetermined time t1 is a sufficient time period, for example, 2 seconds (s), required for welding and cutting the elastic film 100 and the elastic film 102 by the heating wire for welding 38a and the heating wire for cutting 38b.

The foreign substance sensor 216 receives a signal from the foreign substance sensor 72 (see FIG. 1).

Figure 10:
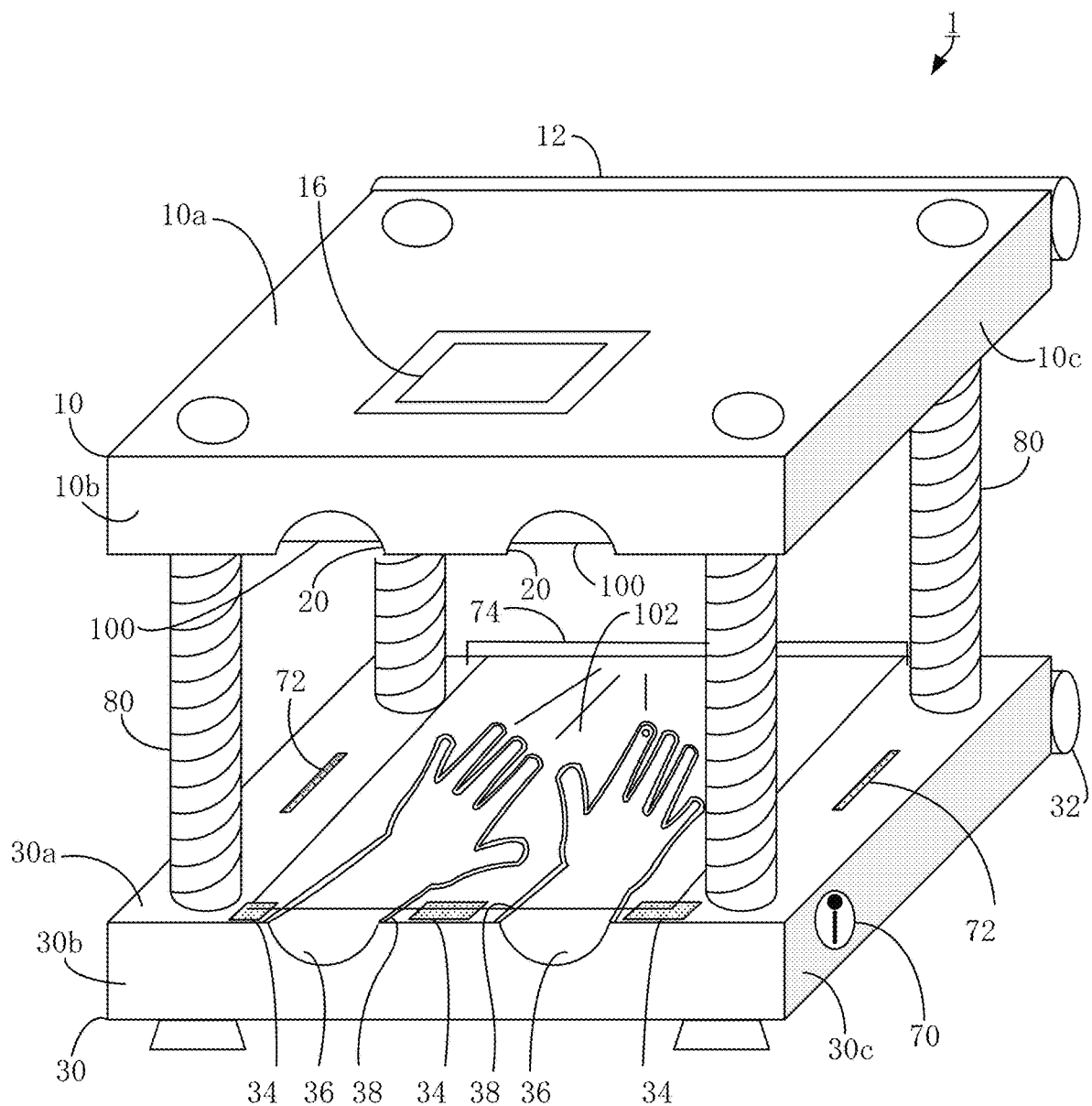
FIG. 10 is a schematic perspective view of the apparatus for producing and putting on gloves.

A method for producing and putting on gloves using the apparatus 1 is now described with reference to FIG. 10 to FIG. 15. First, as illustrated in FIG. 10, the user of the apparatus 1 pulls the elastic film 100 out from the film holder 12 past a guide 18 (see FIG. 2) along the bottom face 10d (face on the opposing side to the bottom member 30) of the top member 10 in the forward direction, and fixes the film to the film fixing part 14 (see FIG. 8). The user then pulls the elastic film 102 out from the film holder 32 past a guide 74 along the top face 30a (face on the opposing side to the top member 10) of the bottom member 30 in the forward direction, and fixes the film to the film fixing part 34.

The user then presses the power switch 70 (see FIG. 1) to activate the apparatus 1. Once it is determined that the heat generated by the heating wire for welding 38a and the heating wire for cutting 38b reaches the temperature allowing welding and cutting of the elastic films 100 and 102, the apparatus 1 displays a text "Usable temperature is reached" indicating preparation completion on the display device 16.

Figure 11:
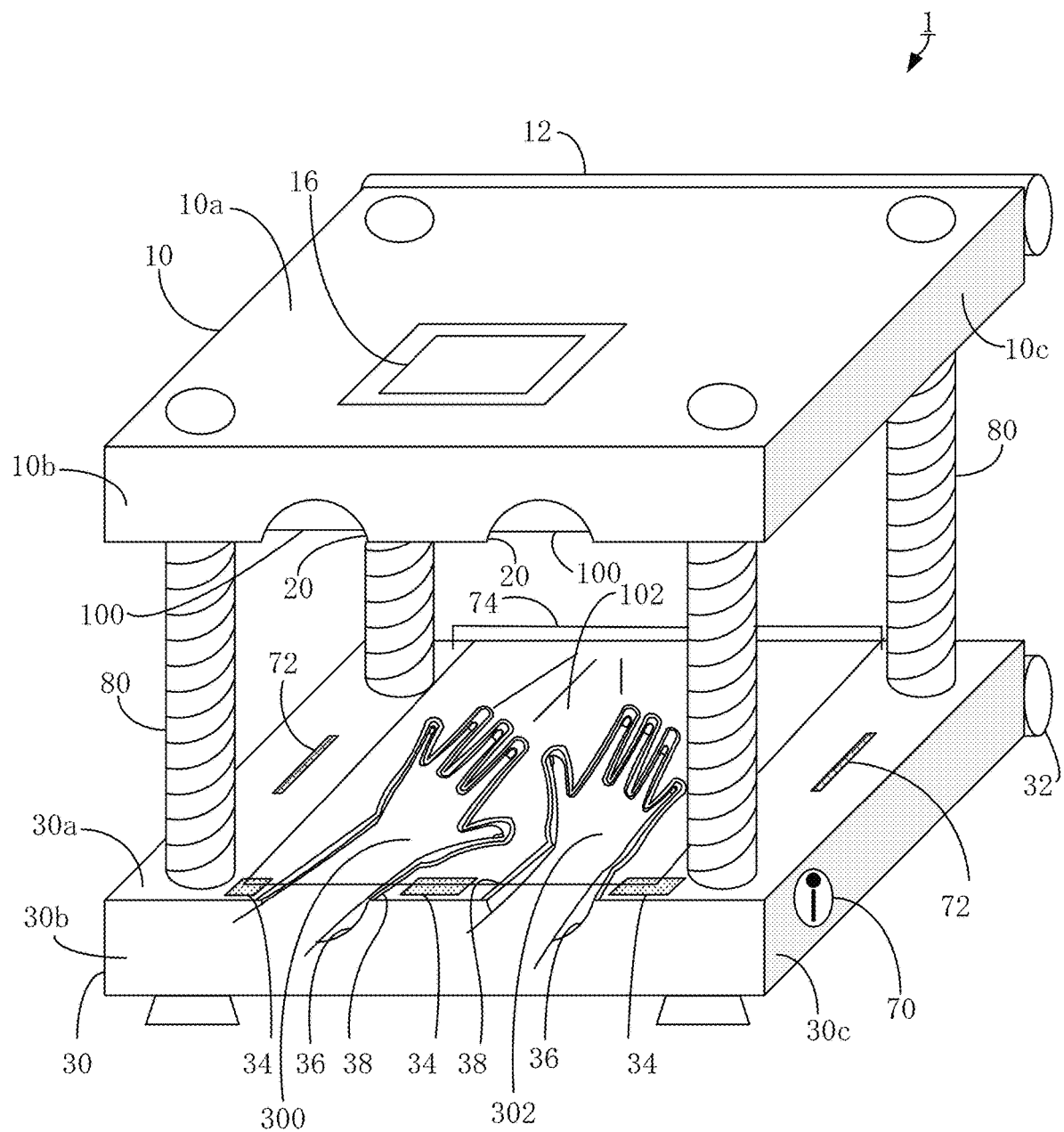
FIG. 11 is a schematic perspective view of the apparatus for producing and putting on gloves.

The user then places both hands on the elastic film 102 and pushes the hands into the depressions 36, as illustrated in FIG. 11. Through this operation, the elastic film 102 is transformed into the shape of the user's palms.

Figure 12:
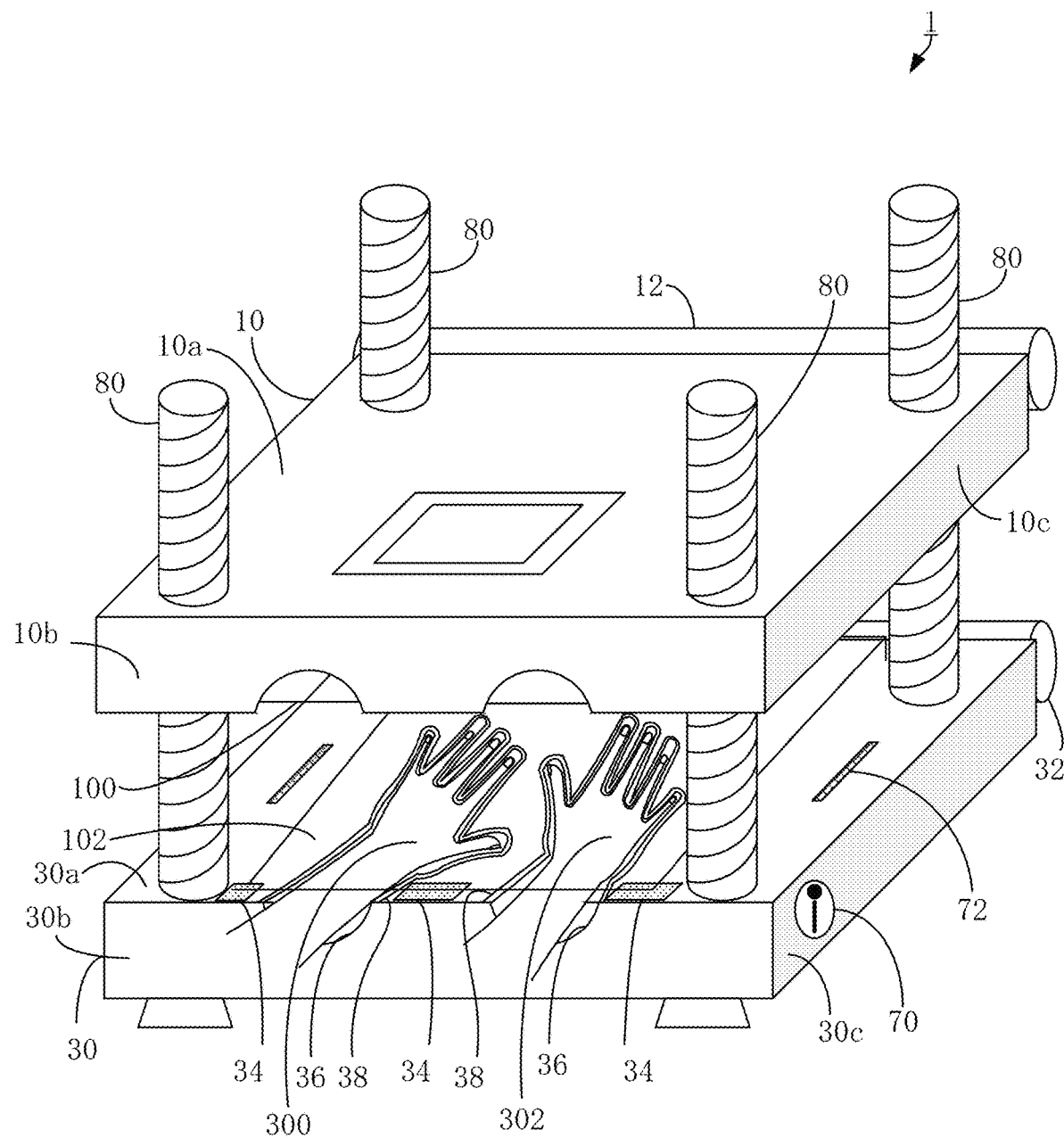
FIG. 12 is a schematic perspective view of the apparatus for producing and putting on gloves.
Figure 13:
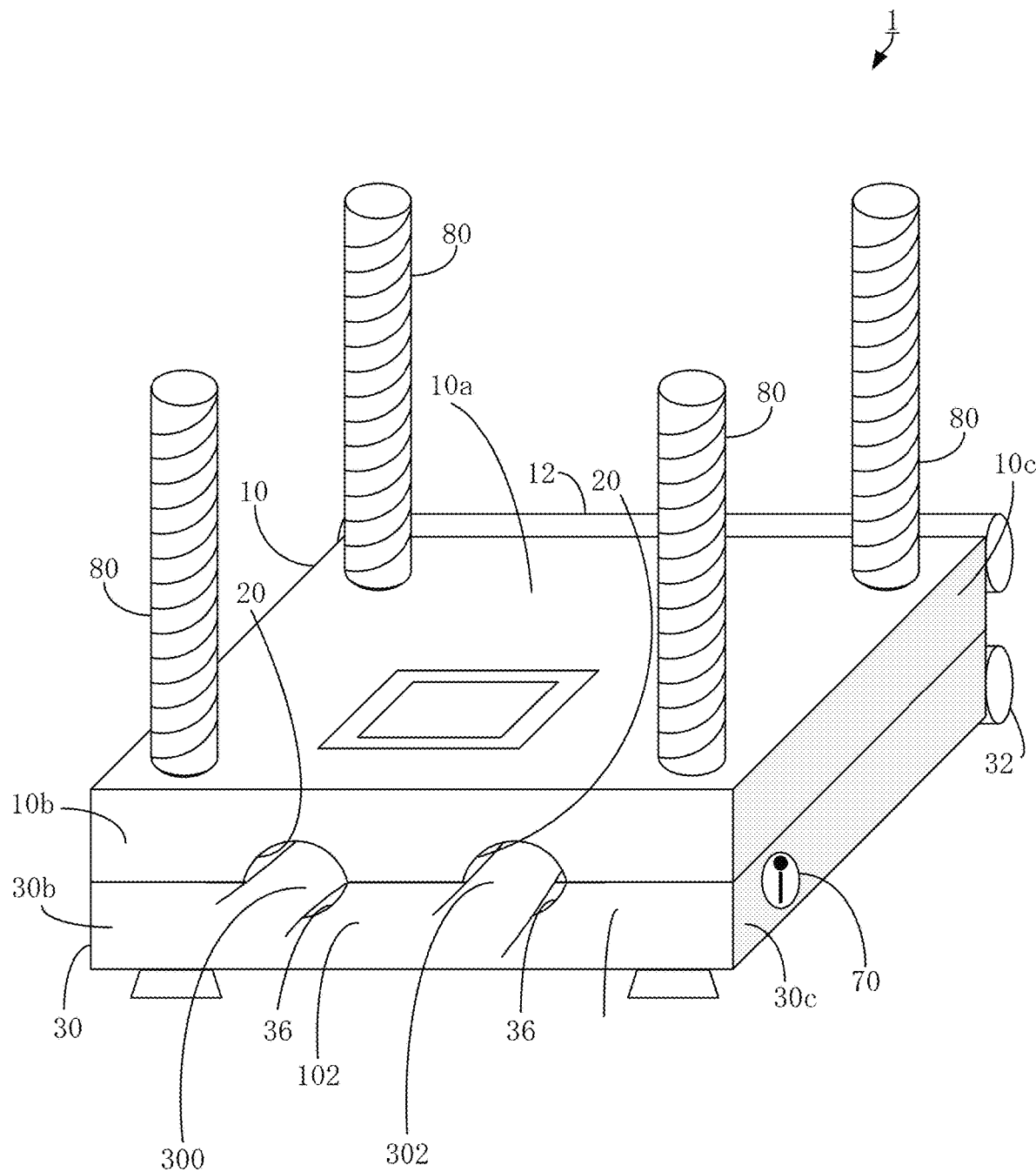
FIG. 13 is a schematic perspective view of the apparatus for producing and putting on gloves.
Figure 14:
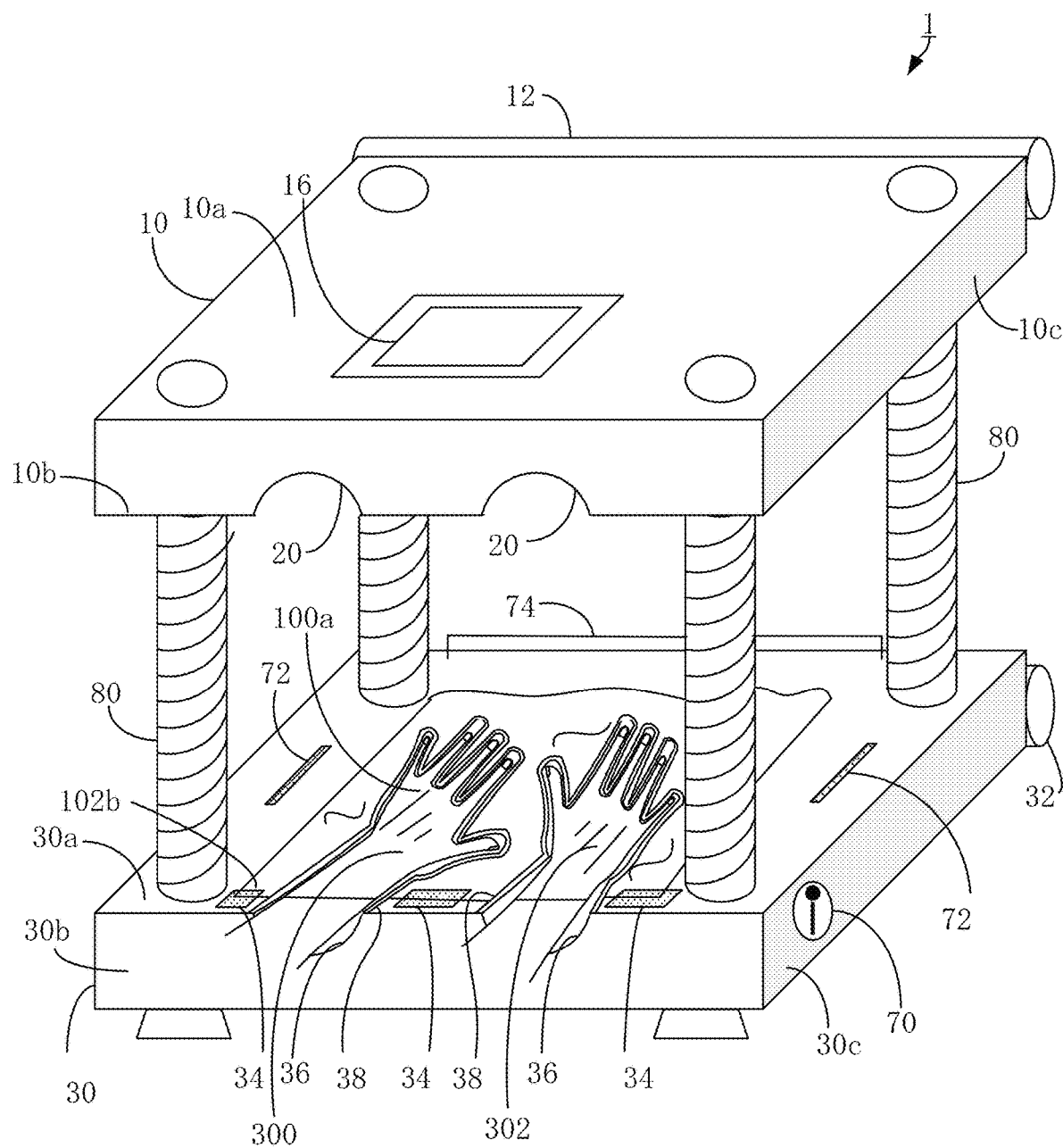
FIG. 14 is a schematic perspective view of the apparatus for producing and putting on gloves.

When the operation switch 40 (see FIG. 6) is pressed in this state, the top member 10 moves downward toward the bottom member 30, as illustrated in FIG. 12. The bottom face 10d of the top member 10 makes contact with the top face 30a of the bottom member 30, and the hands are housed in the spaces formed by the depressions 20 of the top member 10 and the depressions 36 of the bottom member 30, as illustrated in FIG. 13. More specifically, in the state of the user's hands being sandwiched between the top member 10 and the bottom member 30, one face of each of the hands (back side face) is in contact with the elastic film 100, the other face of each of the hands (palm side face) is in contact with the elastic film 102, thereby housing the user's hands in the space formed by the depressions 20 and the depressions 36.

In the process of the top member 10 moving downward along with the elastic film 100, the elastic film 100 is transformed into the shape of the back side of the user's hands. Once the predetermined time t1 has elapsed in the state where the top member 10 and the bottom member 30 are in contact with each other, the top member 10 moves upward (see FIG. 14). The elastic film 100 and the elastic film 102 are welded and cut at the point of time when the predetermined time t1 has elapsed. After the elastic film 100 and the elastic film 102 are cut into the glove shape, the films are separated into portions forming the gloves, and portions not forming the gloves. The portions forming the gloves are an elastic film 100a and an elastic film 102a, and the portions not forming the gloves are unnecessary portions 100b and 102b.

When the top member 10 moves upward, as illustrated in FIGS. 15(A) and 15(B), the elastic film 100a and the elastic film 102a are adhered to the user's hands due to the elastic resilience thereof, and the glove 400 is produced and put on the right hand 302. For the left hand 300, the glove 400 is produced and put on in the same manner.

Figure 16:
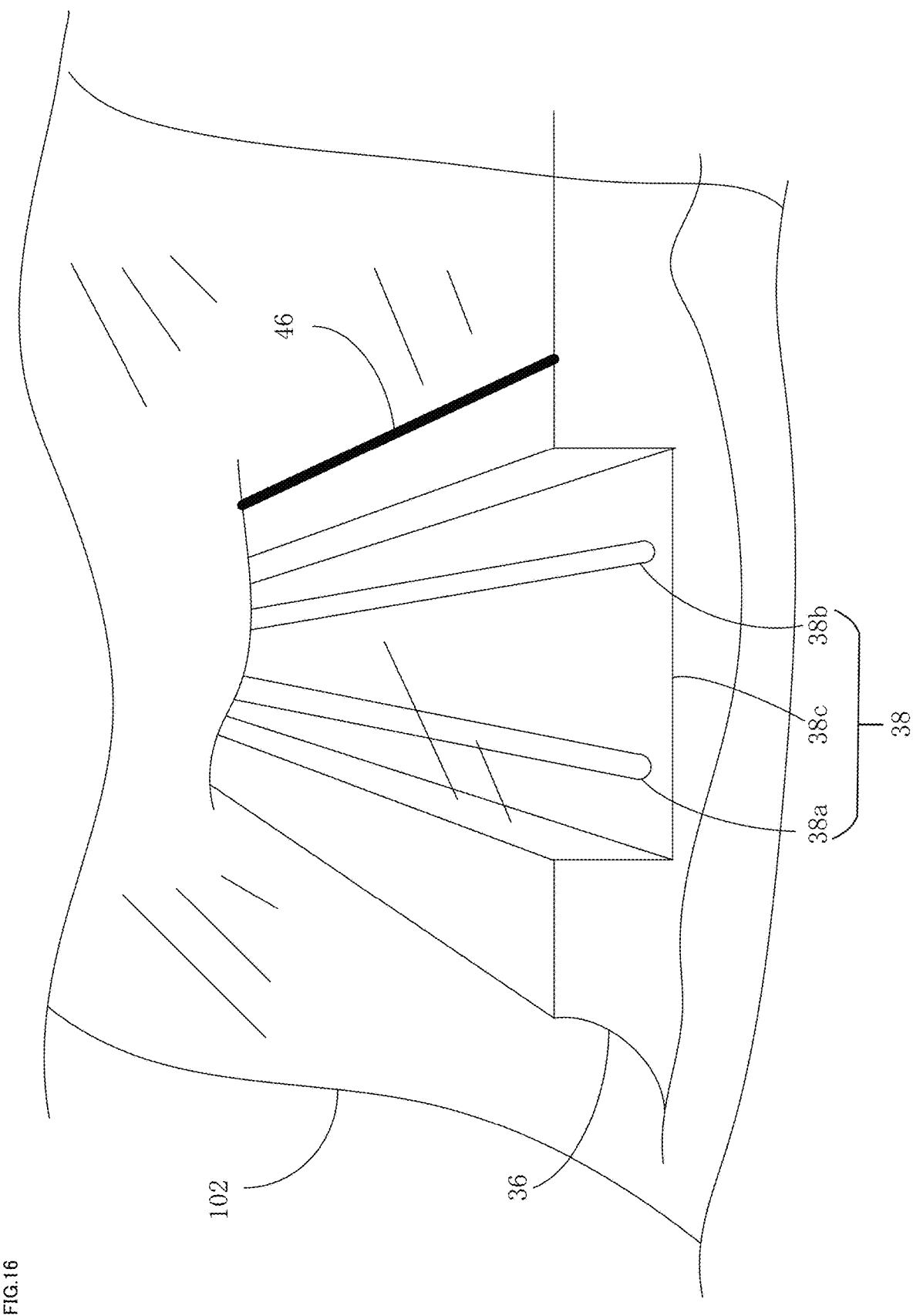
FIG. 16 is a schematic enlarged view of a portion of the bottom member.

The process of the elastic film 100 and the elastic film 102 transforming into the hand shape is described below in detail with reference to FIG. 16 to FIG. 23. As illustrated in FIG. 16, when the elastic film 102 is arranged on the bottom member 30, the elastic film 102 makes contact with the slip-preventing member 46.

Figure 17:
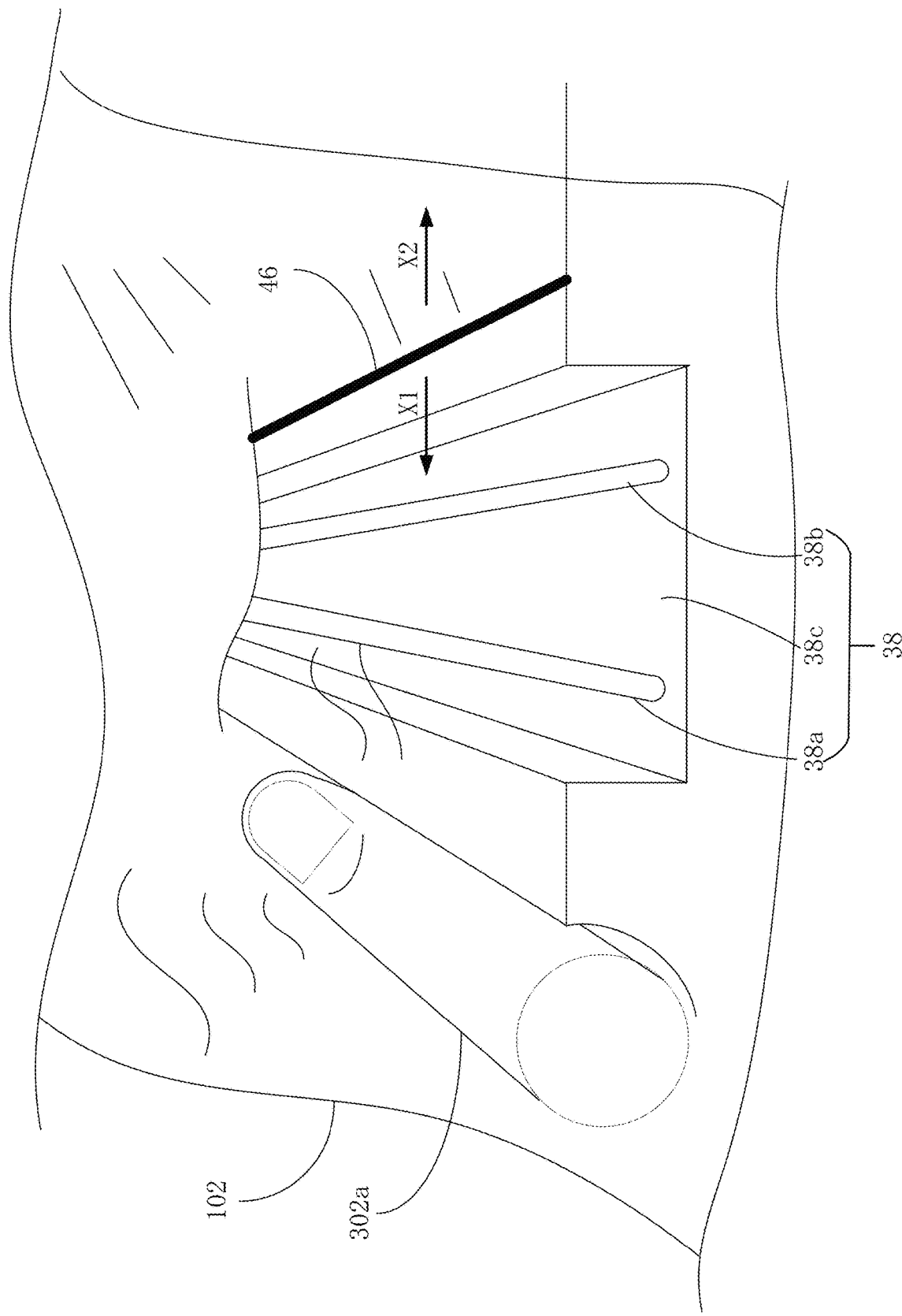
FIG. 17 is a schematic enlarged view of a portion of the bottom member.

When the elastic film 102 is pushed into the depression 36 by the little finger 302a as illustrated in FIG. 17, a portion of the elastic film 102 positioned on the left side of the slip-preventing member 46, namely, in the direction of arrow X1 is elastically transformed by the pressure of the little finger 302a. On the other hand, a portion of the elastic film 102 positioned on the right side of the slip-preventing member 46, namely, in the direction of arrow X2 is not affected by the pressure of the little finger 302a being pushed, and is not transformed. That is, as a technical effect of the slip-preventing member 46, the portion on the right side of the slip-preventing member 46 is not transformed, and only the portion on the left side, that is, a portion on the little finger 302a side is elastically transformed according to the shape of the little finger 302a. Accordingly, it is possible to generate sufficient elastic resilience in the final process of producing and putting on the gloves.

When the elastic film 102 is pushed into the depression 36 by the little finger 302a, the elastic film 102 is pushed into the depression 36 by the other fingers and the palm as well. When the user presses the operation switch 40 in such a state, the top member 10 moves downward along with the elastic film 100 as illustrated in FIG. 18. The projection 22 is formed in the bottom face 10d of the top member 10 so as to surround the depression 20. The projection 22 is configured to engage with the groove 38c of the bottom member 30. The slip-preventing member 24 for preventing slippage of the elastic film 100 is arranged around the outer side of the projection 22 (opposing side to the depression 20) in the bottom face 10d. The position of the slip-preventing member 24 is a position on the bottom face 10d on the outer side of the projection 22 and the depression 20. In other words, the projection 22 is sandwiched between the depression 20 and the slip-preventing member 24. The slip-preventing member 24 is formed of a material capable of preventing slippage of the elastic film 100, for example, silicone rubber.

Figure 19:
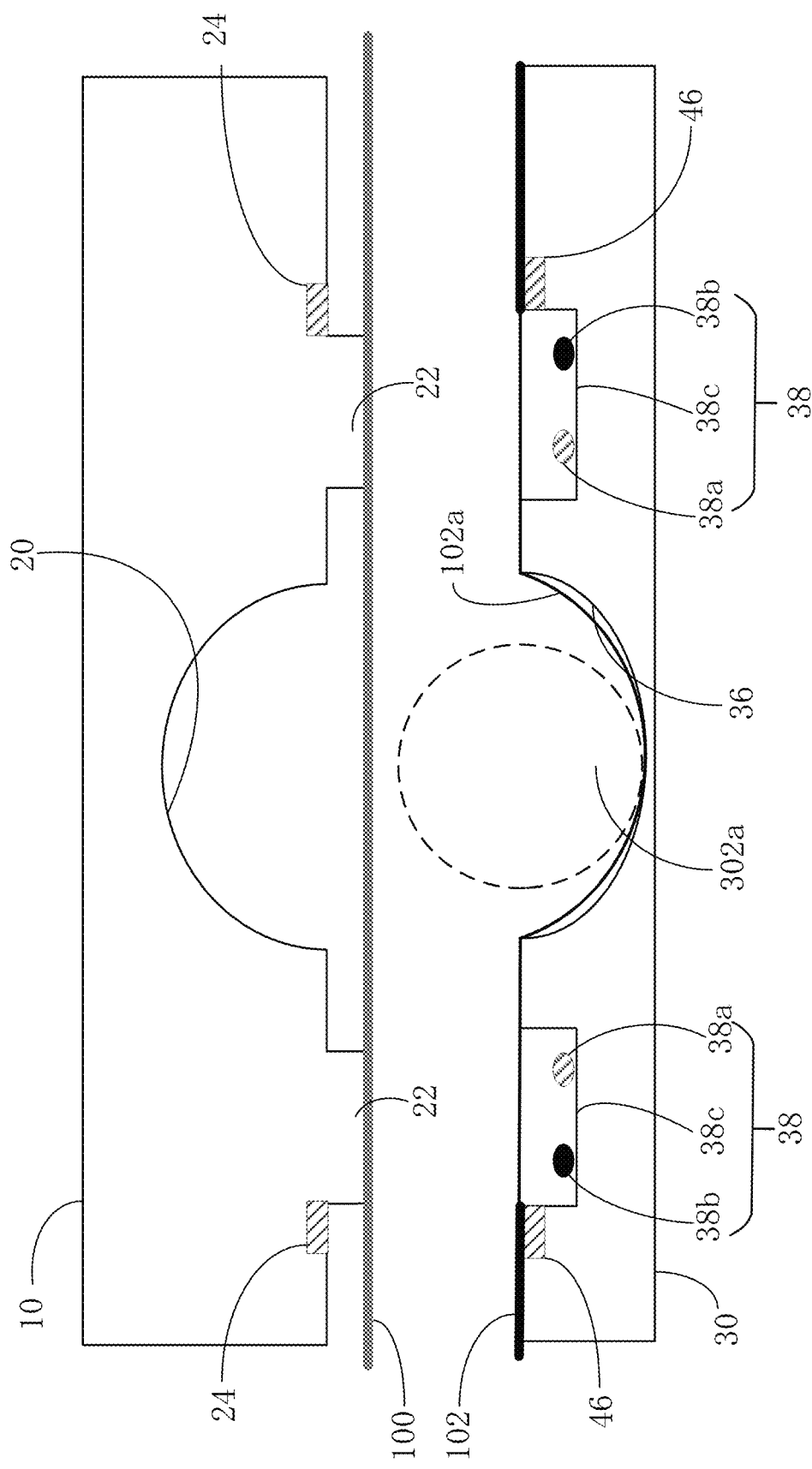
FIG. 19 is a schematic conceptual diagram of a portion of the bottom member and the top member.

The state in which the top member 10 moves toward the bottom member 30 is described below with reference to the conceptual diagrams of FIGS. 19 to 23. FIG. 19 and the like conceptually show a schematic cross-section cut in a direction perpendicular to the direction of pulling out the elastic films 100 and 102. The state in FIG. 19 is similar to the state in FIG. 18, where a portion of the elastic film 102 arranged on the bottom member 30 positioned in the direction of the little finger 302a from the slip-preventing member 46 is elastically transformed because of being pressed by the little finger 302a. In contrast, the elastic film 100 arranged on the top member 10 is not transformed.

Figure 20:
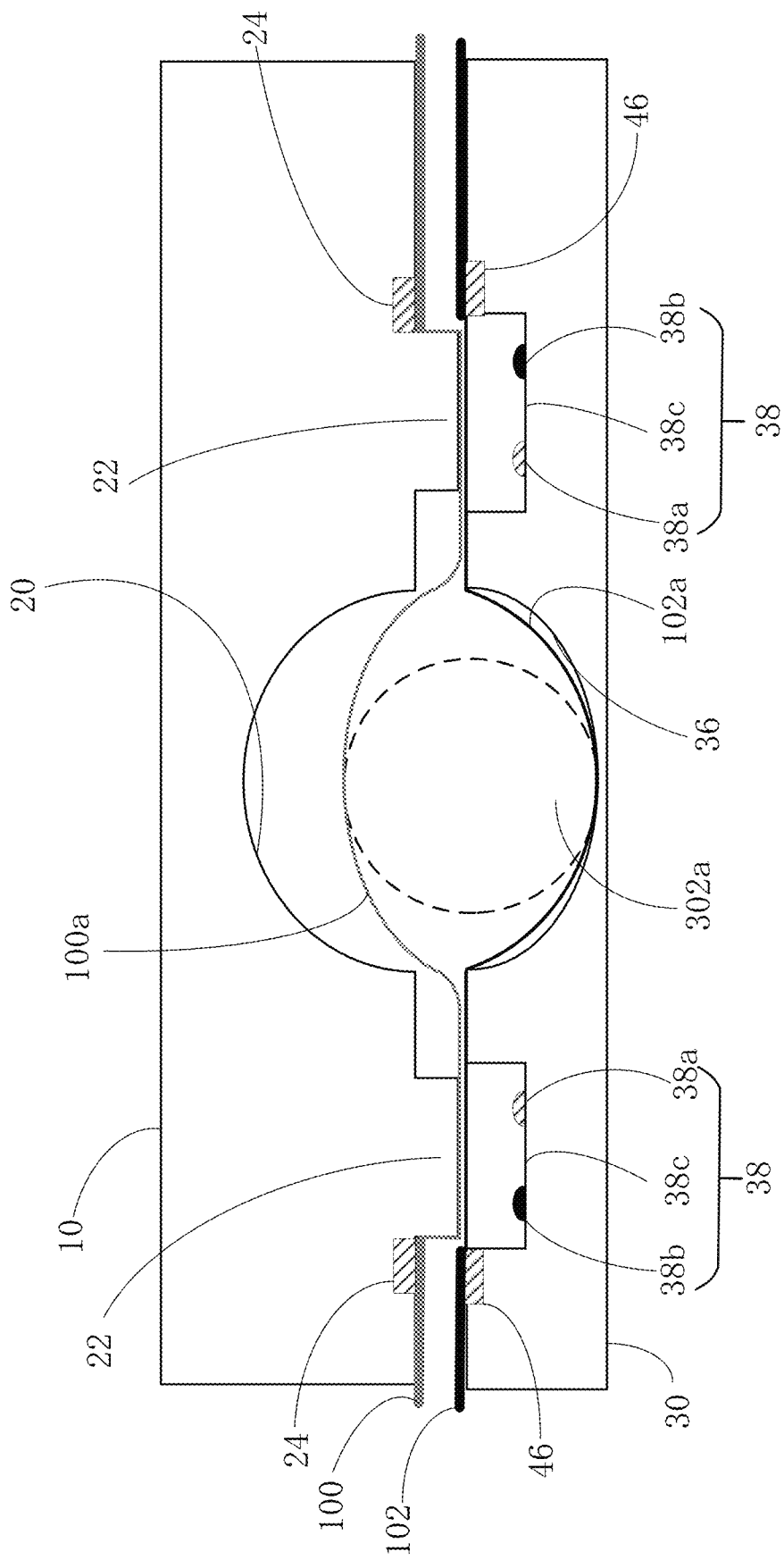
FIG. 20 is a schematic conceptual diagram of a portion of the bottom member and the top member.

As illustrated in FIG. 20, when the tips of the projections 22 of the top member 10 descend to a position lower than the position of the upper edge of the little finger 302a, the elastic film 100 is elastically transformed due to the presence of the little finger 302a. Only a portion of the elastic film 100 positioned in the direction of the little finger 302a is elastically transformed around the slip-preventing member 24 as a reference.

Figure 21:
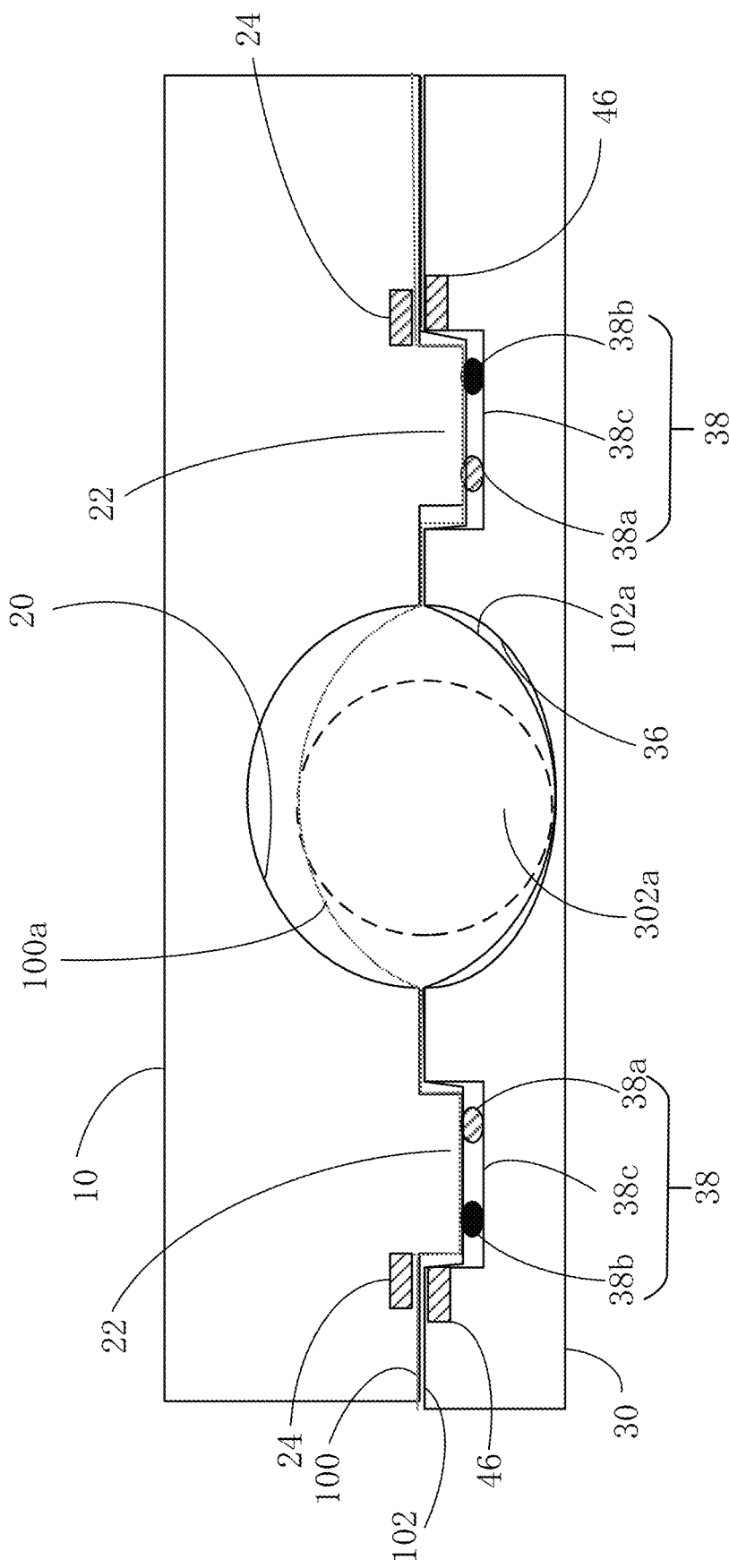
FIG. 21 is a schematic conceptual diagram of a portion of the bottom member and the top member.

When the top member 10 further descends, the projections 22 enter the grooves 38c, sandwiching the elastic film 100 and the elastic film 102 between the tips of the projections 22 and the heating wire for welding 38a and the heating wire for cutting 38b, and pressing the films (pressurized state), as illustrated in FIG. 21. In this case, the contact sensor 42a of the bottom member 30 is configured to make contact with the contact sensitive member 42b of the top member 10. In other words, it is possible for the contact sensor 42a to determine whether or not it is in the pressurized state.

Figure 22:
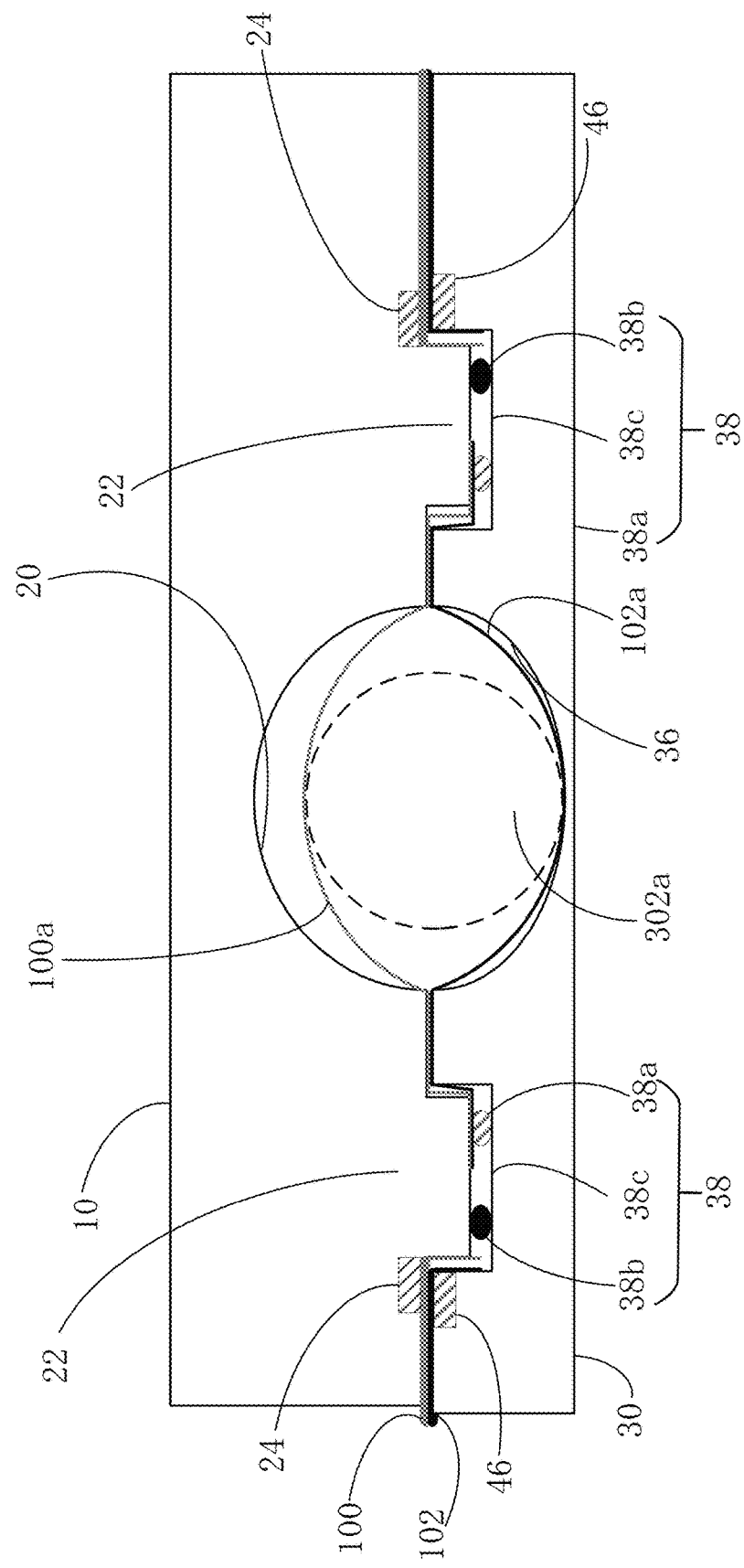
FIG. 22 is a schematic conceptual diagram of a portion of the bottom member and the top member.

When the predetermined time t1 has elapsed in the state of FIG. 21, the elastic film 100 and the elastic film 102 are cut by the heating wire for cutting 38b, as illustrated in FIG. 22. In this case, the elastic film 100a and the elastic film 102a for forming the gloves are heated by the heating wire for welding 38a and welded to each other.

Figure 23:
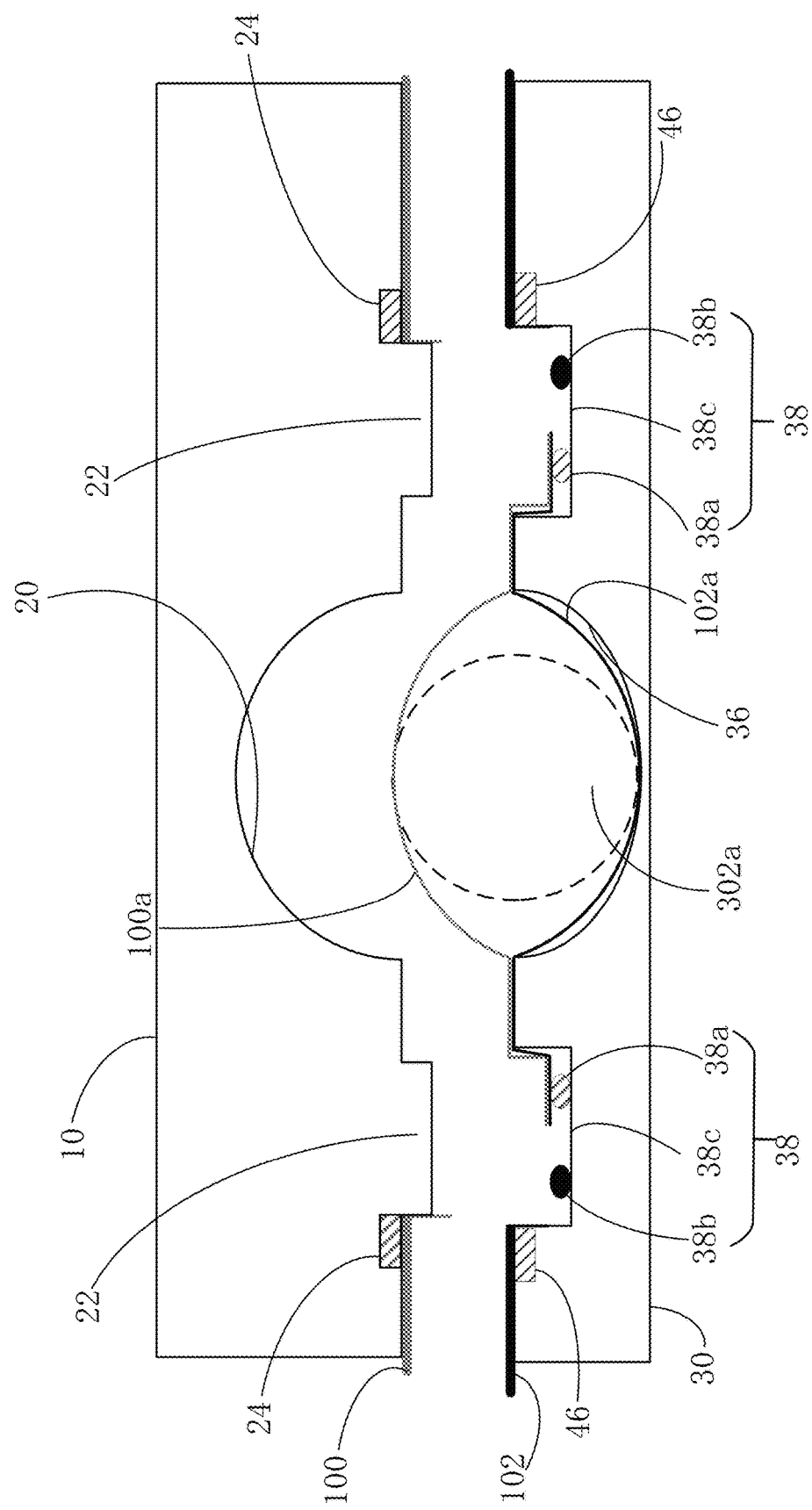
FIG. 23 is a schematic conceptual diagram of a portion of the bottom member and the top member.

Once a predetermined time has elapsed from the state of FIG. 21, processing proceeds to the state in FIG. 22, and once in the state of FIG. 22, the top member 10 moves upward as illustrated in FIG. 23. In this case, the power supply to the heating wire for welding 38a and the heating wire for cutting 38b is stopped. When the top member 10 moves upward, the elastic films 100a and 102a are released from the pressurized state and become freely transformable. In the pressurized state, the elastic resilience acts on the elastic film 100a and the elastic film 102a as indicated by arrows B1 to B4 in FIG. 24(A). When the top member 10 moves upward, the pressurized state is released, the elastic film 100a and the elastic film 102a become freely transformable, and the films are thus transformed so as to adhere to the little finger 302a as illustrated in FIG. 24(B).

Figure 25:
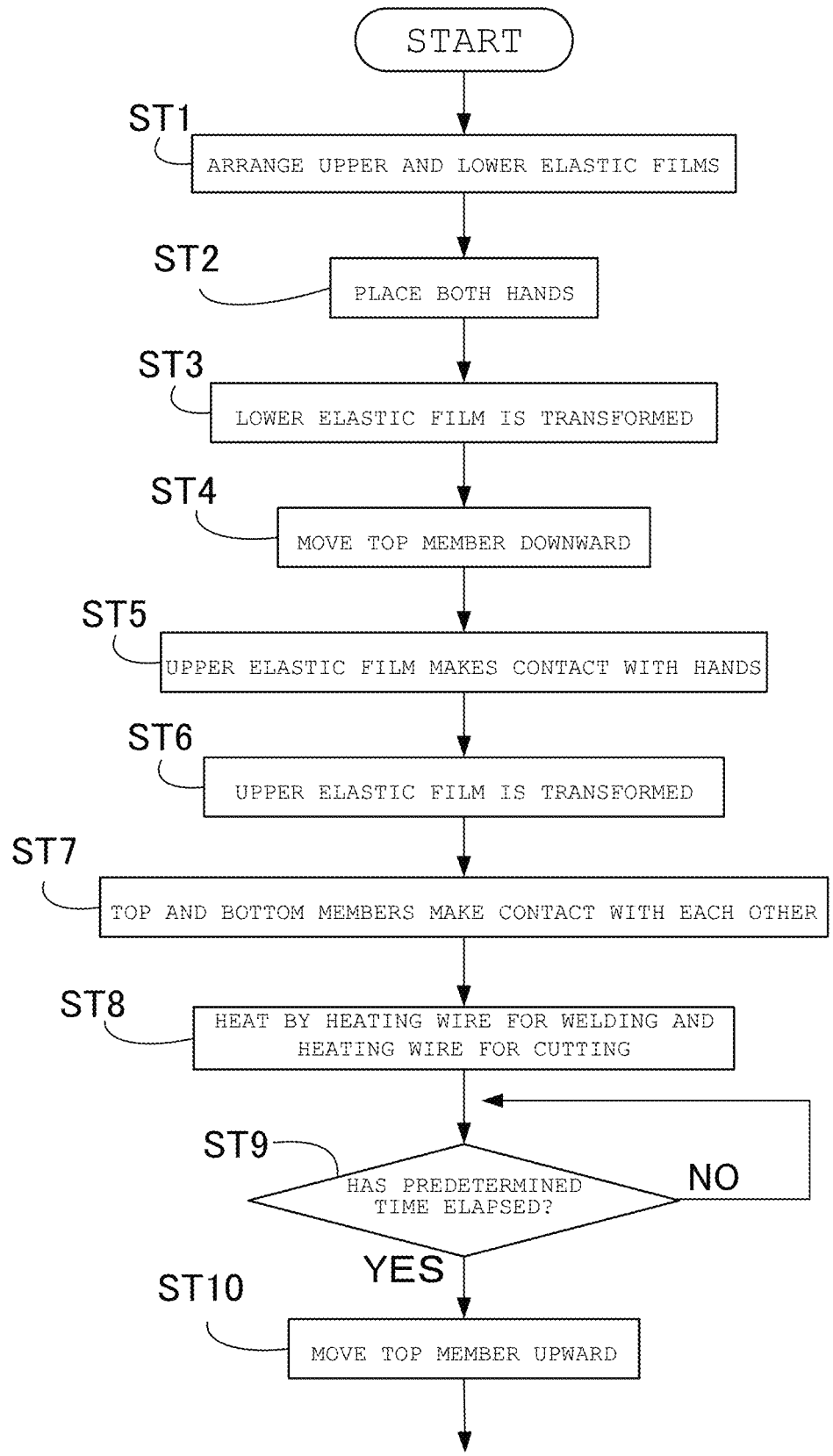
FIG. 25 is a flowchart showing a method for producing and putting on gloves.
Figure 26:
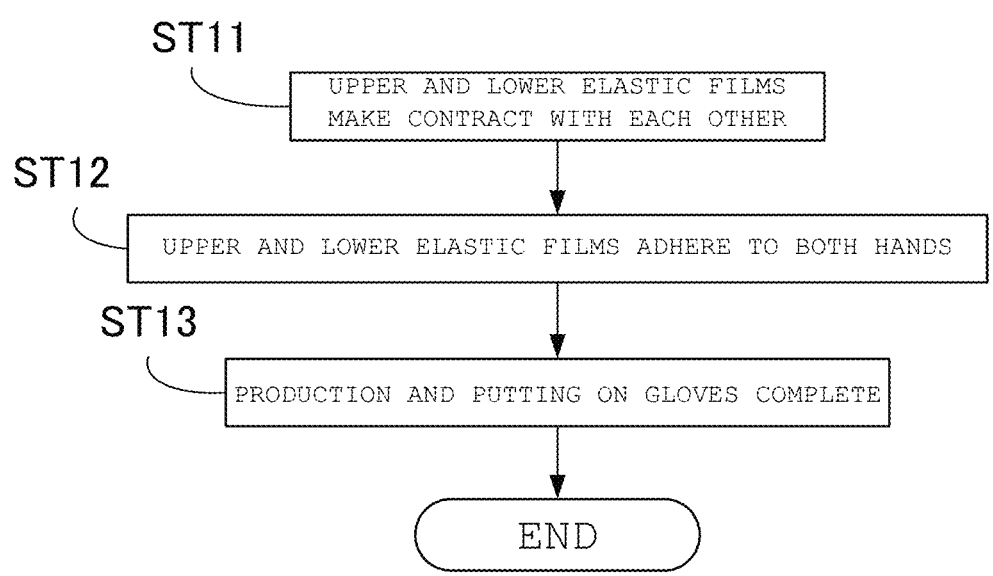
FIG. 26 is a flowchart showing a method for producing and putting on gloves.

The method for producing and putting on gloves by the apparatus 1 is now summarized with reference to the flowcharts of FIG. 25 and FIG. 26. The user arranges the elastic film 100 on the top member 10, arranges the elastic film 102 on the bottom member 30 (step ST1 in FIG. 25), and presses the power switch 70 to activate the apparatus 1. After confirmation of preparation completion for heating by the heating wire for welding 38a and the heating wire for cutting 38b through the display on the display device 16, the user places both hands in the two depressions 36 of the bottom member 30 from the upper side of the elastic film 102 (step ST2). The lower elastic film 102 is then transformed (step ST3).

When the operation switch 40 is then pressed by the user, the apparatus 1 controls the top member 10 to move downward (step ST4). Step ST4 is an example of the moving step. When the top member 10 moves downward, the elastic film 100 arranged on the top member 10 makes contact with the back side of the hand (step ST5) and is transformed (step ST6). The top member 10 and the bottom member 30 then make contact with each other (step ST7), the elastic films 100 and 102 are pressurized and heated by the projections 22, the heating wire for welding 38a, and the heating wire for cutting 38b (step ST8). Step ST8 is an example of the welding and cutting step.

Once it is determined that the predetermined time t1 sufficient for welding and cutting has elapsed (step ST9), the apparatus 1 controls the top member 10 to move upward (step ST10). Once the predetermined time t1 has elapsed, the elastic films 100 and 102 are welded and cut into the shape of the hand contour.

When the user releases both hands from the bottom member 30, the elastic films 100 and 102 contract (step ST11), adhere to the hands (step ST12), and produce gloves and put them on the hands (step ST13).

Second Embodiment

A second embodiment is described with reference to FIG. 27. Note that description of matters in common with the first embodiment is omitted. The configuration of the apparatus 1 of the second embodiment is similar to that of the first embodiment, except that the elastic resilience of the elastic film 100 is greater than that of the elastic film 102. Accordingly, immediately after completion of the welding and cutting step of the elastic films 100 and 102, as illustrated in FIG. 27(A), the relatively large elastic resilience B1+ and B2+ act on the elastic film 100a, and the relatively small elastic resilience B3 and B4 act on the elastic film 102a.

When the elastic films 100a and 102a are released from the pressurized state and become freely transformable, as illustrated in FIG. 27(B), the elastic films 100a and 102a are transformed so as to adhere to the little finger 302a; however, since the elastic resilience of the elastic film 100a is greater than that of the elastic film 102a, connecting parts S of the elastic films 100a and 102a move to the upper side of the little finger 302a, that is, the finger back side (fingernail side). While almost all of the operations carried out by hands is performed by the finger pad side (fingerprint side) making contact with an object, it is possible to prevent the connecting part S from becoming an obstacle in the operation performed by the finger pad side since the connecting parts S move to the finger back side.

Due to the difference in the elastic resilience of the elastic film 100a and the elastic film 102a, welding parts 51 of the elastic film 100a and the elastic film 102a curve to the elastic film 100a side, that is, the back side of the little finger 302a, as illustrated in FIG. 27(B). This further effectively prevents the welding parts 51 from becoming obstacles in the operation performed on the pad side of the user's little finger 302a. Describing the glove produced as described above, the glove includes an elastic film 100a and an elastic film 102a formed in the shape of the hands, wherein the elastic film 100a and the elastic film 102a are welded at the peripheral edges other than the portion in contact with the user's wrist, and the elastic resilience of the elastic film 100a is greater than the elastic resilience of the elastic film 102a.

Third Embodiment

Figure 28:
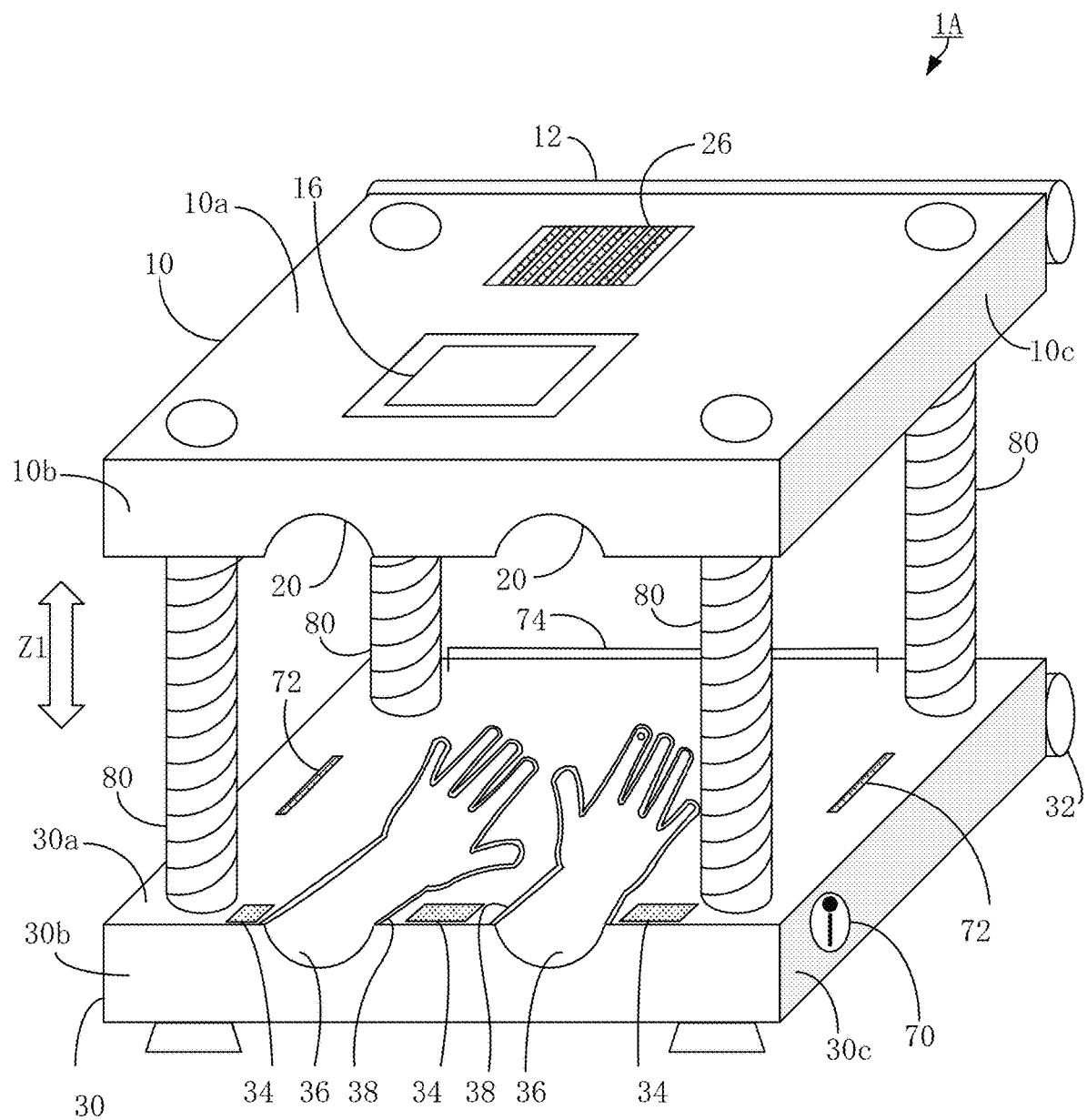
FIG. 28 is a schematic perspective view of an apparatus for producing and putting on gloves according to a third embodiment.
Figure 29:
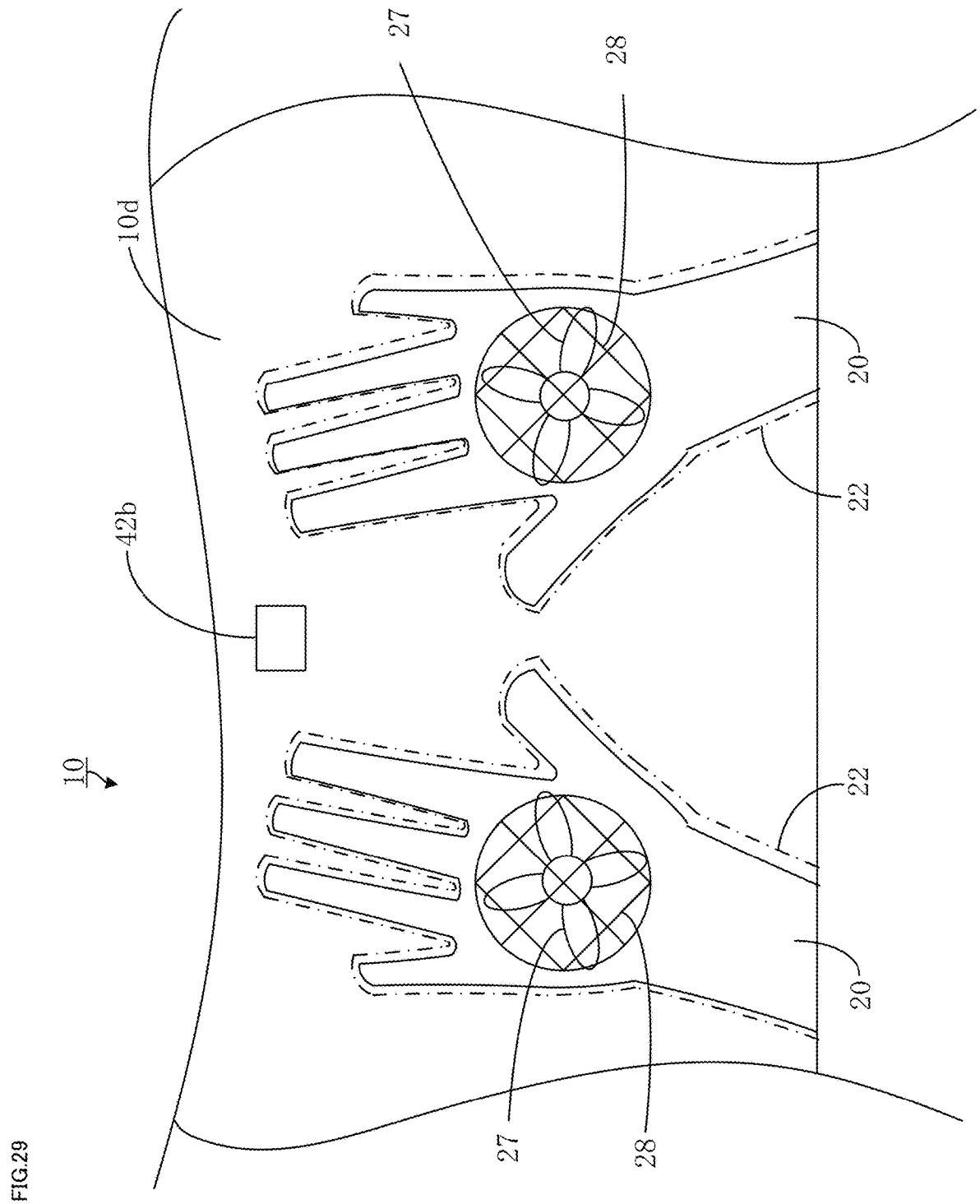
FIG. 29 is a schematic view of a portion of a top member.

The third embodiment will be described with reference to FIGS. 28 to 33. Note that description of matters in common with the first embodiment is omitted. As illustrated in FIG. 28, an air intake port 26 is arranged on the top member 10 of an apparatus 1A for taking the outside air into the top member 10. When the bottom face 10d of the top member 10 is viewed from the direction of the bottom member 30, as illustrated in FIG. 29, air blowing devices 27 and mesh heat generation members 28 are deployed respectively in the depressions 20.

Figure 30:
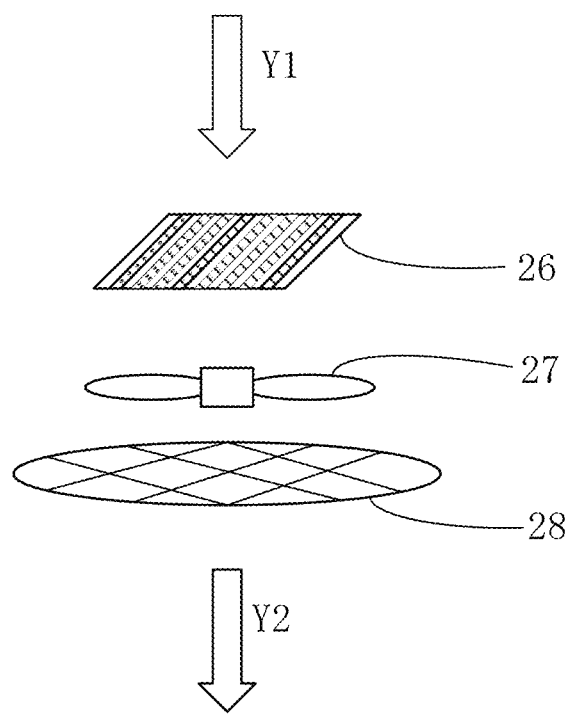
FIG. 30 is a schematic conceptual diagram of a portion of the top member.

The heat generation member 28 is configured from a nichrome wire, for example. The air blowing device 27 is configured such that a fan having a plurality of blades is connected to a rotational axis of a motor. FIG. 30 is a schematic view illustrating a positional relationship of the air intake port 26, the air blowing device 27, and the heat generation member 28. As illustrated in FIG. 30, when the blades of the air blowing device 27 rotate, air is taken from the outside via the air intake port 26 as indicated by an arrow Y1, passes through the heat generation member 28 during heat generation, being heated to become hot air, and is transmitted downward, as indicated by an arrow Y2. In the apparatus 1A, a film having heat shrinkable properties (hereinafter, referred to as a "heat shrinkable film") is used for the elastic film 100. The material of the heat shrinkable film is, for example, polyvinyl chloride, polystyrene, polyethylene terephthalate, polyethylene, polypropylene, or polyolefin. The elastic film 100 is formed of a single layer that is made from such materials or a multi-layer combined with other elastic films. The other elastic films are, for example, low density polyethylene films, cast polypropylene films, oriented polypropylene films, ethylene-vinyl acetate copolymer films, and the like. Adjustments such as selection of the materials of the elastic film 100 and the elastic film 102, and adoption of the configuration of the elastic films such as a multi-layer structure and the like are carried out to ensure welding properties of the elastic films.

Figure 31:
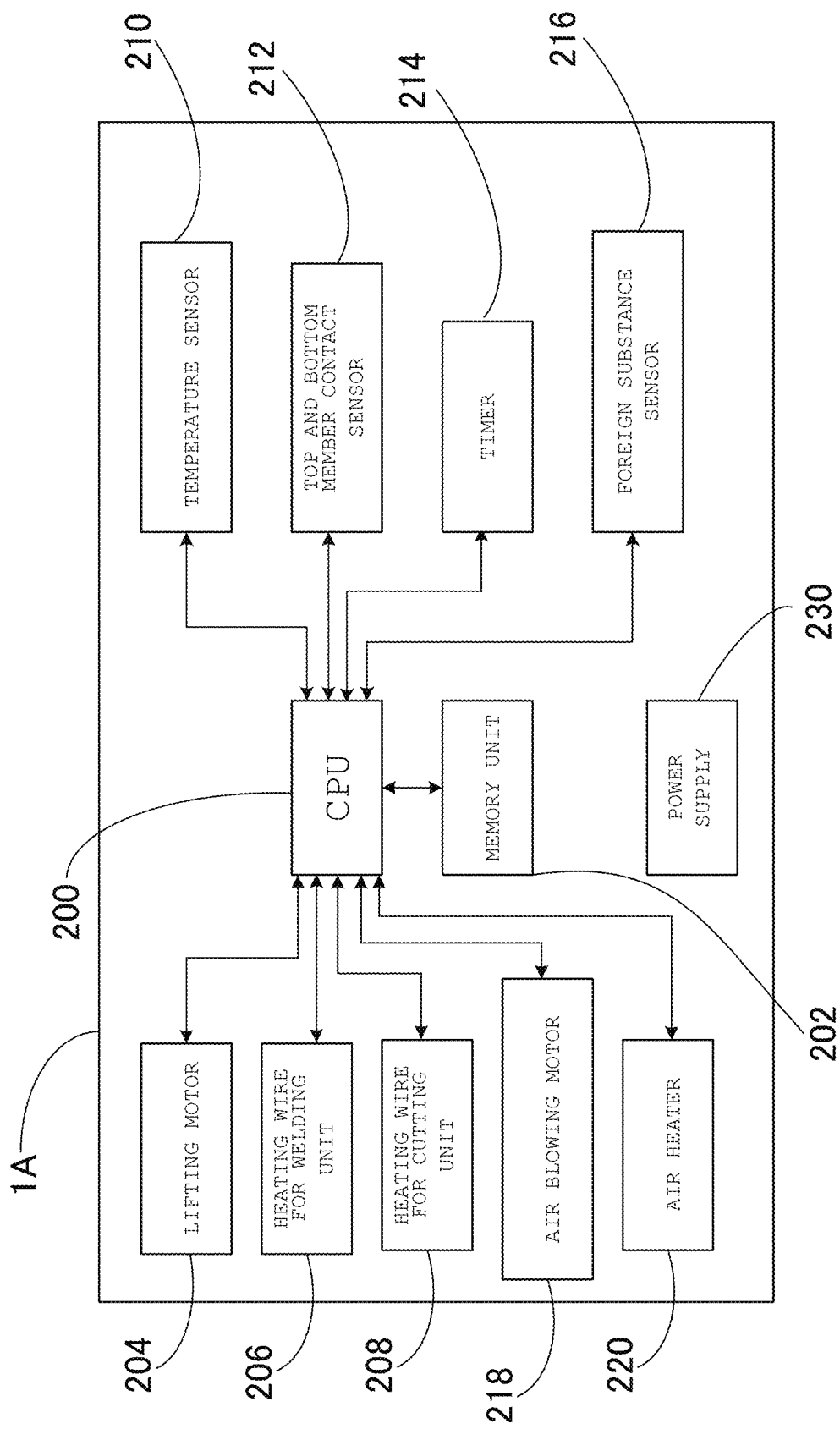
FIG. 31 is a schematic block diagram illustrating a functional configuration of the apparatus for producing and putting on gloves.

As illustrated in FIG. 31, the apparatus 1A includes an air blowing motor 218 and an air heater 220. The air blowing motor 218 controls rotation of the motor of the air blowing device 27. The air heater 220 controls power supply to the heat generation member 28.

Figure 32:
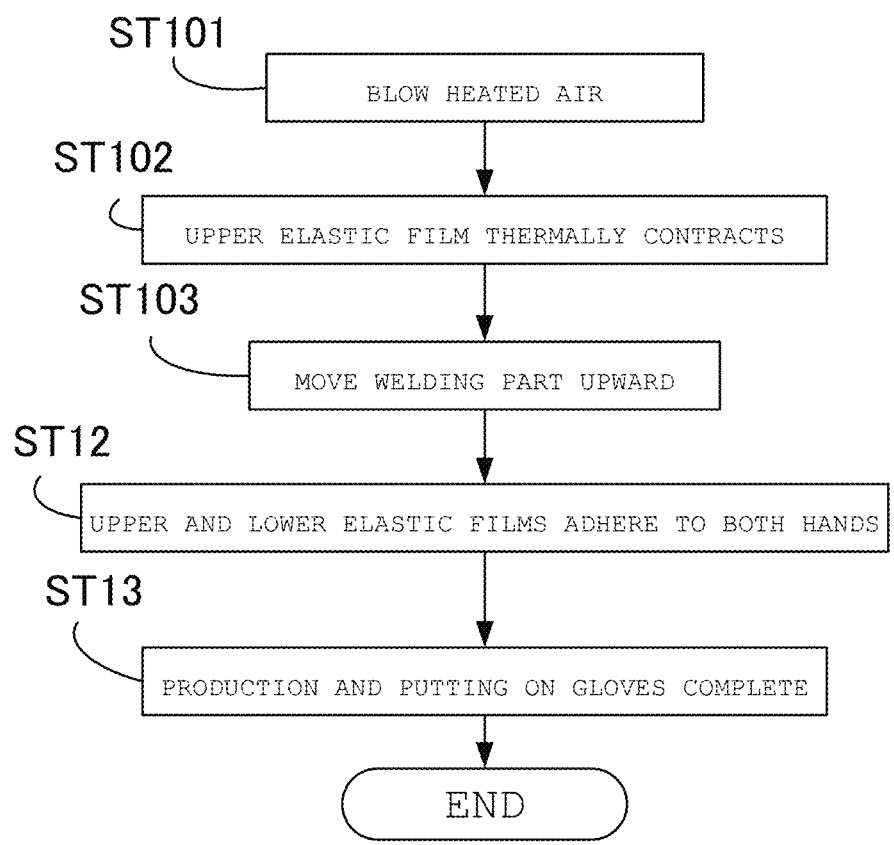
FIG. 32 is a flowchart showing a method for producing and putting on gloves.

A method for producing and putting on gloves by the apparatus 1A will now be described with reference to FIG. 32. The processes up to the welding and cutting step of the elastic film 100 and the elastic film 102 are similar to those of the first embodiment, and thus the descriptions thereof are omitted. When welding and cutting of the elastic film 100 and the elastic film 102 are completed, the apparatus 1A controls the top member 10 to move upward so as to blow heated air against the elastic film 100 (step ST101 in FIG. 32). The elastic film 100 thermally contracts (step ST102) as it is a heat shrinkable film. Then, the connecting parts S of the elastic film 100 and the elastic film 102 move upward (step ST103) while the elastic film 100 and the elastic film 102 adhere to the hands (step ST12), thereby completing the gloves (step ST13).

Immediately after completion of the welding and cutting step of the elastic films 100 and 102, the elastic resilience B1 and B2 act on the elastic film 100a, and the elastic resilience B3 and B4 act on the elastic film 102a, as illustrated in FIG. 33(A).

Once the top member 10 moves upward and the heated air is blown against the elastic film 100a, the contractive forces B1α and B2α act on the elastic film 100a as well. Then, as illustrated in FIG. 33(B), the elastic films 100a and 102a are transformed so as to adhere to the little finger 302a; however, the connecting part of the elastic films 100a and 102a moves to the upper side of the little finger 302a, that is, the finger back side, because the elastic resilience B1 and B2 as well as contractive forces B1α and B2α act on the elastic film 100a. While almost all of the operations carried out by hands are performed by the finger pad side making contact with an object, it is possible to prevent the connecting parts S from becoming obstacles in the operation performed by the finger pad side since the connecting parts S move to the finger back side.

Furthermore, since the elastic film 100a has heat shrinkability, the welding parts S1 of the elastic film 100a and the elastic film 102a curve toward the elastic film 100a side, that is, the back side of the little finger 302a, as illustrated in FIG. 33(B). This further effectively prevents the welding part S1 from becoming an obstacle in the operation performed on the pad side of the user's little finger 302a. Describing the glove produced as described above, the heat shrinkability is produced by the elastic film 100a; however, unlike the present embodiment, both the elastic film 100a and the elastic film 102a may also be configured so as to have heat shrinkability. Furthermore, unlike the present embodiment, the shape of the gloves may be produced ahead of time and formed larger than the actual shape of the user's hand without arranging the user's hands in the apparatus 1A, and when the user actually uses the gloves, heated air may be applied to the elastic film having heat shrinkability while in a state of being worn so as to bring the gloves into close contact with the user's hands.

Fourth Embodiment

Figure 34:
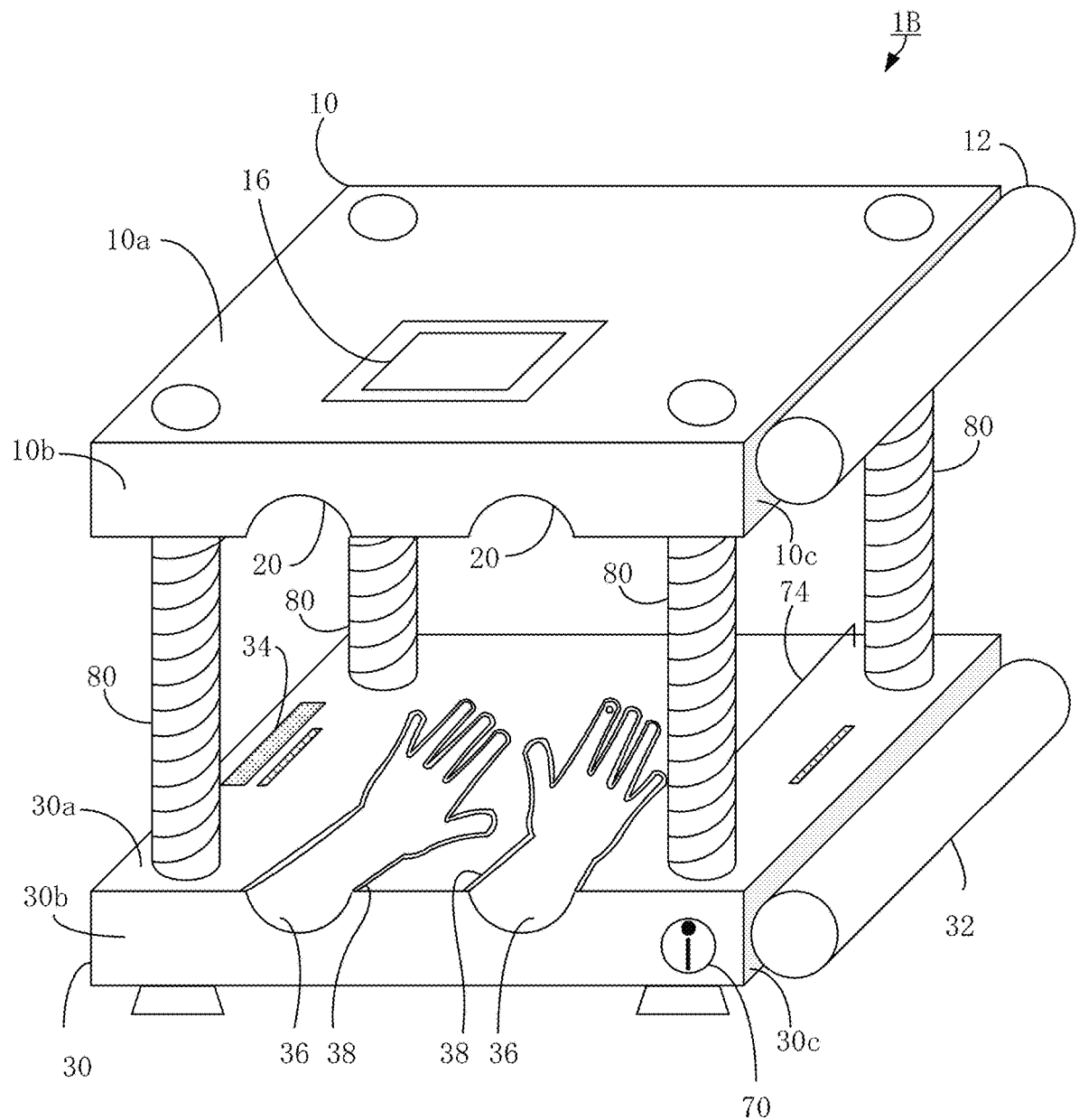
FIG. 34 is a schematic perspective view of an apparatus for producing and putting on gloves according to a fourth embodiment.
Figure 35:
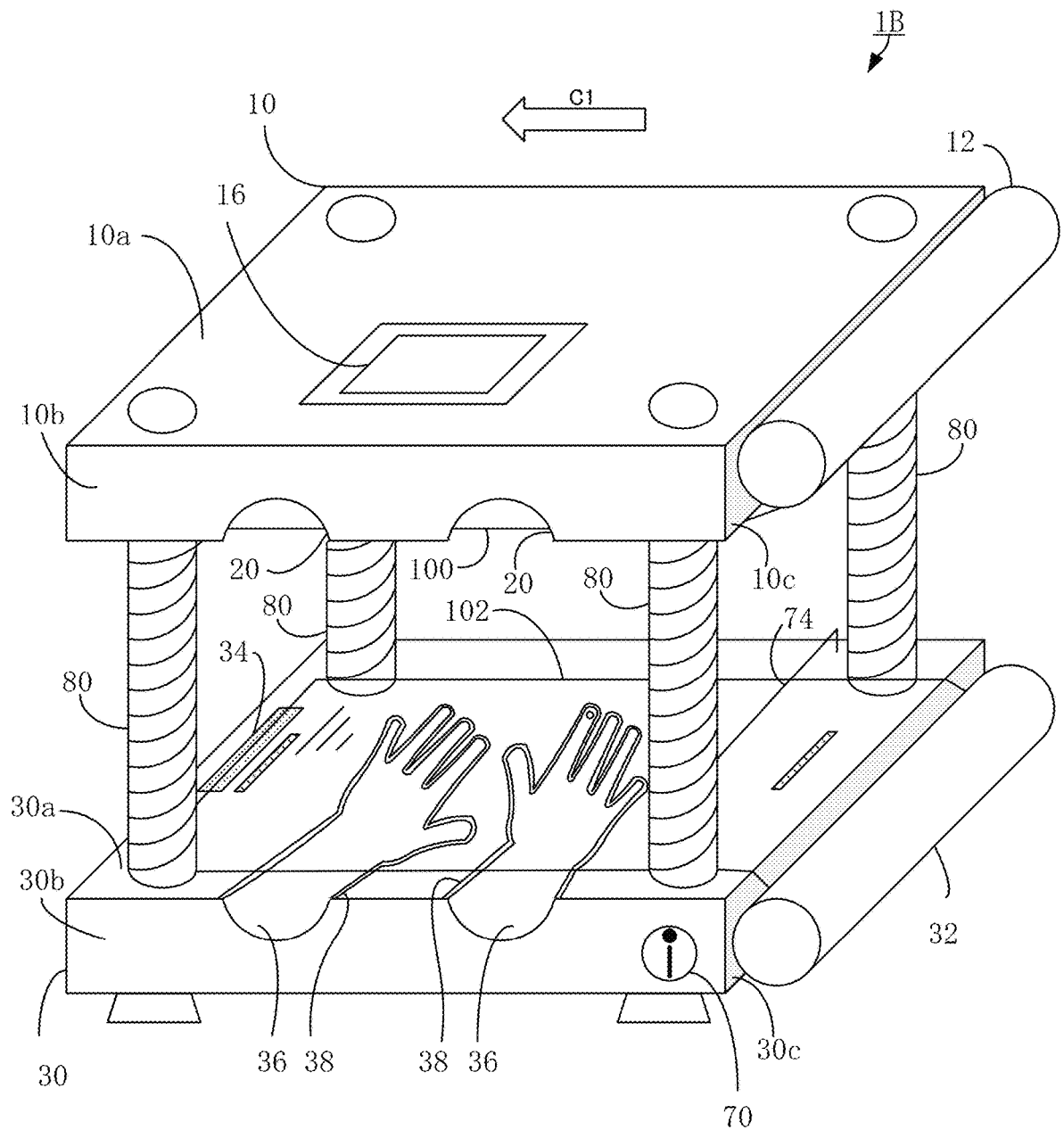
FIG. 35 is a schematic perspective view of an apparatus for producing and putting on gloves according to a fourth embodiment.

The fourth embodiment will be described with reference to FIGS. 34 and 35. Note that description of matters in common with the first embodiment is omitted. In the fourth embodiment, as illustrated in FIGS. 34 and 35, the film holder 12 and the film holder 32 are arranged on the side face 10c of the top member 10 and the side face 30c of the bottom member 30, respectively. The elastic film 100 and the elastic film 102 are pulled out in a right to left direction (direction of arrow C1), and arranged on the bottom face 10d of the top member 10 and the top face 30a of the bottom member 30, respectively.

Fifth Embodiment

Figure 36:
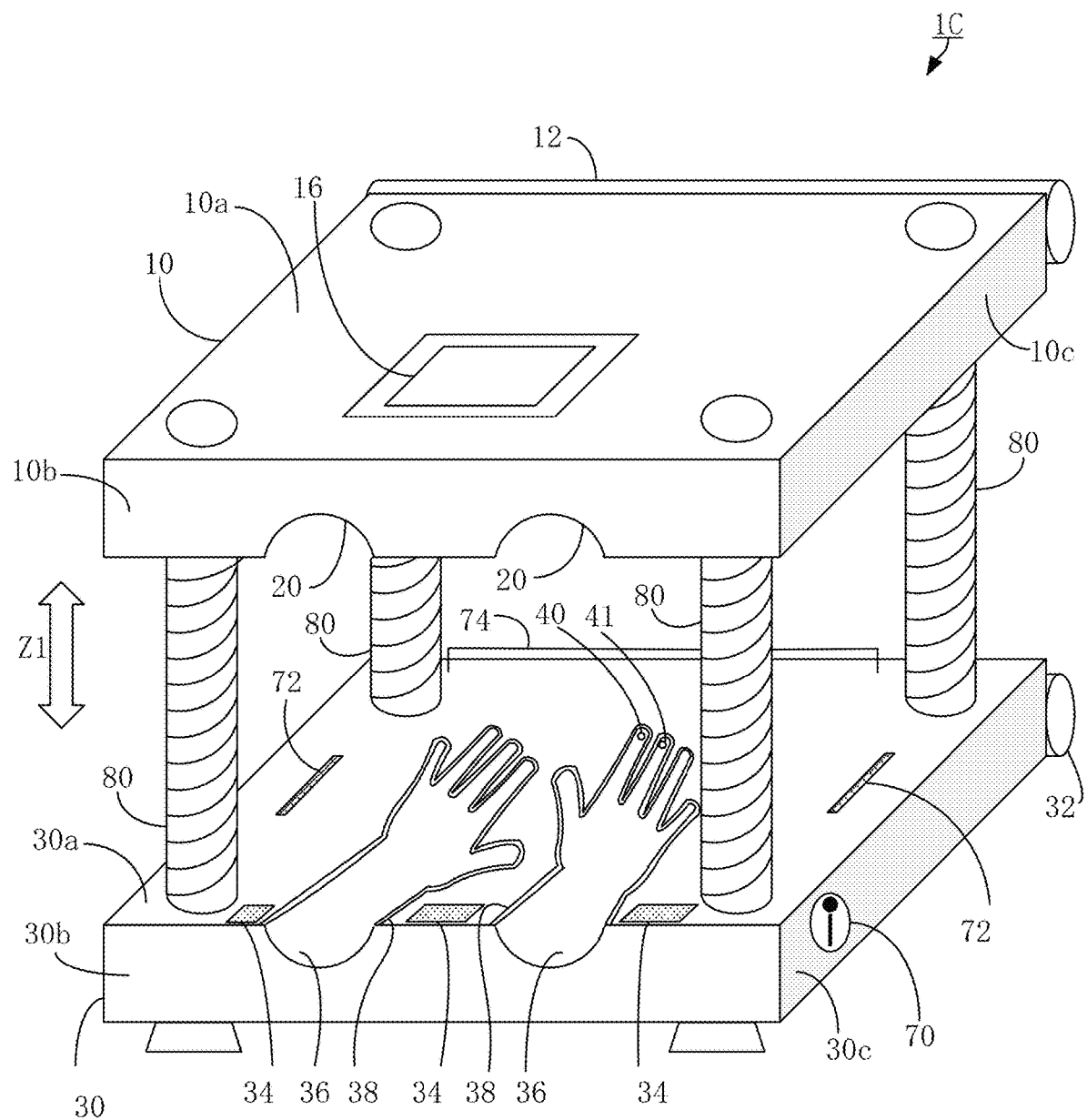
FIG. 36 is a schematic perspective view of an apparatus for producing and putting on gloves according to a fifth embodiment.
Figure 37:
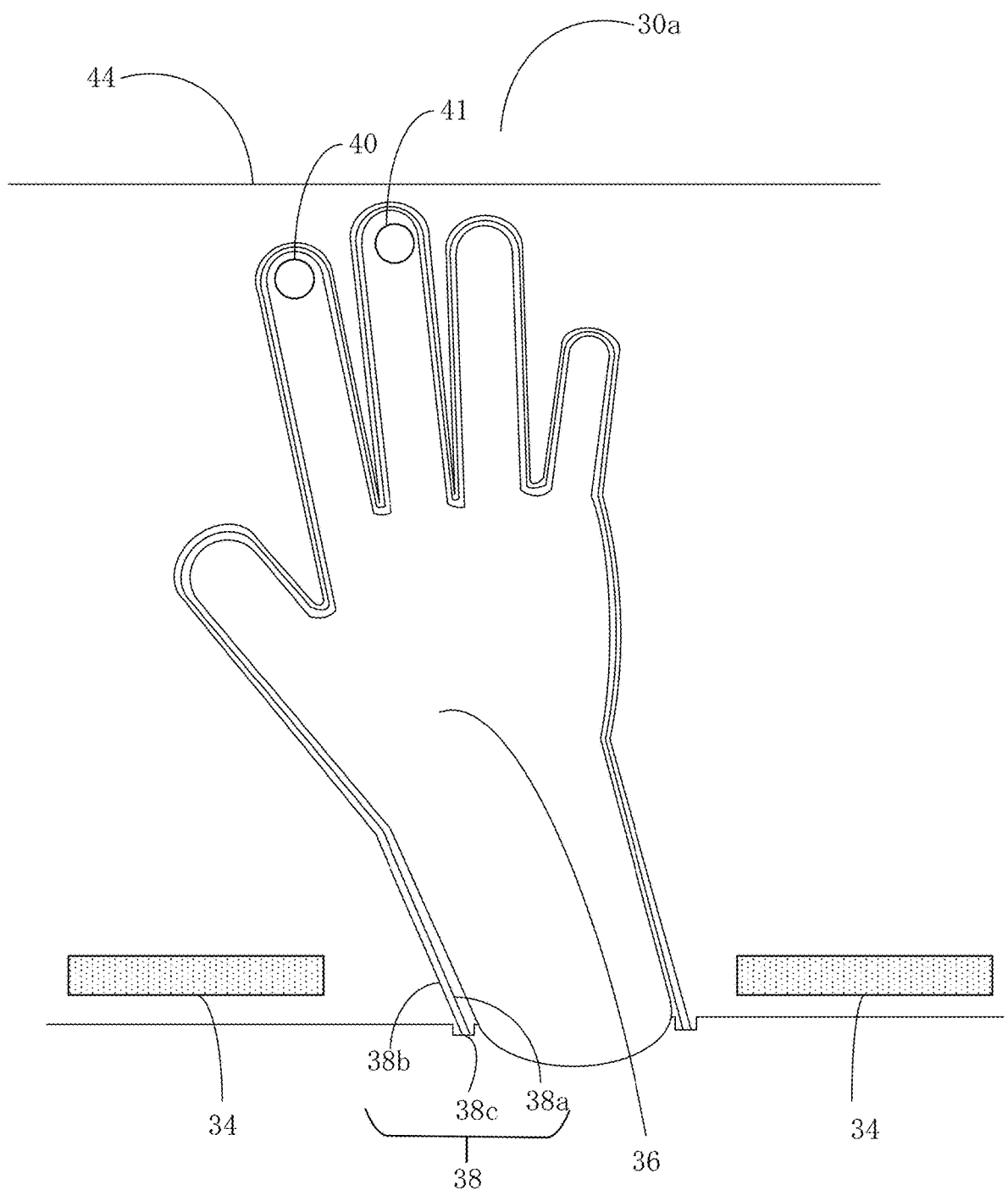
FIG. 37 is a schematic enlarged view illustrating a portion of a bottom member.

The fifth embodiment will be described with reference to FIG. 36 and FIG. 37. Note that description of matters common with the third embodiment is omitted. In an apparatus 1C of the fifth embodiment, the operation switch 40 and an operation switch 41 are deployed on the depression 36. In the depression 36 to house the user's right hand, the operation switch 40 is deployed on the index finger corresponding portion to make the top member 10 move upward and downward. The operation switch 41 is arranged on the middle finger corresponding portion in the depression 36 for controlling the air blowing device 27 and the heat generation member 28.

When the predetermined time t1 has elapsed after the pressurized state is entered, the apparatus 1C displays on the display device 16 "Welding and cutting has completed. Please perform air blowing operation.", for example, a text instructing to perform the operation of blowing the heated air against the elastic film 100a. The user visually confirms the text, and presses the operation switch 41 so as to activate the air blowing device 27 and the heat generation member 28.

Sixth Embodiment

The sixth embodiment will be described. Note that description of matters common with the first embodiment is omitted. In the sixth embodiment, after a power switch 70 is pressed, when it is determined by the signal received by the temperature sensor 210 that the heat generated by the heating wire for welding 38a reaches a welding preparation temperature Pm1, and that the heat generated by the heating wire for cutting 38b reaches a cutting preparation temperature Pc1, the apparatus 1 displays on the display device 16 "Usable temperature is reached", for example, a text indicating preparation completion. The welding preparation temperature Pm1 is a temperature lower than a welding temperature Pm2, which is a temperature capable of welding the elastic film 100 and the elastic film 102, for example, a temperature of 50% of the welding temperature Pm2. The cutting preparation temperature Pc1 is a temperature lower than a cutting temperature Pc2, which is a temperature capable of cutting the elastic film 100 and the elastic film 102, for example, a temperature of 50% of the cutting temperature Pc2.

When the user presses the operation switch 40, the top member 10 moves downward, and the top and bottom member contact sensor 212 receives a signal that indicates contact between the contact sensor 42a (see FIG. 5) and the contact sensitive member 42b (see FIG. 8) arranged on the top member 10, the apparatus 1 increases the heat generation temperature of the heating wire for welding 38a to the welding temperature Pm2, and increases the heat generation temperature of the heating wire for cutting 38b to the cutting temperature Pc2. The timer 214 measures the elapsed time after the temperatures reach the welding temperature Pm2 and the cutting temperature Pc2. When the predetermined time t1 has elapsed, the apparatus 1 controls the top member 10 to move upward.

Seventh Embodiment

A seventh embodiment will be described with reference to FIGS. 38 to 41. Note that description of matters common with the first embodiment is omitted.

Figure 38:
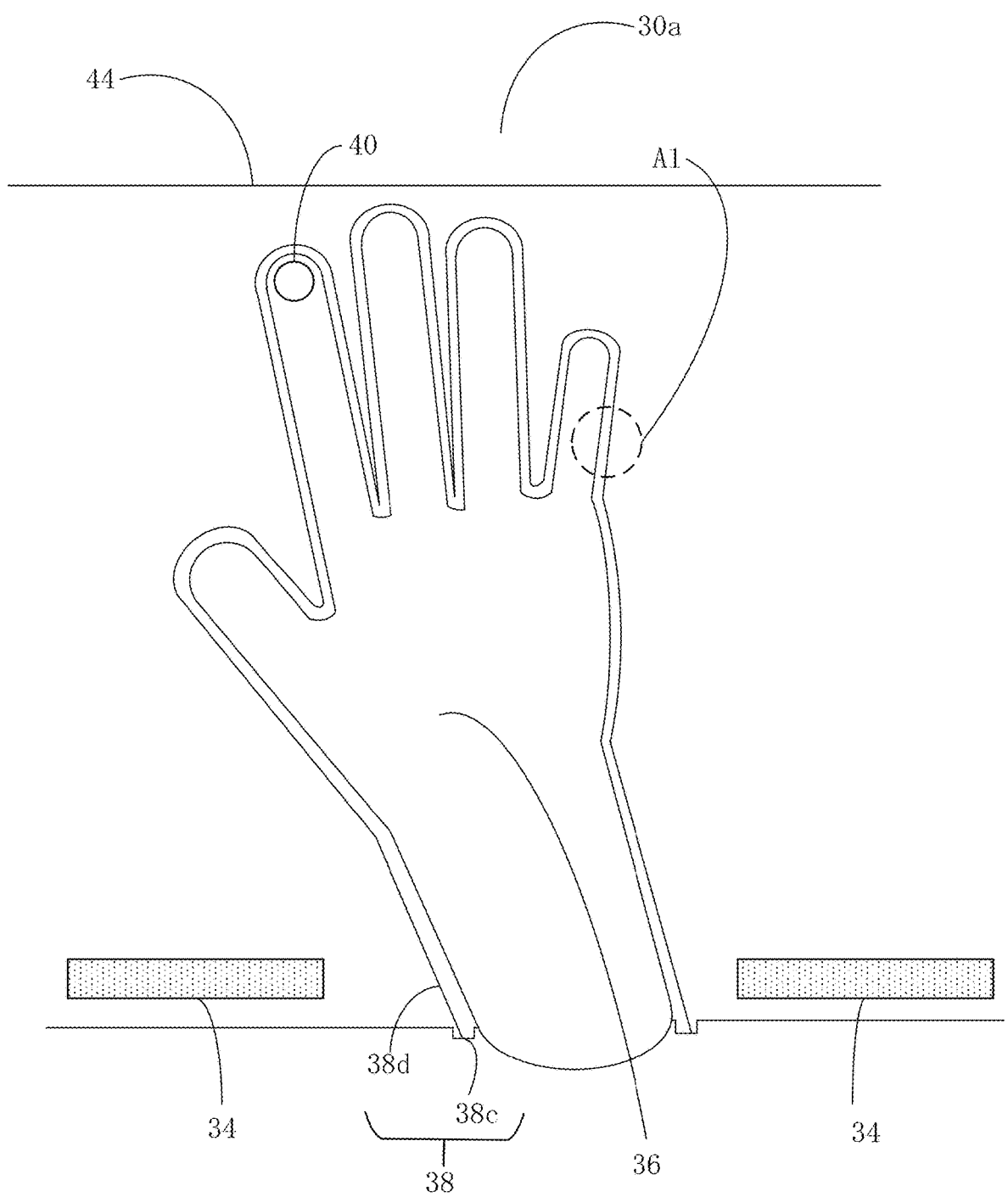
FIG. 38 is a schematic enlarged view illustrating a portion of a bottom member according to a seventh embodiment.
Figure 39:
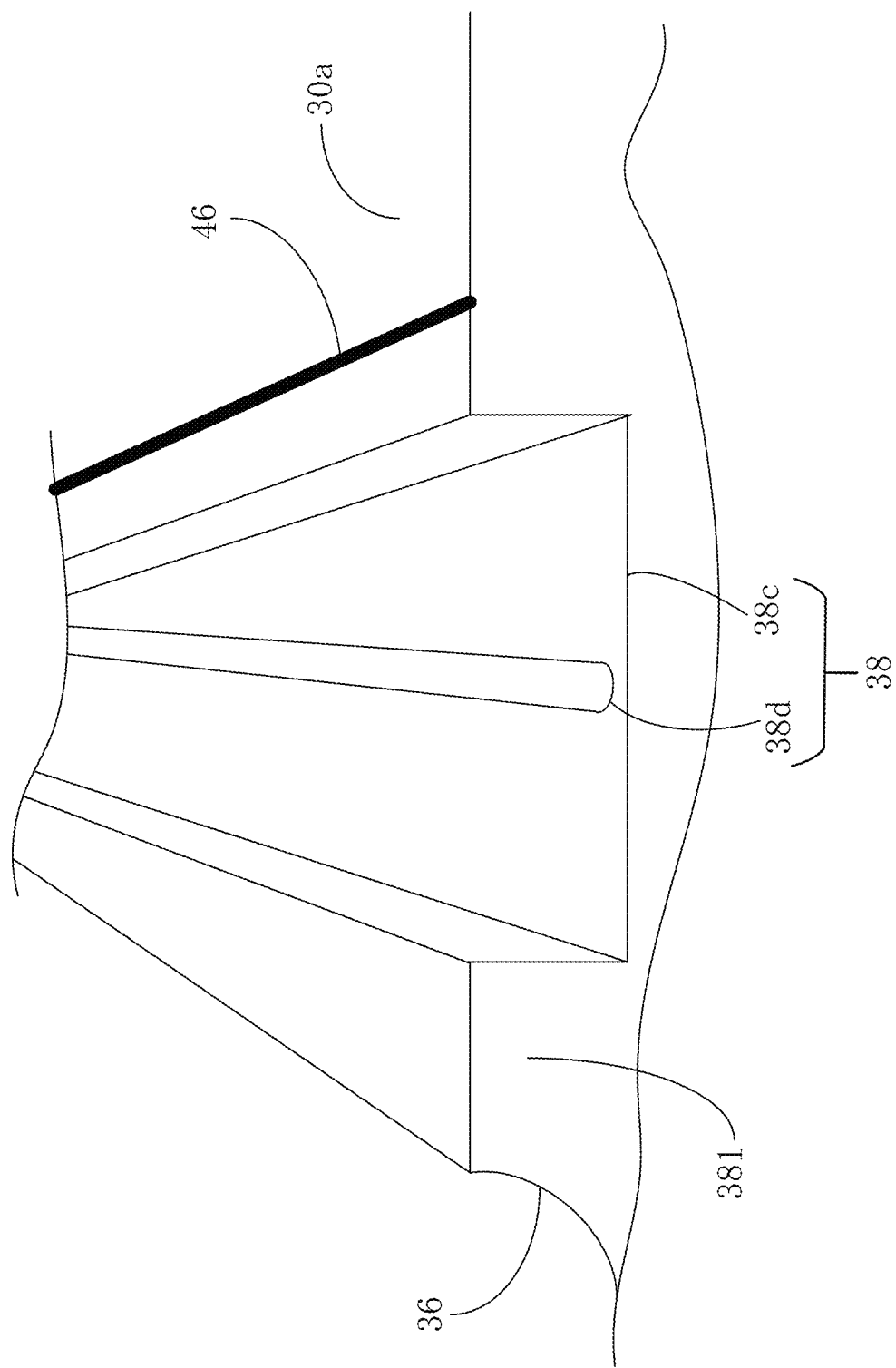
FIG. 39 is a schematic enlarged view illustrating a portion of bottom member.

As illustrated in FIGS. 38 and 39, a heating wire for welding and cutting 38d is disposed in a groove 38c of a welding and cutting unit 38 of the apparatus 1. Both the welding and cutting of the elastic film 100 and the elastic film 102 are carried out by the heating wire for welding and cutting 38d.

FIG. 40(A) is a schematic view illustrating a part of the elastic film 100a and the elastic film 102a forming the gloves in the first embodiment. In the gloves produced by the apparatus 1 of the first embodiment, the welding part MP1 is formed at a position deviated from the cutting parts 100c and 102c. On the other hand, as illustrated in FIG. 40(B), in the seventh embodiment, the welding part MP2 is formed at a position continuous with or close to the cutting parts 100c and 102c.

Figure 41:
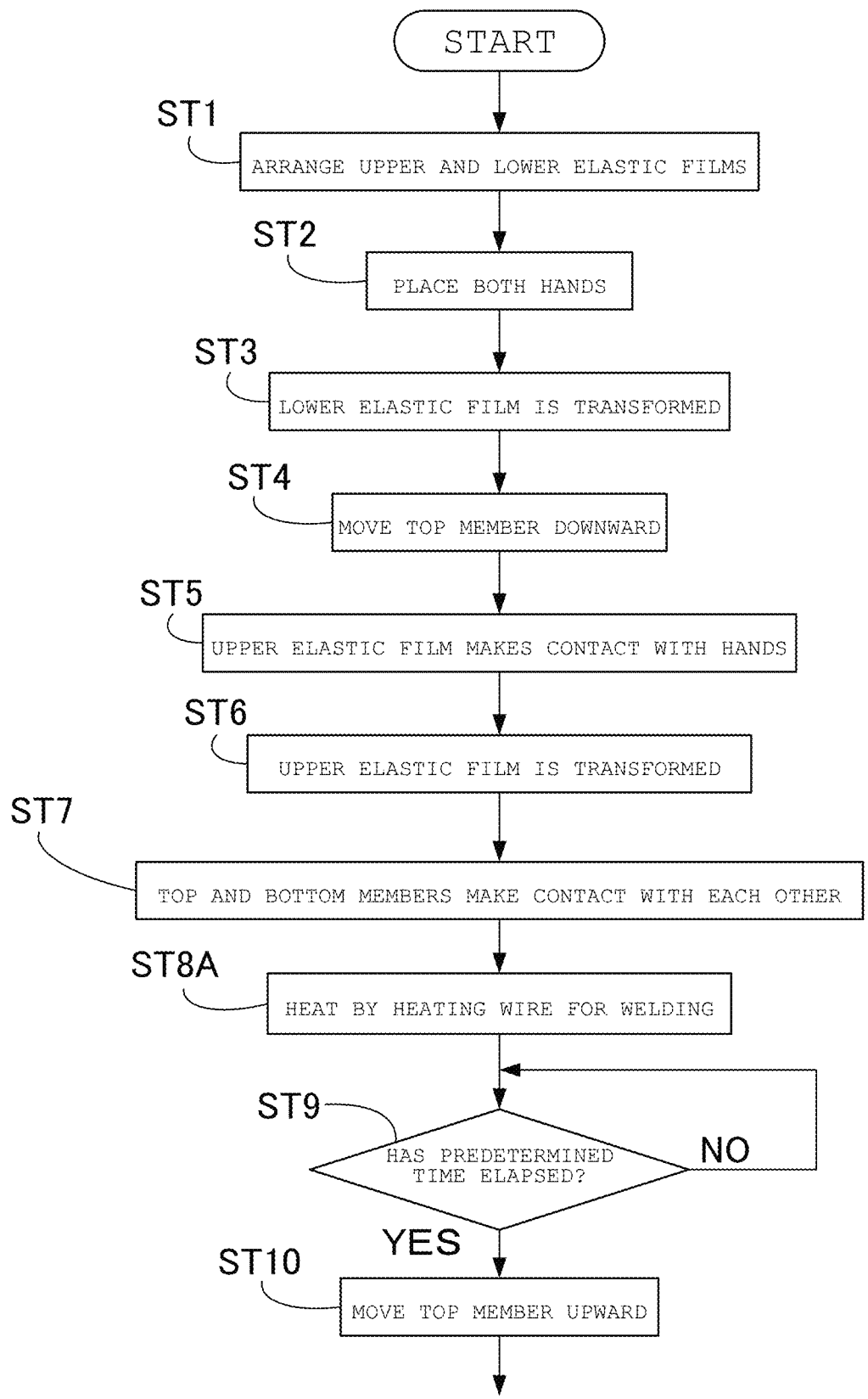
FIG. 41 is a flowchart illustrating a method of producing and putting on gloves.

Next, referring to FIG. 41, a method of producing and putting on gloves by the apparatus 1 of the present embodiment is summarized. The user arranges the elastic film 100 on the top member 10 and arranges the elastic film 102 on the bottom member 30 (step ST1 in FIG. 41), and presses the power switch 70 to activate the apparatus 1. Next, once completion of heating preparation by the heating wire for welding and cutting 38d is confirmed by the display on the display device 16, both hands are respectively placed on the two depressions 36 of the bottom member 30 from the upper side of the elastic film 102 (step ST2). The lower elastic film 102 is then transformed (step ST3).

When the operation switch 40 is then pressed by the user, the apparatus 1 controls the top member 10 to move downward (step ST4). When the top member 10 moves downward, the elastic film 100 arranged on the top member 10 makes contact with the back side of the hand (step ST5) and is transformed (step ST6). The top member 10 and the bottom member 30 then make contact with each other (step ST7), the elastic films 100 and 102 are pressurized and heated by the projections 22, and the heating wire for welding and cutting 38d (step ST8A). Step ST8A is an example of the welding and cutting step.

Once it is determined that the predetermined time t1 sufficient for welding and cutting has elapsed (step ST9), the apparatus 1 controls the top member to move upward (step ST10). Once the predetermined time t1 has elapsed, the elastic films 100 and 102 are welded and cut into the shape of the hand contour. Since the steps after step ST10 are similar to the first embodiment, their description is omitted.

Eighth Embodiment

An eighth embodiment will be described with reference to FIGS. 42 to 46. Note that description of matters common with the first embodiment is omitted.

Figure 42:
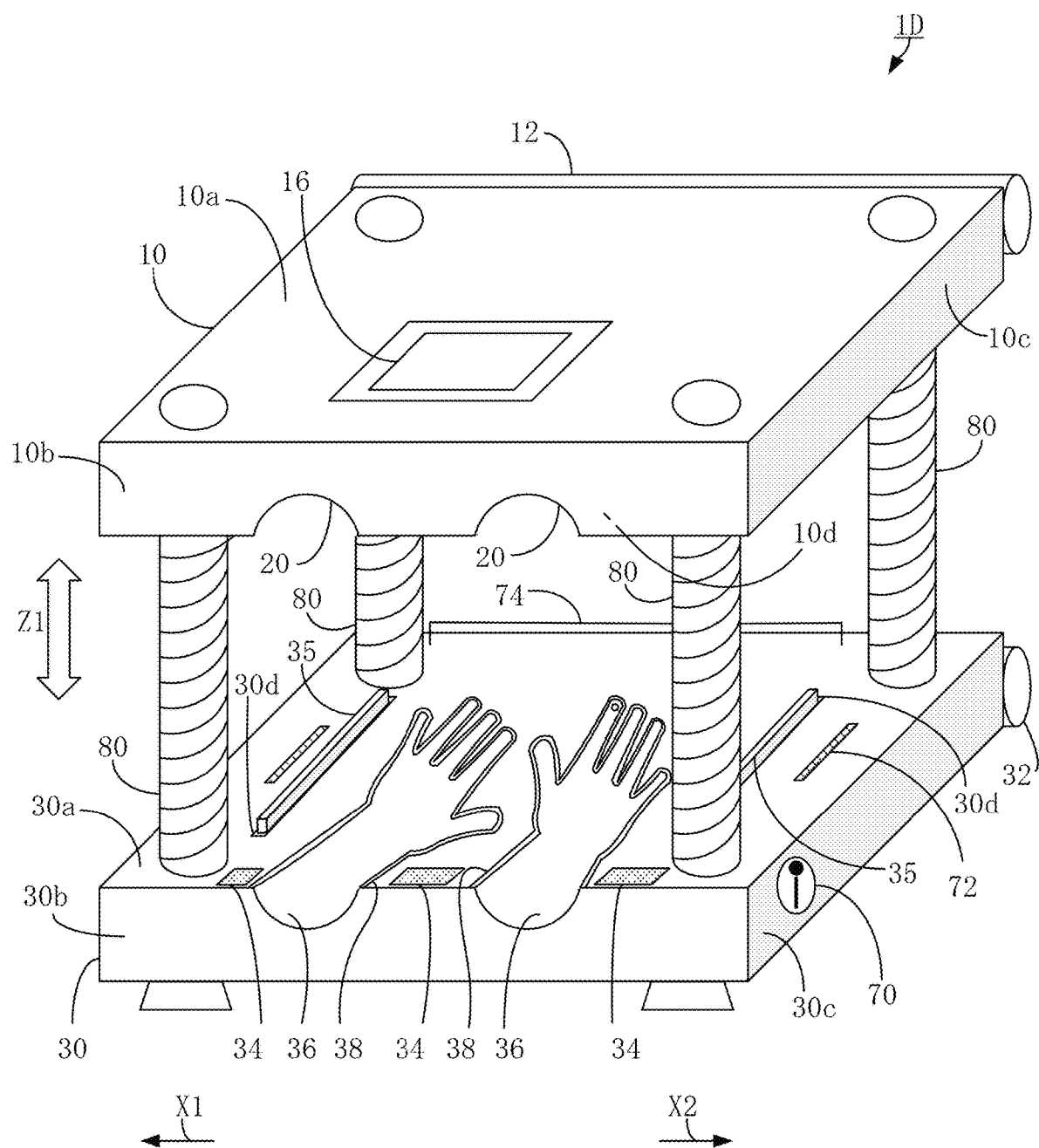
FIG. 42 is a schematic perspective view of an apparatus for producing and putting on gloves according to an eighth embodiment.

As illustrated in FIG. 42, in the apparatus 1D, elongated rectangular grooves 30d (hereinafter referred to as "inclined grooves 30d") are respectively formed in the vicinity of the left and right ends of the top face 30a of the bottom member 30. Projecting member 35 is arranged in the inclined groove 30d. An inclined groove 10e and a projecting member 25 (see FIG. 43) also are similarly arranged on the bottom face 10d of the top member 10.

FIG. 43 is a schematic sectional view of the inclined grooves 30d and the projecting member 35 of the bottom member 30 and the inclined grooves 10e and the projecting member 25 of the top member 10 as viewed from the front side.

As illustrated in FIG. 43(A), the left inclined groove 30d is inclined leftward with respect to the direction orthogonally downward from the top face 30a, and the right inclined groove 30d is inclined rightward with respect to the direction orthogonally downward from the top face 30a. That is, the left and right inclined grooves 30d are each inclined toward the outside.

The projecting member 35 is comprised of an anti-slip portion 35a, an upright portion 35b, and an inclined portion 35c. The anti-slip portion 35a is formed of a material capable of fixing the elastic film 102, and is formed of, for example, silicone rubber. The upright portion 35b is arranged substantially perpendicular to the top face 30a. The inclined portion 35c slides within the inclined groove 30d in the inclined direction of the inclined groove 30d. The inclined portion 35c is biased in a direction toward the outside of the inclined groove 30d, that is, in a direction to be extruded from the inclined groove 30d by the spring member 30e disposed at the bottom portion of the inclined groove 30d.

The left inclined groove 10e is inclined leftward with respect to the direction extending vertically upward from the bottom face 10d and the right inclined groove 10e is inclined rightward with respect to the direction extending vertically upward from the bottom face 10d. That is, the left and right inclined grooves 10e are each inclined toward the outside.

The projecting member 25 is comprised of an anti-slip portion 25a, an upright portion 25b, and an inclined portion 25c. The anti-slip portion 25a is formed of a material capable of fixing the elastic film 100, and is formed of, for example, silicone rubber. The upright portion 25b is disposed substantially perpendicular to the bottom face 10d. The inclined portion 25c slides in the inclined direction of the inclined groove 10e within the inclined groove 10e. The inclined portion 25c is biased in a direction toward the outside of the inclined groove 10e, that is, in a direction to be extruded from the inclined groove 10e by the spring member 10f disposed at the bottom portion of the inclined groove 10e.

FIG. 43(A) illustrates the moment when the top member 10 descends toward the bottom member 30 and the elastic film 100 and the elastic film 102 are sandwiched and fixed between the projecting member 35 and the projecting member 25. At this time, the upright portion 35b of the projecting member 35 and the upright portion 25b of the projecting member 25 are at the position P1. In this state, when the top member 10 descends in the direction of arrow Z2, the inclined portion 35c and the inclined portion 25c move toward the bottom portions of the inclined groove 30d and the inclined groove 10e, respectively. The upright portions 35b and 25b on the left side move in the direction of the arrow X1, the upright portions 35b and 25b on the right side move in the direction of the arrow X2, and as illustrated in FIG. 43(B), the upright portion 35b of the projecting member 35 and the upright portion 25b of the projecting member 25 move to the position P2.

The elastic film 100 and the elastic film 102 are pulled in the arrow X1 direction and the arrow X2 direction and stretched in a state of being sandwiched between the anti-slip portion 35a and the anti-slip portion 25a. After completion of the gloves, the contraction force by this stretching (hereinafter referred to as "first stretching") also acts to improve the degree of adhesion between the glove and the user's hand. The inclined groove 30d and the projecting member 35, and the inclined groove 10e and the projecting member 25 are examples of stretching means.

As illustrated in FIG. 44(A), immediately after the gloves are produced, in addition to the contraction forces B1 to B4 caused by stretching of the elastic films 100a and 102a by the little finger 302a, the contraction forces C1 to C4 due to the above-described first stretching are also at work. After the top member 10 moves upward, as illustrated in FIG. 44(B), this allows the elastic films 100a and 102a to be brought into close contact with the little finger 302a.

Figure 45:
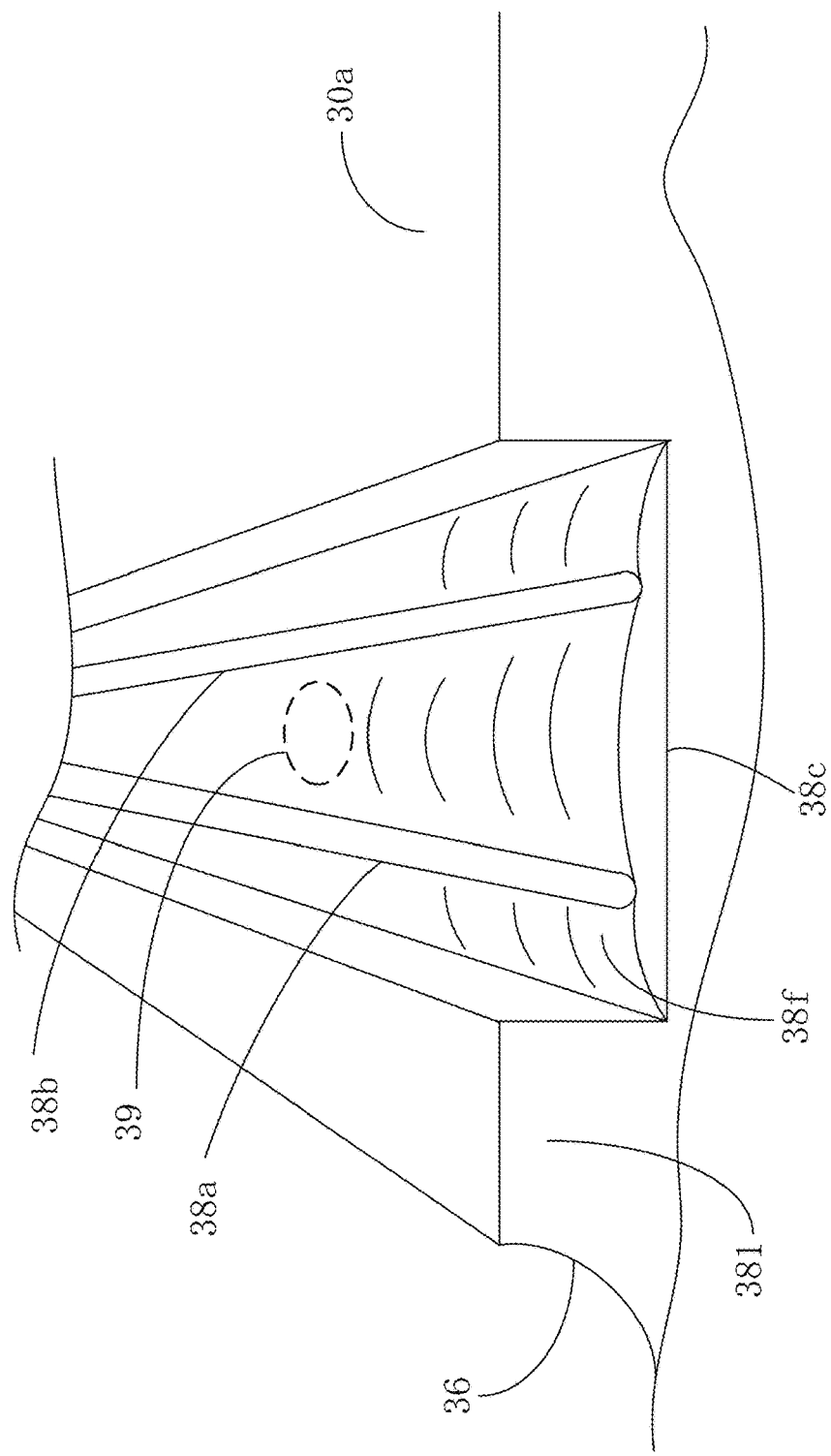
FIG. 45 is a schematic enlarged view illustrating a portion of the bottom member.

As illustrated in FIG. 45, a heat resistant mat 38f made of a heat resistant fiber is arranged in the groove 38c of the apparatus 1D. The heat resistant fiber is, for example, a polyimide fiber. The heating wire for welding 38a and the heating wire for cutting 38b are arranged on the heat resistant mat 38f.

A pressure sensor 39 is embedded in the heat resistant mat 38f. Here, a state in which the contact sensor 42a (see FIG. 5) of the bottom member 30 and the contact sensitive member 42b (see FIG. 8) of the top member 10 are in contact with each other is referred to as a "contact state". When the user's hand or finger touches the heating wire for welding 38a and the heating wire for cutting 38b in a state other than the contact state, the apparatus 1D senses the pressure thereof and determine that an abnormality has occurred. When the pressure sensor 39 detects that the user's hand or finger is touching in a state other than the contact state, a first emergency operation to maintain the user's safety is performed. The first emergency operation includes, for example, stopping the power supply to the heating wire for welding 38a and the heating wire for cutting 38b, displaying a warning on the display device 16, generating a warning sound by a speaker (not illustrated), and raising the top member 10.

Note that the portion where the user's hand or finger is placed and the portion where the heating wire for welding 38a and the heating wire for cutting 38b are disposed are separated by a wall 381 (see FIG. 45) between the depression 36 and the groove 38c, and since they are naturally isolated, the hands and fingers of the user do not come into contact with the heating wire for welding 38a or the heating wire for cutting 38b. Therefore, the above-described pressure sensor 39 is a configuration for making safety more reliable. The wall 381 is an example of isolating means.

Figure 46:
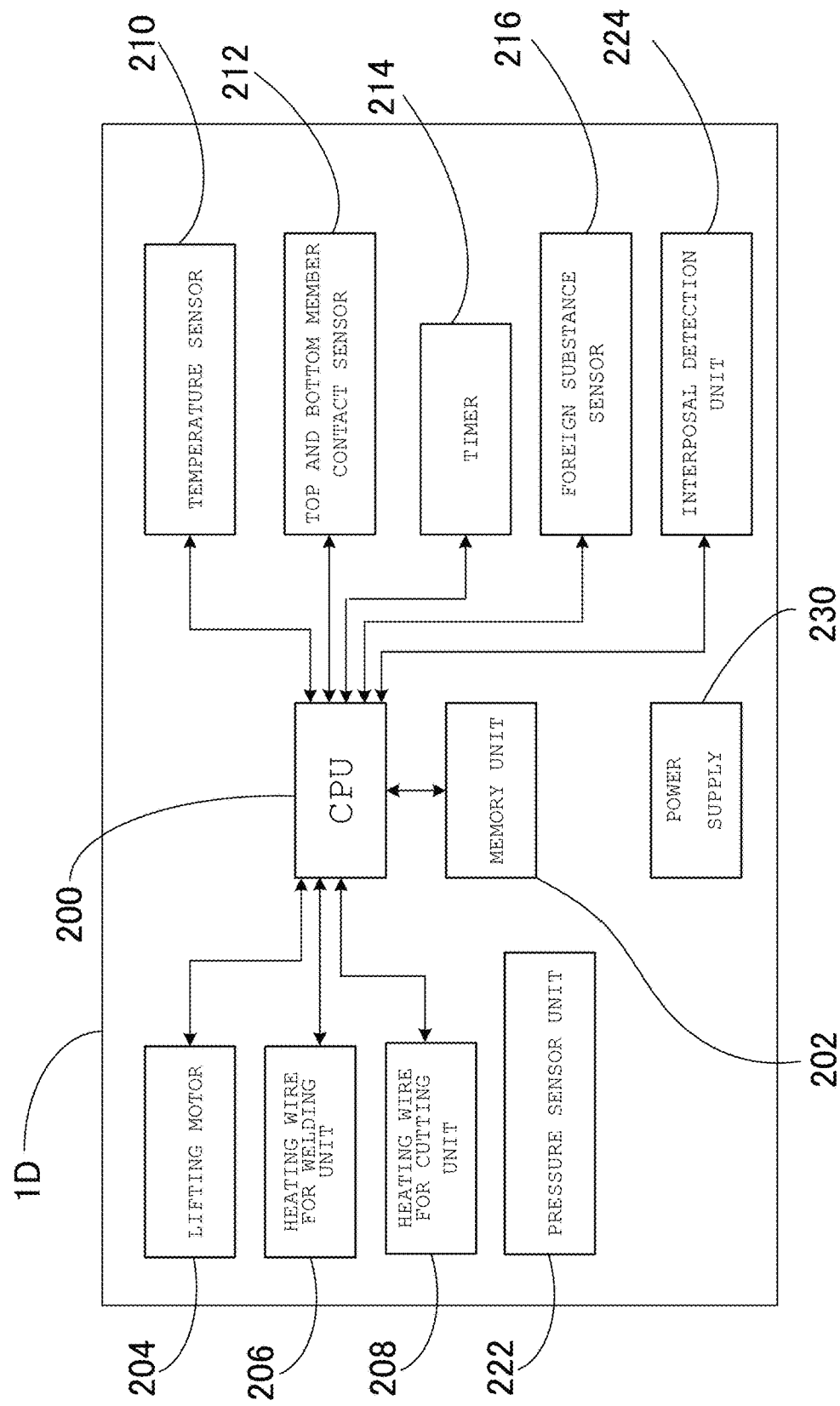
FIG. 46 is a schematic block diagram illustrating a functional configuration of an apparatus for producing and putting on gloves.

As illustrated in FIG. 46, the apparatus 1D has a pressure sensor unit 222. The pressure sensor unit 222 receives the output (pressure value) from the pressure sensor 39.

A first emergency response program is stored in the memory unit 202. The CPU 200 and the emergency response program are examples of first emergency response means. Upon reception of the pressure value by the pressure sensor unit 222 by the emergency response program in a state other than the contact state, the apparatus 1D controls each unit of the apparatus 1D and causes the above-described first emergency operation described above to be executed.

Further, as illustrated in FIG. 46, the apparatus 1D has an interposal detection unit 224. The interposal detection unit 224 detects a current value (hereinafter referred to as "load current value") flowing through the motor 13c (see FIG. 4).

A second emergency response program is stored in the memory unit 202. The CPU 200 and the second emergency response program are an example of second emergency response means. The memory unit 202 stores the following load current values. First, the load current value i1 of the motor 13c when the top member 10 descends without resistance. Secondly, the load current value i2 when a state in which the top member 10 descends while the elastic film 100 and the elastic film 102 are sandwiched between the projecting member 35 and the projecting member 25, and a state in which the elastic film 100 is transformed in contact with the user's hand occur at the same time. Third, it is the load current value if when the top member 10 and the bottom member 30 come into contact. The load current value i2 is larger than the load current value i1 and the load current value if is larger than the load current value i2. That is, i1<i2<if.

In a state (contact state) in which the contact sensor 42a (see FIG. 5) of the bottom member 30 and the contact sensitive member 42b (see FIG. 8) of the top member 10 are in contact with each other (contact state), the apparatus 1D having a load current value of "if" is judged to be normal. When the load current value of the motor 13c becomes larger than i2 except for in the contact state, the apparatus 1D judges that there is an abnormality and carries out the second emergency operation. This is because, if the load current value of the motor 13c is larger than i2 other than in the contact state, there is a possibility that the user's hand or finger is sandwiched between the bottom member 30 and the top member 10. The second emergency operation is an operation in which, for example, the power supply to the heating wire for welding 38a and the heating wire for cutting 38b is stopped, a warning is displayed on the display device 16, a warning sound is generated by a speaker (not illustrated), and the top member 10 is raised. The method of detecting the interposition of the user's hand or finger is not limited to the method of this embodiment, but may also use a method such as, for example, employing a contact sensor.

Also, the user herself/himself, in an emergency situation, can raise the top member 10 being lowered by pressing the operation switch 40.

Ninth Embodiment

A ninth embodiment will be described with reference to FIG. 47. Note that description of matters common with the eighth embodiment is omitted.

Figure 47:
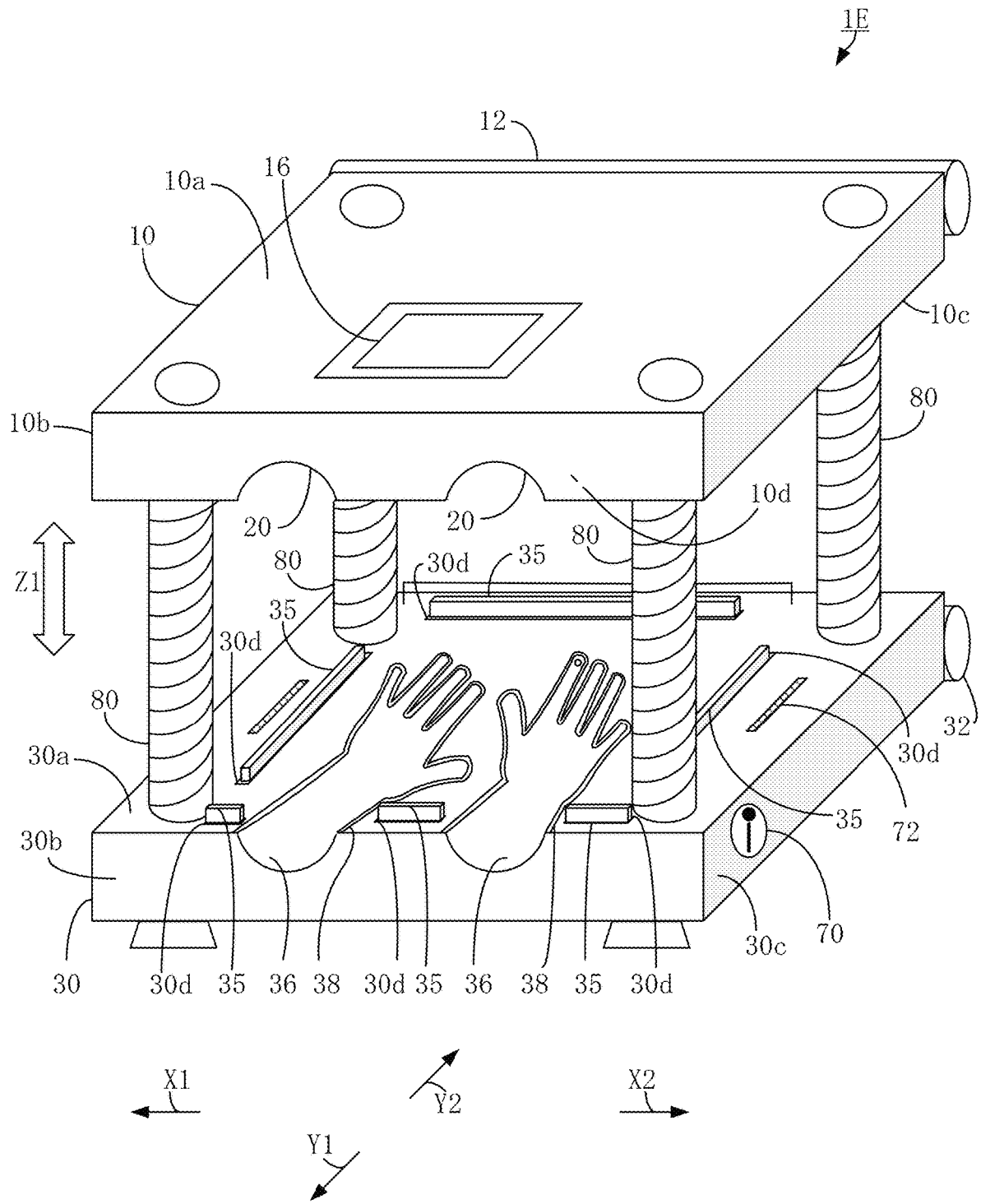
FIG. 47 is a schematic perspective view of an apparatus for producing and putting on gloves according to a ninth embodiment.

As illustrated in FIG. 47, in the apparatus 1E of the ninth embodiment, in addition to the vicinities of the left and right ends of the bottom member 30, the inclined groove 30d and the projecting member 35 are disposed also on the near side and the far side. Likewise, in the top member 10, the inclined groove 10e and the projecting member 25 are also arranged on the near side and the far side in addition to in the vicinity of the left and right ends. As a result, the first stretching is performed not only in the directions of the arrows X1 and X2 but also in the direction of the arrow Y1 and in the direction of the arrow Y2, which are perpendicular thereto. This further increases the degree of close contact between the elastic films 100a and 102a forming the glove and the user's hand.

Tenth Embodiment

A tenth embodiment will be described with reference to FIGS. 48 and 49. Note that description of matters common with the first embodiment is omitted.

The difference between the device 1F of the tenth embodiment and the apparatus 1 of the first embodiment is the lifting mechanism of the top member 10. As illustrated in FIGS. 48 and 49, a groove 30f is formed in the side face 30c of the bottom member 30, and a groove 10g is formed in the side face 10c of the top member 10. An end of the expandable member 81 is connected to the groove 30f and the groove 10g so as to be movable. The expandable member 81 is a pantograph member, and is constituted by elongated rectangular plate members 81a and 81b. The plate member 81a and the plate member 81b are fixed so as to be pivotable with each other at the center shaft 81c.

Figure 48:
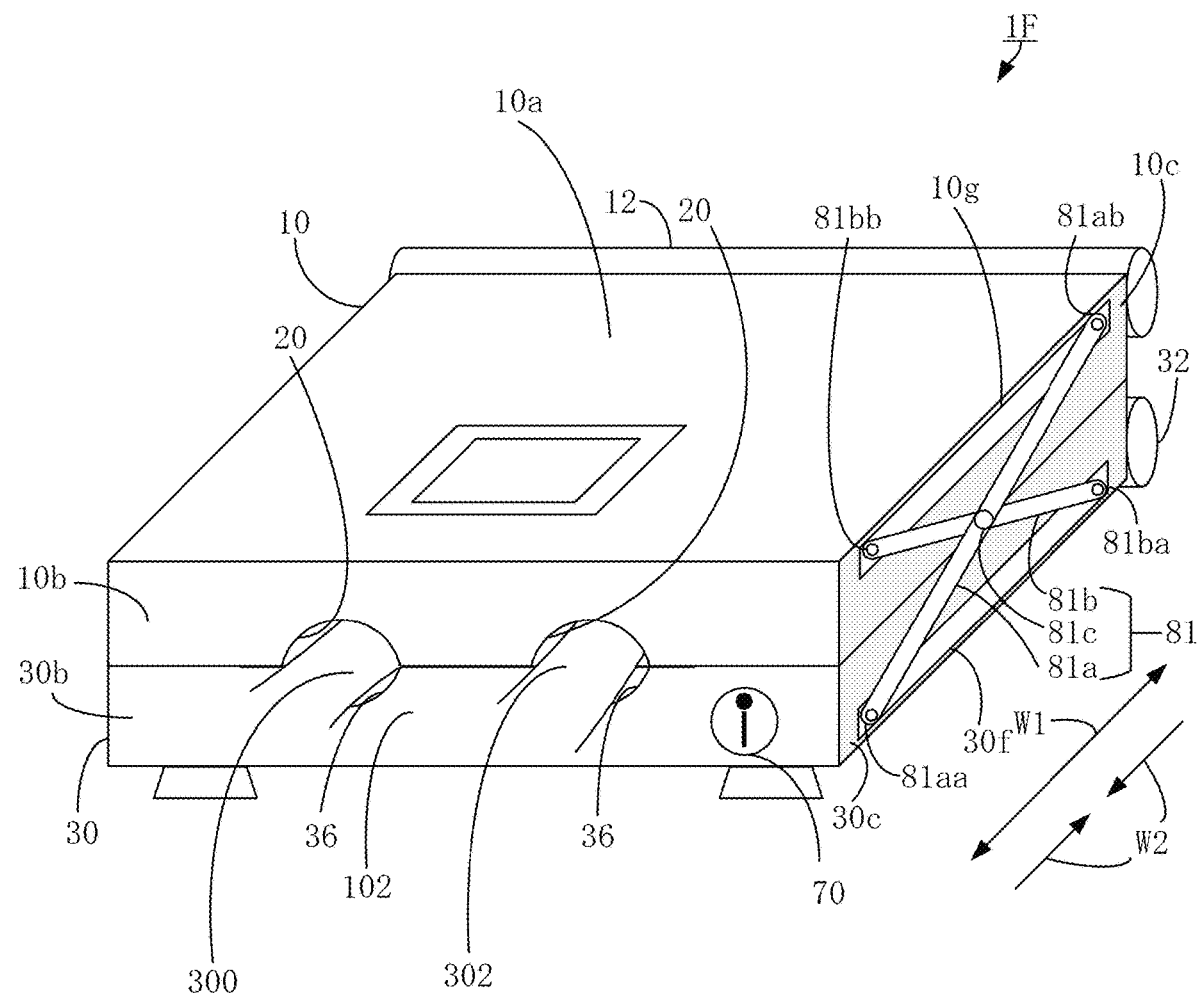
FIG. 48 is a schematic perspective view of an apparatus for producing and putting on gloves according to a tenth embodiment.
Figure 49:
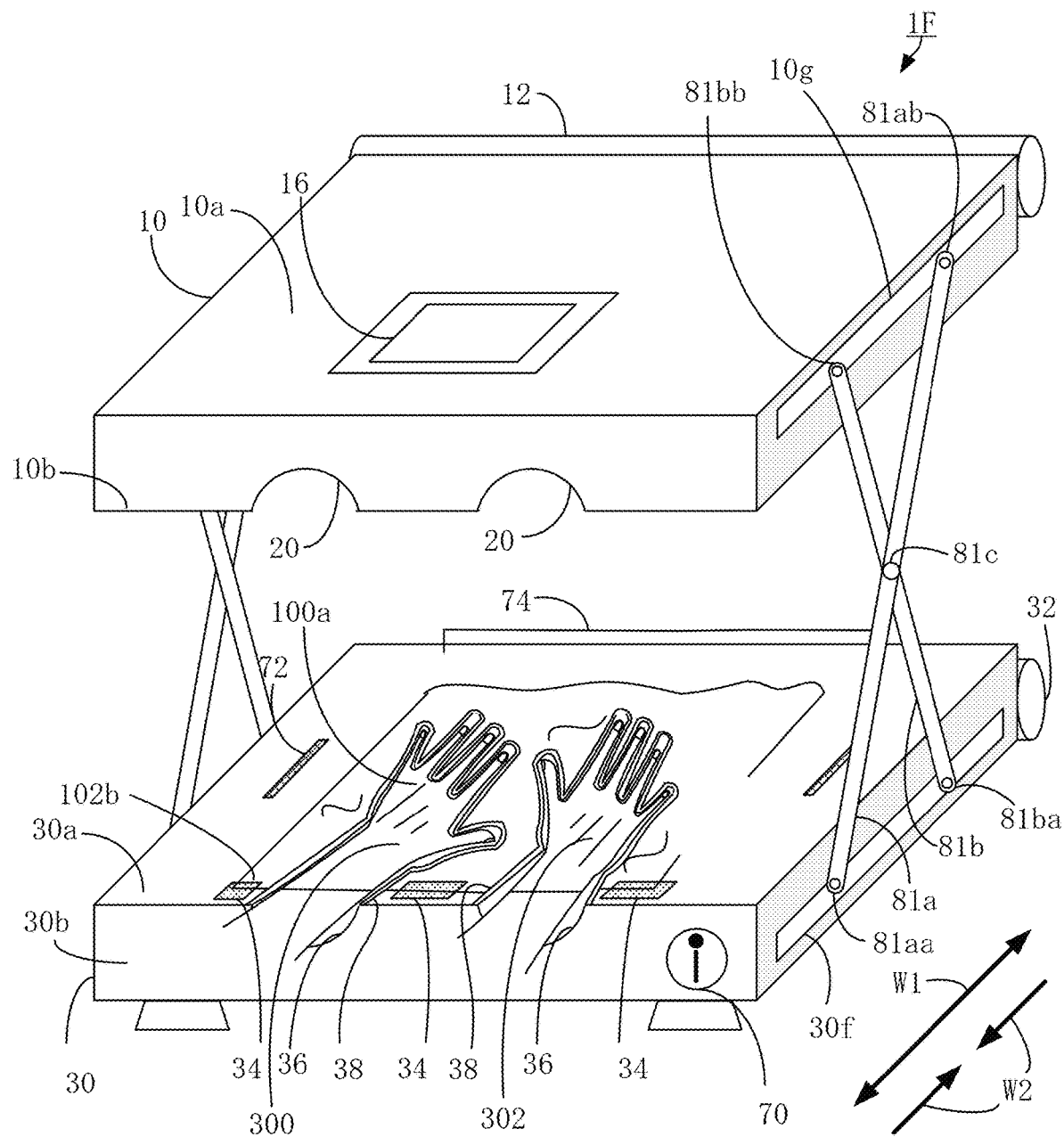
FIG. 49 is a schematic perspective view of an apparatus for producing and putting on gloves.

When the end 81aa of the plate member 81a and the end 81ba of the plate member 81b move in the direction of the arrow W2 from the state of FIG. 48, the end 81ab and the end 81bb also move in the direction of the arrow W2 and the top member 10 is raised to become the state illustrated in FIG. 49. In the state of FIG. 49, when the end 81aa of the plate member 81a and the end 81ba of the plate member 81b move in the arrow W1 direction, the end 81ab and the end 81bb move in the direction of the arrow W1, the top member 10 is lowered to become the state illustrated in FIG. 48. A driving mechanism for moving the end 81aa of the plate member 81a and the end 81ba of the plate member 81b in the arrows W1 direction and W2 direction is disposed inside the bottom member 30.

Eleventh Embodiment

Figure 50:
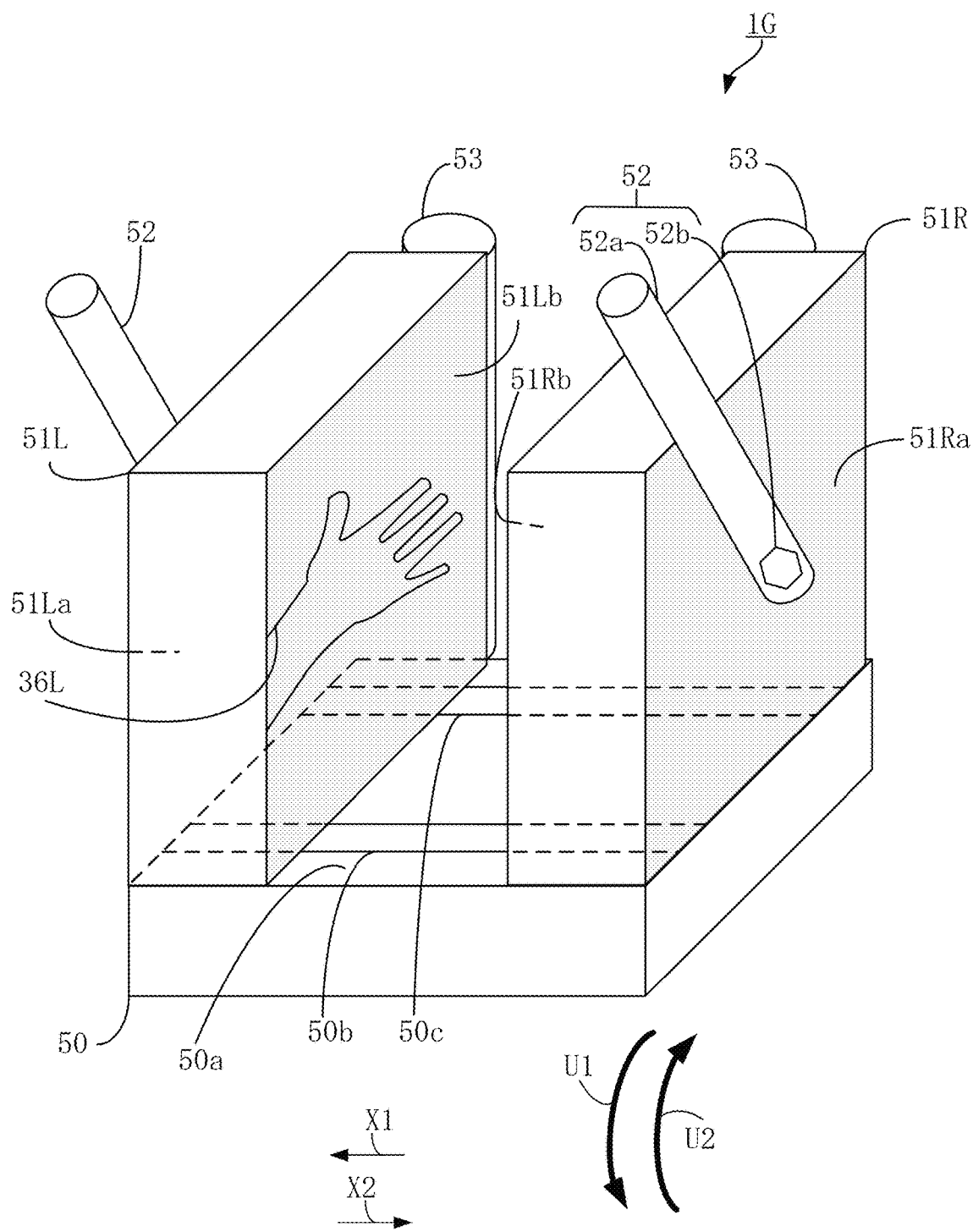
FIG. 50 is a schematic perspective view of an apparatus for producing and putting on gloves according to an eleventh embodiment.

An eleventh embodiment will be described with reference to FIG. 50. Note that description of matters common with the first embodiment is omitted.

The apparatus 1G of the eleventh embodiment is different from the apparatus 1 of the first embodiment in that instead of the top member 10 and the bottom member 30 of the first embodiment, a left side member 51L and a right side member 51R are disposed.

The left side member 51L and the right side member 51R are disposed on the top face 50a of the substrate member 50 in a manner movable in the arrow X1 direction and the arrow X2 direction. On the front side and the back side of the top face 50a, a rectangular hole portion 50b and a hole portion 50c which are elongated in the lateral direction and penetrate to the inside of the substrate member 50 are formed. Projections (not illustrated) for slidably engaging with the hole portion 50b and the hole portion 50c are formed on the bottom faces of the left side member 51L and the right side member MR. Inside the substrate member 50, a driving mechanism for moving the projection in the direction of the arrow X1 and the direction of the arrow X2 is disposed.

A depression 36L is formed on the inner side face 51Lb of the left side member. Similarly, a depression (not illustrated) having a shape of the hand is formed on the inner side face 51Rb of the right member.

A pivoting member 52 is disposed on the outer side face 51Ra of the right side member 51R. In the pivoting member 52, the rod-like portion 52a rotates about the shaft portion 52b. Likewise, the pivoting member 52 is also disposed on the outer side face 51La of the left side member 51L.

When the pivoting member 52 of the right side member 51R is rotated in the arrow U1 direction, the driving mechanism inside the substrate member 50 is operated so as to move the right side member 51R in the direction of the arrow X1. When the pivoting member 52 of the right side member 51R is rotated in the arrow U2 direction, the driving mechanism inside the substrate member 50 is operated so as to move the right side member 51R in the direction of the arrow X2. The same applies to the left side member 51L.

The user, for example, draws the elastic film 100 from the film holder 53 of the left side member 51L and fixes it on the inner side face 51Lb, draws the elastic film 102 from the film holder 53 of the right side member 51R, fixes it to the inner side face 51Rb, and disposes the back side of their left hand in the depression 36L of the left side member 51L. In this state, the left hand is sandwiched between the elastic film 100 and the elastic film 102 by rotating the pivoting member 52 of the right side member 51R in the direction of the arrow U1 with the right hand. In this state, by welding and cutting the elastic film 100 and the elastic film 102, the glove is produced and put on the left hand.

The user then draws out the elastic film 100 from the film holder 53 of the left side member 51L and fixes it on the inner side face 51Lb, draws the elastic film 102 from the film holder 53 of the right side member 51R, fixes it on the inner side face 51Rb, disposes the back side of their right hand in the depression of the right side member 51R. In this state, the right hand is sandwiched between the elastic film 100 and the elastic film 102 by rotating the pivoting member 52 of the left side member 51L in the arrow U1 direction with the left hand. In this state, by welding and cutting the elastic film 100 and the elastic film 102, the glove is produced and put on the right hand.

As described above, in the apparatus 1G, in each of the left side member 51L and the right side member 51R, only one depression of the shape of the hand is sufficient.

Twelfth Embodiment

A twelfth embodiment will be described with reference to FIGS. 51 to 52. Note that description of matters common with the first embodiment is omitted.

In the apparatus 1 according to the first embodiment, the top member 10 moves upward and downward with respect to the bottom member 30, but in the apparatus 1H of the twelfth embodiment, the top member 76 pivots with respect to the bottom member 60 about the shaft 76a in the directions indicated by arrows U1 and U2. That is, in the apparatus 1H, the top member 76 moves relative to the bottom member 60 in the same manner as closing or opening a book.

On the upper face 60a of the bottom member 60, depressions 62L and 62R in the shape of hands are formed. Similarly, a depression (not illustrated) is also formed in the top member 76. On a side face 60b on the front side of the bottom member 60, a hole portion 60c that is elongated rectangular and penetrates even to the inside of the bottom member 60 is formed. One end 68a of an elongated rectangular plate member 68 is connected to the hole portion 60c in a state that the end 68a is movable in the directions of arrows X1 and X2. The other end 68b of the plate member 68 is rotatably connected to a side face 76b on the near side of the top member 76. The side face on the side opposite to the side face 60b and the side face 76b has the same structure.

Figure 51:
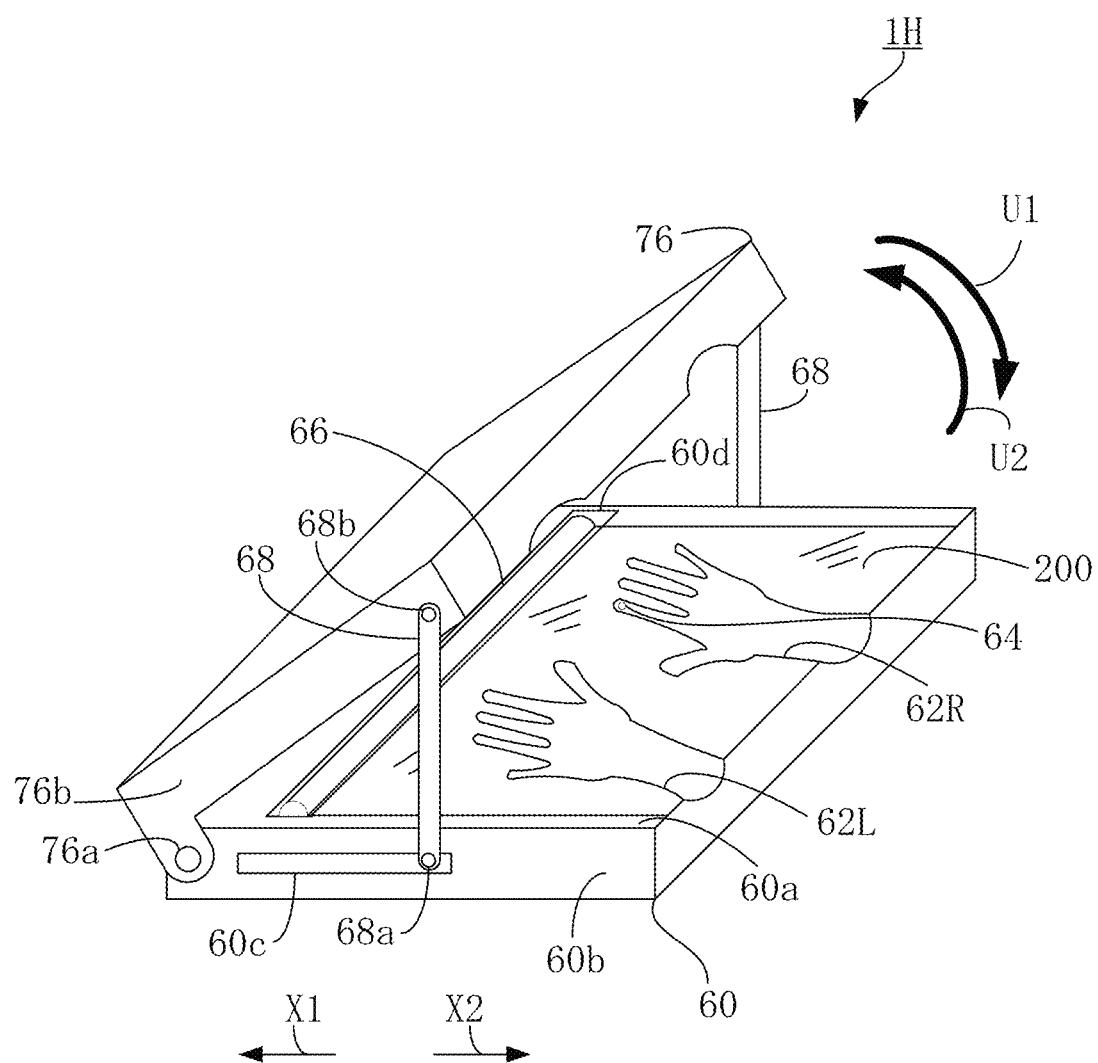
FIG. 51 is a schematic perspective view of an apparatus for producing and putting on gloves according to a twelfth embodiment.

As illustrated in FIG. 51, in a state in which the plate member 68 is upright, the top member 76 is open to the bottom member 60. On the other hand, when the end 68a of the plate member 68 moves the hole portion 60c in the direction of the arrow X1 and the plate member 68 is inclined, the top member 76 pivots toward the bottom member 60 in the arrow U1 direction. The top member has a predetermined weight, and when the plate member 68 is inclined, it is configured so as to gently rotate in the direction of the arrow U1. The predetermined weight is, for example, 5 kilograms (kgs). The plate member 68 is configured to move in the direction of the arrow X2 when the switch 64 disposed in the depression 62R is pressed.

In the bottom member 60, an elongated rectangular groove 60d is formed in the fingertip side portion of the depressions 62L and 62R in the shape of a hand, and the film holder 66 is disposed in the groove 60d. As illustrated in FIG. 52(A), an elastic film 250 is wound and stored in the film holder 66.

As illustrated in FIG. 52(A), the elastic film 250 is formed with a perforated cut portion 252 so that it can be easily cut to a predetermined length. As illustrated in FIG. 52(B), the elastic film 250 is comprised of a top film 250a and a bottom film 250b. A gap 250c is formed between the top film 250a and the bottom film 250b, and by inserting their hand into the gap 250c, the user can put their hand in between the top film 250a and the bottom film 250b. That is, this allows the hand to be sandwiched between the top film 250a and the bottom film 250b.

In order to produce and put on the glove in the apparatus 1H, as illustrated in FIG. 51, with the top member 76 opened, the elastic film 250 is drawn out from the film holder 66, and while the hands are put in between the top film 250a and the bottom film 250b, the left and right hands are placed in the depression 62L and the depression 62R, respectively. When the switch 64 is pressed, the top member 76 slowly moves in the direction of the arrow U1. When the top member 76 is closed, welding and cutting by a welding and cutting unit (not illustrated) is performed, to produce and put on the glove. Upon completion of the producing and putting on of the glove, the user lifts both hands, the top member 76 pivots in the direction of arrow U2, and opens.

Thirteenth Embodiment

A thirteenth embodiment will be described with reference to FIGS. 53 to 58. Note that description of matters common with the first embodiment is omitted.

Figure 53:
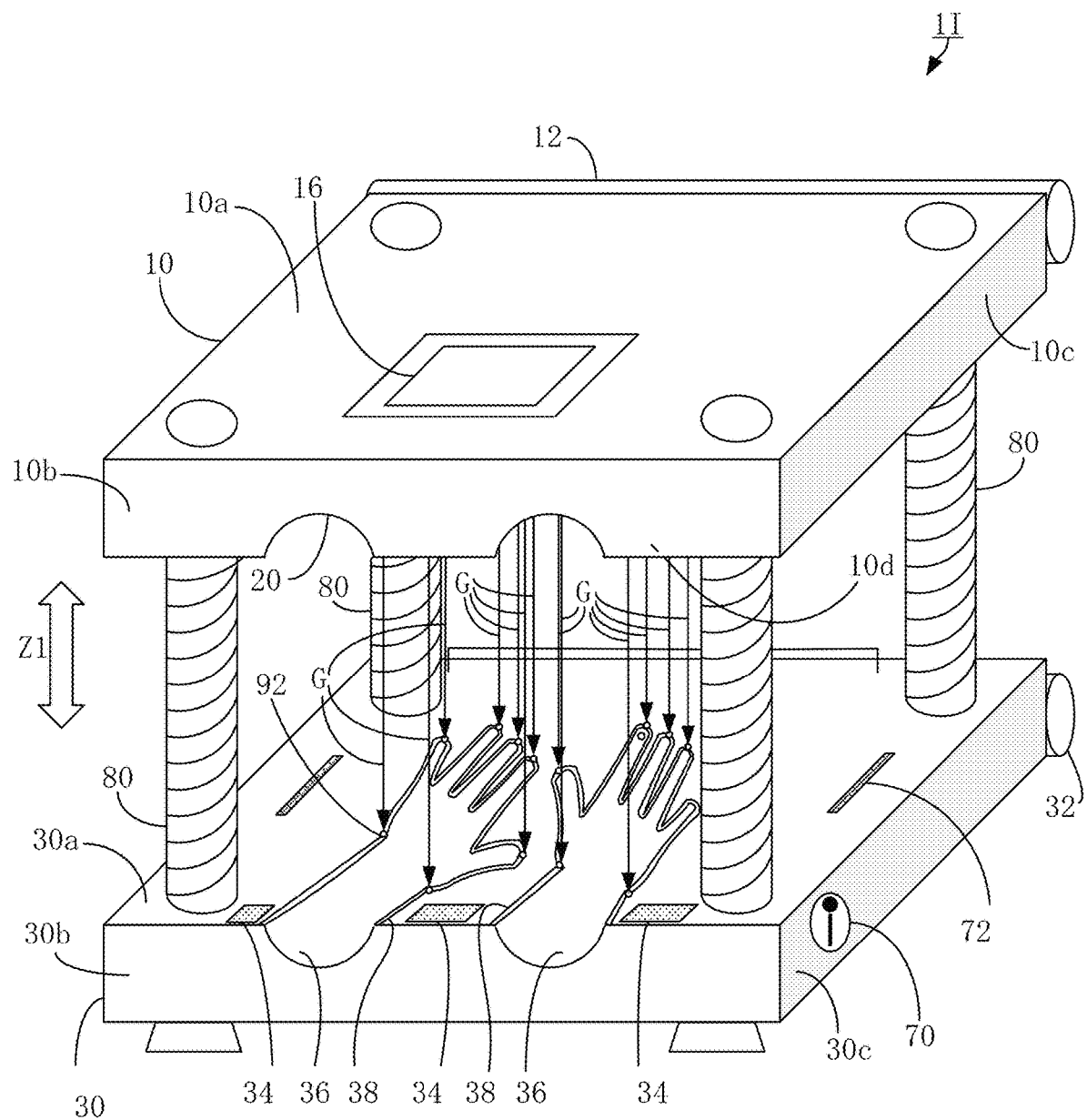
FIG. 53 is a schematic perspective view of an apparatus for producing and putting on gloves according to a thirteenth embodiment.

As illustrated in FIG. 53, in the apparatus 1I of the thirteenth embodiment, along the outer periphery of the shape of the hand of the depression 36, infrared rays G are irradiated from the top member 10 toward the bottom member 30.

Figure 54:
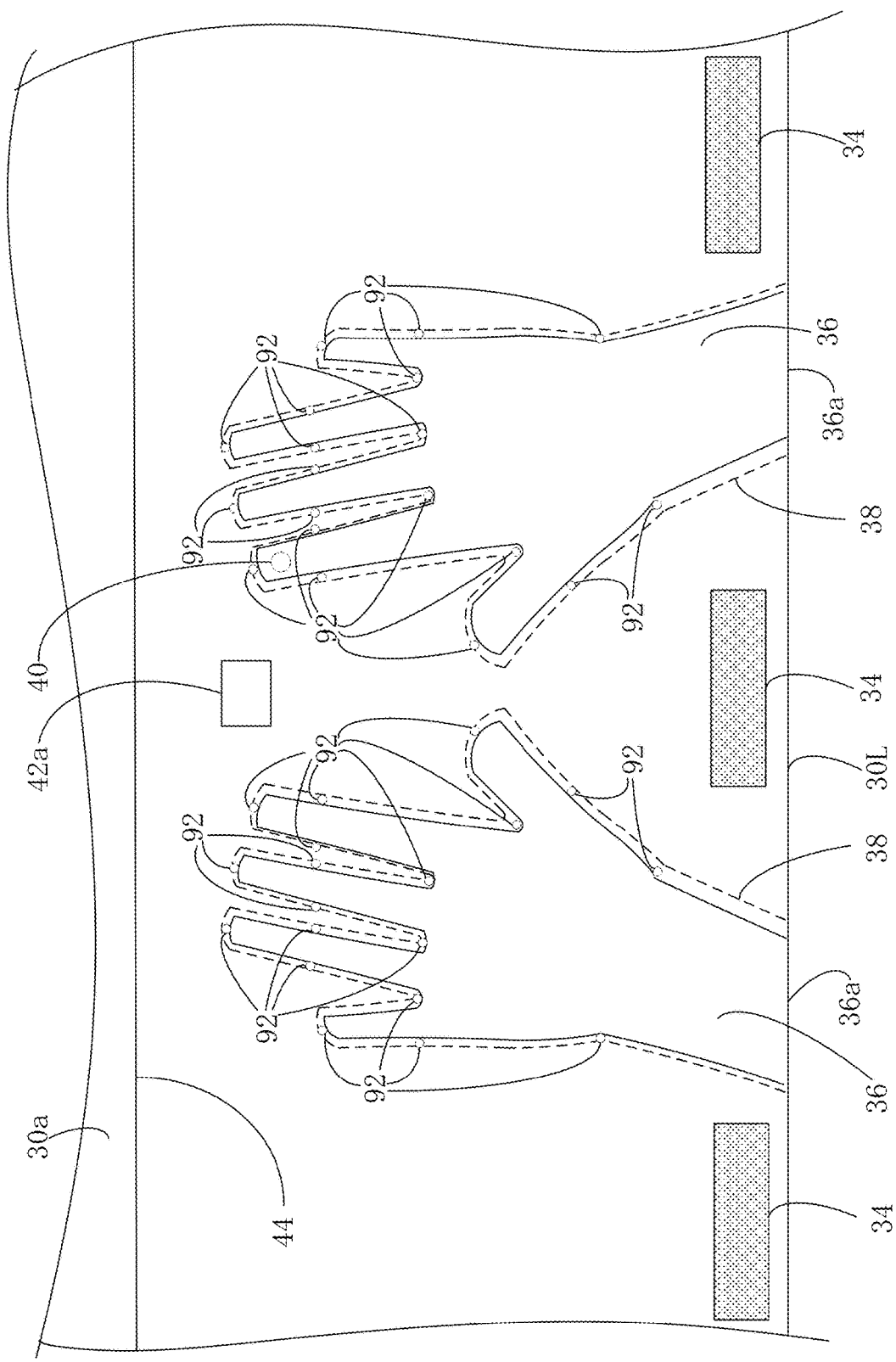
FIG. 54 is a schematic enlarged view illustrating a portion of the bottom member.

As illustrated in FIG. 54, in the shape of the hand of the depression 36, the bottom member 30 is provided with an infrared receiver 92 disposed at locations such as at a fingertip of each finger portion, each side near the intermediate point in the longitudinal direction of each finger portion, and at the attachment root between the two finger portions. That is, the infrared receiver 92 is disposed at a position at least a part of which is covered by the user's hand or fingers when the user's hand or fingers protrude from the depression 36. The infrared receiver 92 is comprised of a photosensor, for example, a photodiode or a phototransistor. Note only a part of the infrared receiver 92 is illustrated in FIG. 53.

Figure 55:
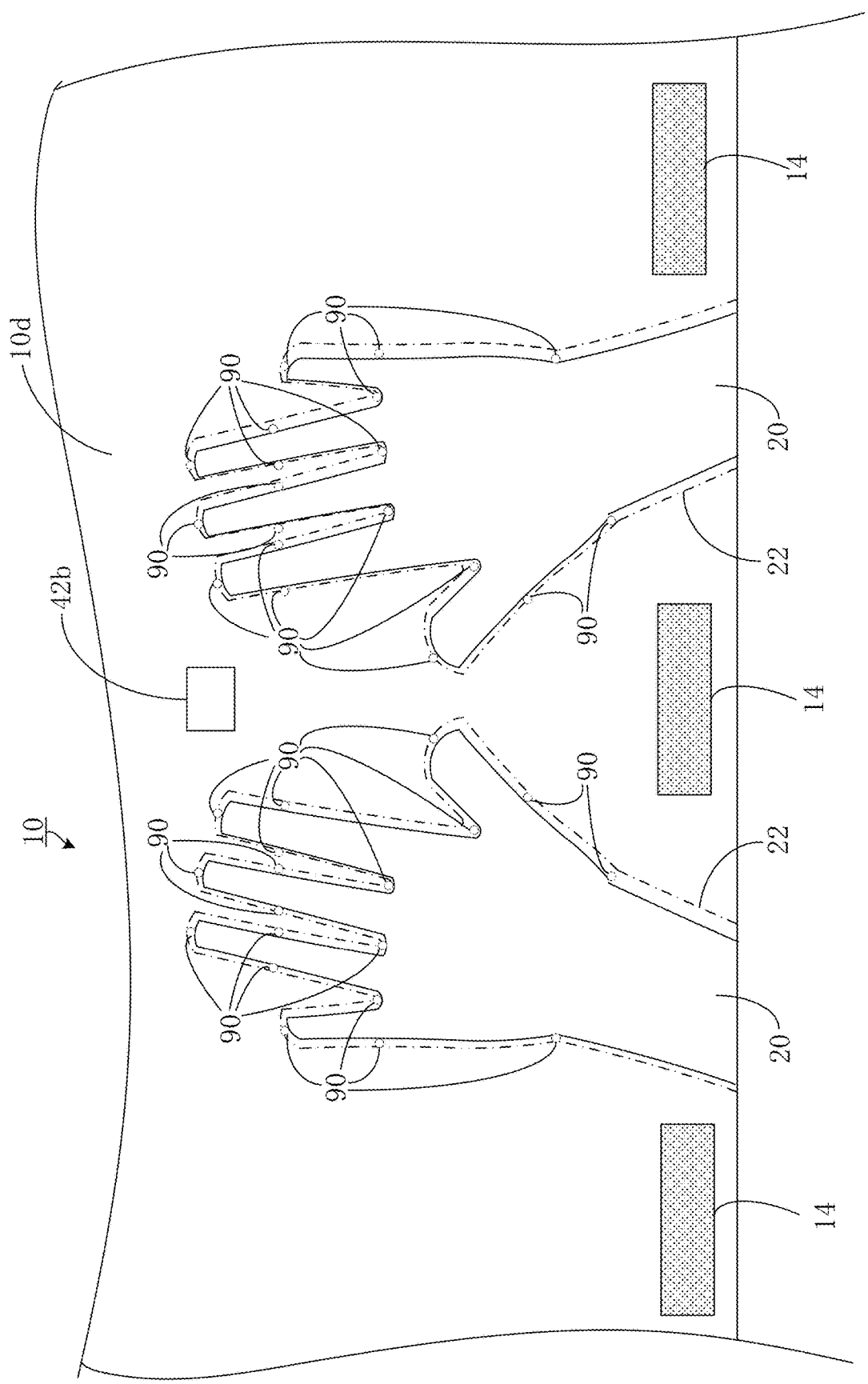
FIG. 55 is a schematic enlarged view illustrating a portion of the top member.

As illustrated in FIG. 55, in the shape of the hand of the depression 20, the top member 10 is provided with infrared projectors 90 disposed at locations such as at the fingertip of each finger portion, each side near an intermediate point along the longitudinal direction of each finger portion, and at the attachment root between the two finger portions. The infrared projector 90 is comprised of, for example, infrared light emitting diodes or infrared laser diodes.

The infrared ray irradiated from each of the infrared projectors 90 disposed on the top member 10 is received by the infrared receivers 92 disposed at the corresponding positions on the bottom member 30. The infrared projectors 90 and the infrared receivers 92 are examples of projection detection means.

As illustrated in FIG. 56(A), the infrared receiver 92 is disposed on the top face 381a of the wall 381 separating the groove 38c from the depression 36.

FIG. 56(B) is a schematic sectional view of the area A in the vicinity of the infrared receiver 92 in FIG. 56(A) as viewed from the front. As illustrated in FIG. 56(B), a recess 381aa is formed on the top face 381a. An infrared receiver 92 is disposed in the recess 381aa.

Figure 57:
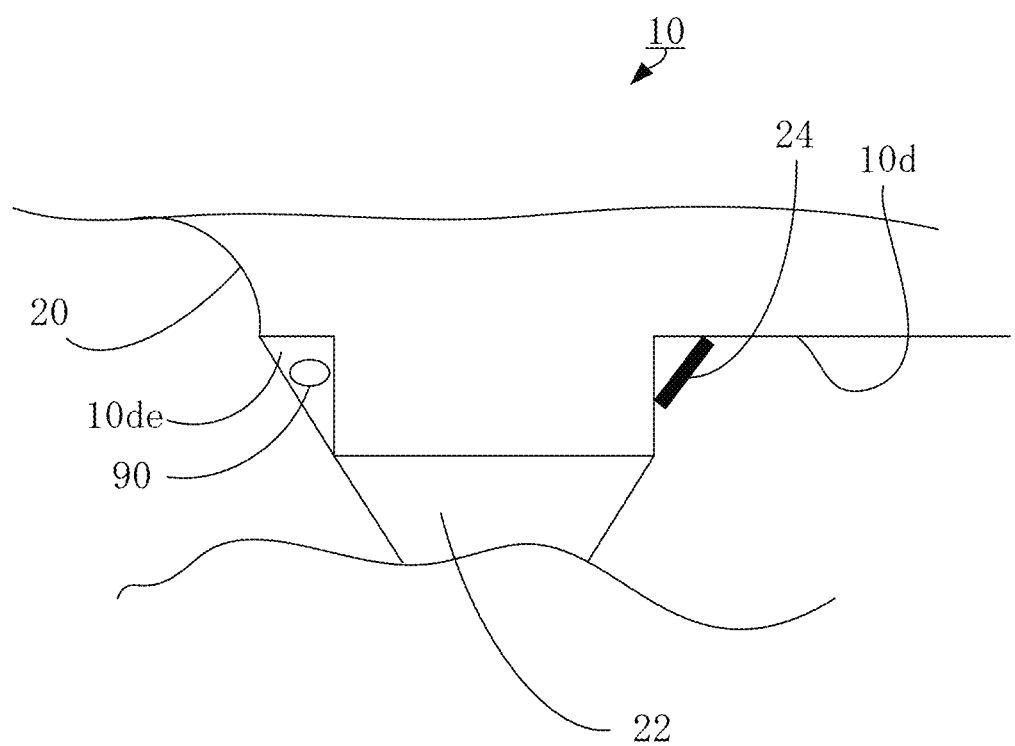
FIG. 57 is a schematic enlarged view illustrating a portion of the top member.

As illustrated in FIG. 57, the infrared projector 90 is disposed on the bottom face 10d of the top member 10 and on the face 10de between the depression 20 and the projection 22. A recess (not illustrated) is formed in the face 10de, and an infrared projector 90 is disposed in the recess.

As described above, the infrared receiver 92 and the infrared projector 90 are disposed in the recesses, so that they do not interfere with the contact between the face 381a of the bottom member 30 and the face 10de of the top member 10.

As illustrated in FIG. 53, the plurality of infrared projector 90 disposed in the top member 10 and the plurality of infrared receivers 92 disposed in the bottom member 30 are arranged such that infrared rays G transmitted from one infrared projector 90 is received by one infrared receiver 92 at a corresponding position. Unlike the present embodiment, the infrared ray G transmitted from one infrared projector 90 may also be received by a plurality of infrared receivers 92.

When the hand of the user protrudes from the depression 36, part or all of the infrared ray G is blocked by the protruding hand, so that an abnormality occurs on the infrared ray G received by at least one infrared receiver 92. As a result, the apparatus 1I detects that the hand of the user protrudes from the depression 36, and performs control such as not starting descent of the top member 10 or stopping descent of the top member 10.

Figure 58:
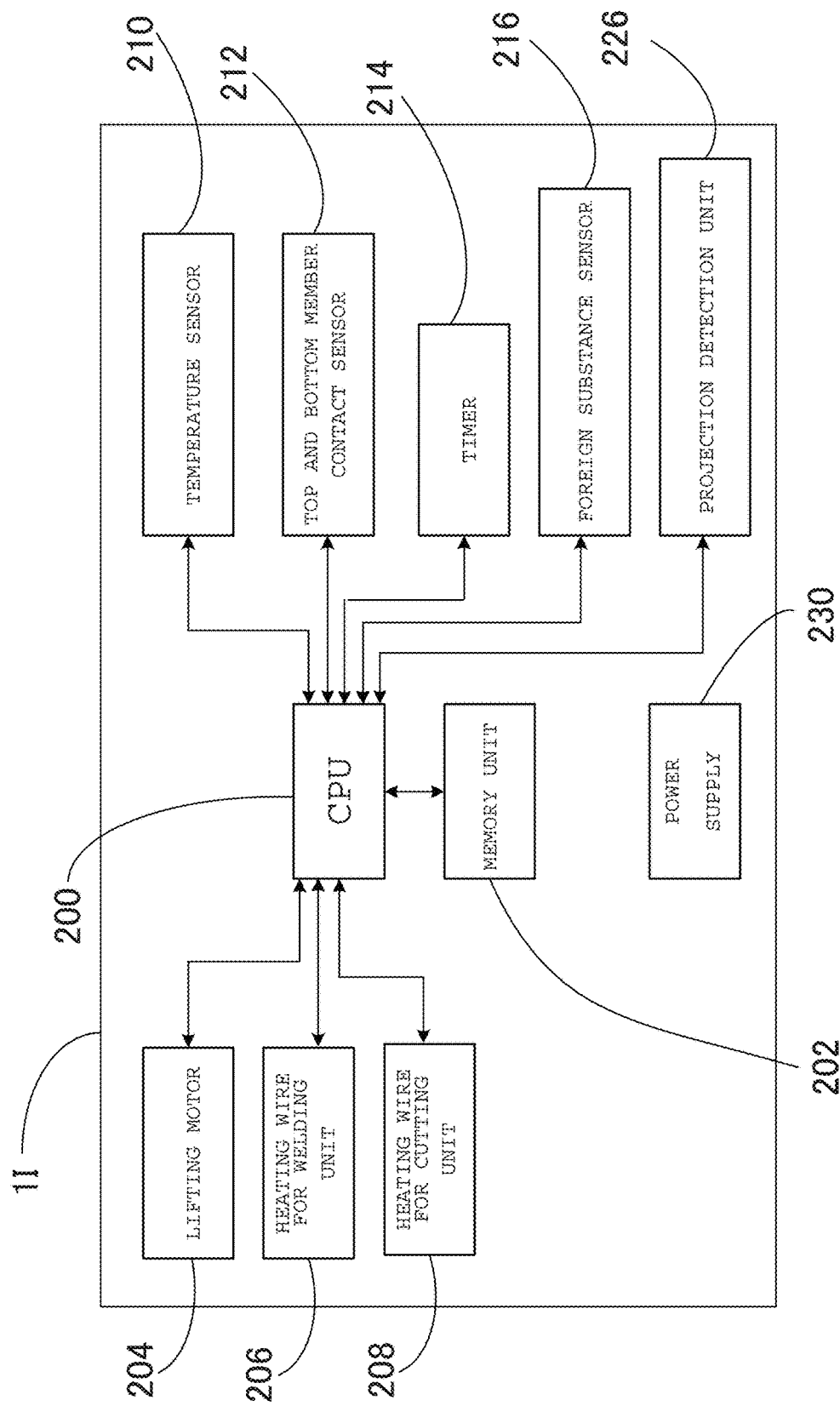
FIG. 58 is a schematic block diagram illustrating the functional configuration of an apparatus for producing and putting on gloves.

As illustrated in FIG. 58, the apparatus 1I has a projection detection unit 226. The projection detection unit 226 detects the reception mode of the infrared ray G received by the infrared receiver 92 from the corresponding infrared projector 90.

A third emergency response program is stored in the memory unit 202. The CPU 200 and the third emergency response program are an example of third emergency response means. When the projection detection unit 226 detects that an abnormality has occurred in the reception mode of the infrared ray G received by any of the infrared receivers 92, the apparatus 1I performs the third emergency operation. The third emergency operation is an operation in which, for example, the power supply to the heating wire for welding 38a and the heating wire for cutting 38b is stopped or energization is not implemented, a warning is displayed on the display device 16, a warning sound is generated from a speaker (not illustrated), or the top member 10 is raised up.

Fourteenth Embodiment

A fourteenth embodiment will be described with reference to FIGS. 59 to 60. Note that description of matters common with the first embodiment is omitted.

Figure 59:
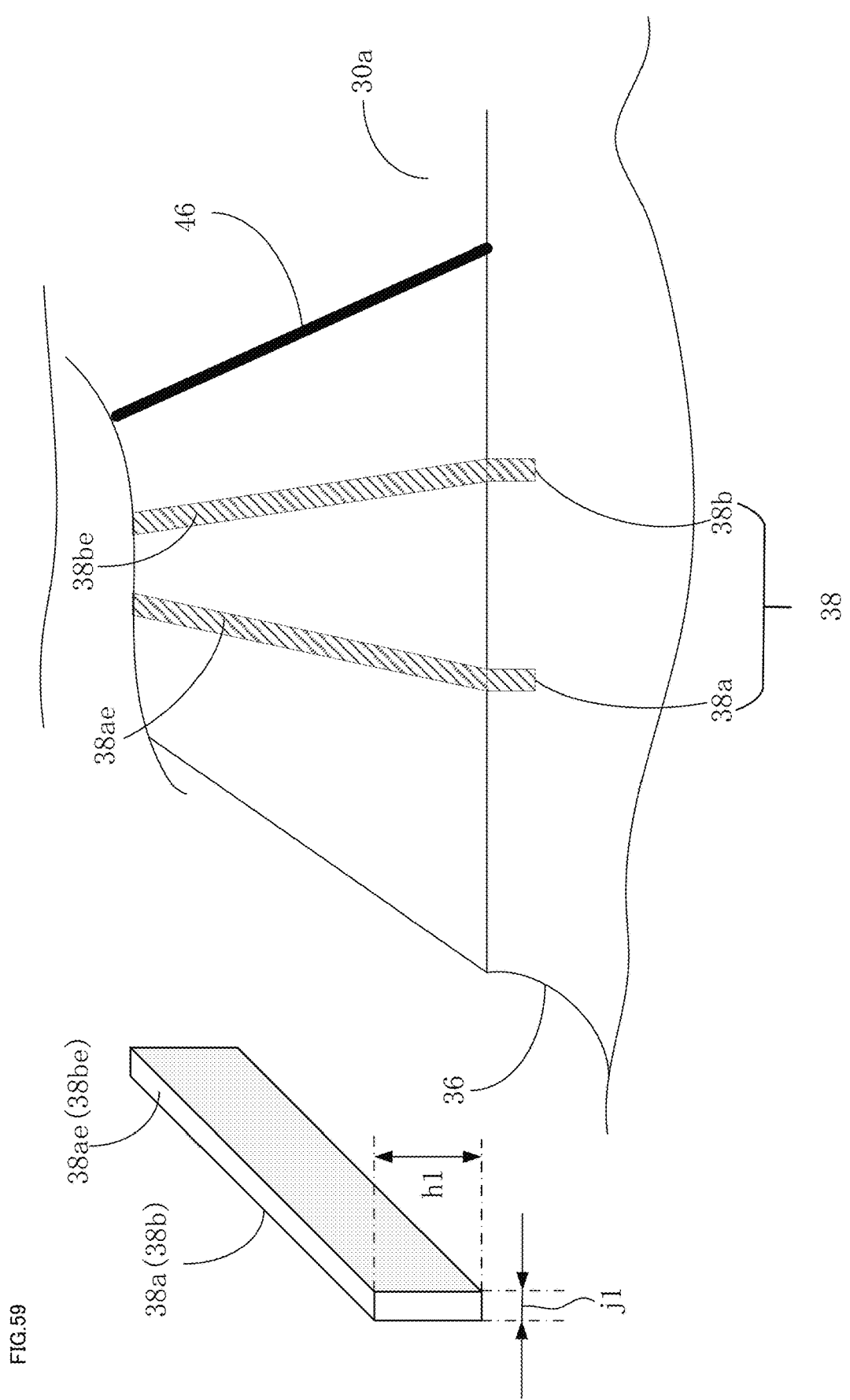
FIG. 59 is a schematic enlarged view illustrating a portion of a bottom member according to a fourteenth embodiment.

As illustrated in FIG. 59, in the fourteenth embodiment, the heating wire for welding 38a and the heating wire for cutting 38b are thin plate-like electric heating members. The heating wire for welding 38a and the heating wire for cutting 38b are, for example, thin plate-shaped nichrome wires (nichrome foil plates) having a height h1 of 5 mm and a width j1 of 0.4 mm.

The upper end surfaces 38ae and 38be of the heating wire for welding 38a and the heating wire for cutting 38b are the same height as the top face 30a of the bottom member 30. That is, unlike the first embodiment, in the present embodiment, the heating wire for welding 38a and the heating wire for cutting 38b are not disposed in the groove portion.

Figure 60:
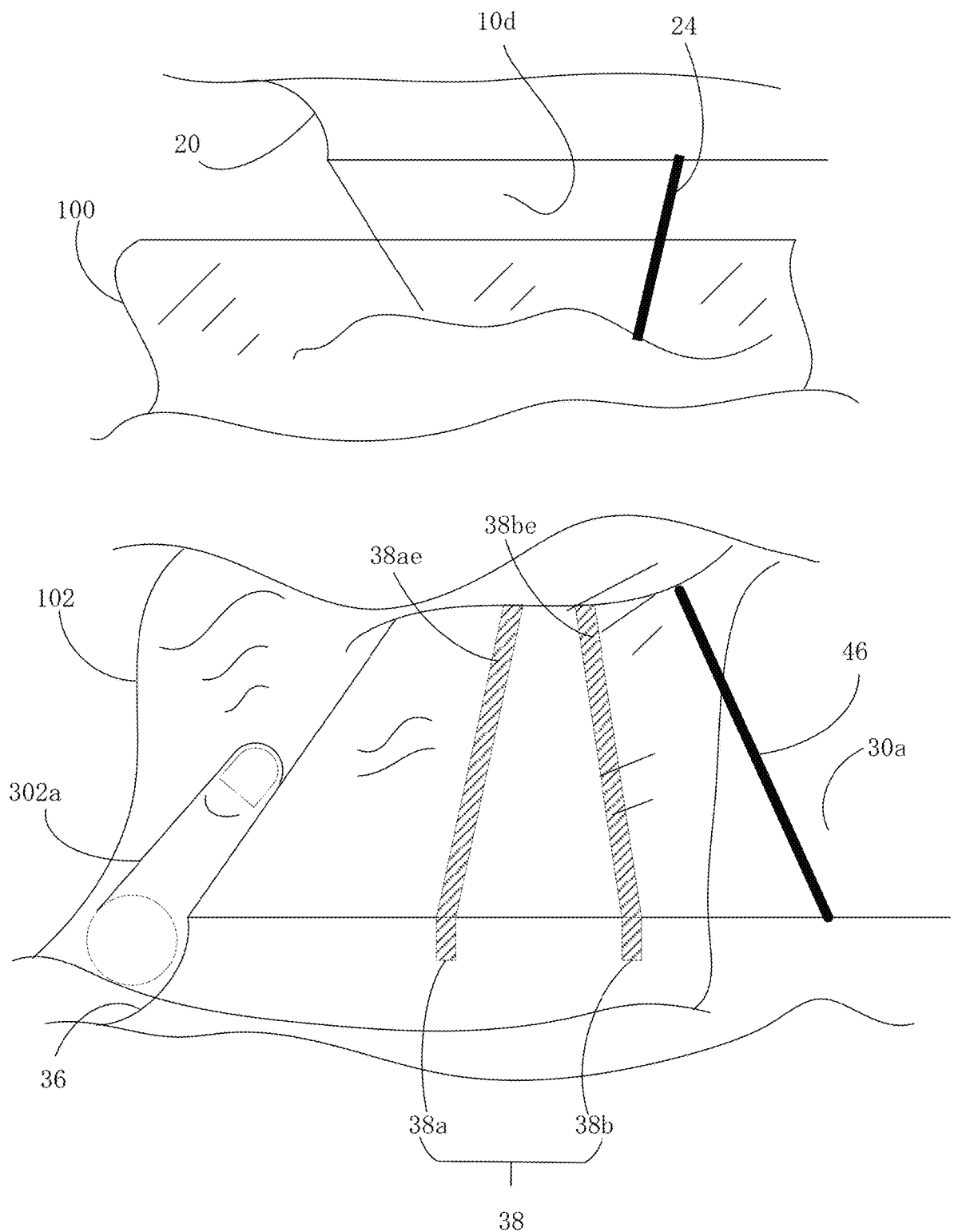
FIG. 60 is a schematic conceptual diagram illustrating a portion of a bottom member and a top member.

As illustrated in FIG. 60, unlike the first embodiment, the top member 10 of the present embodiment does not have a projection. In the present embodiment, the elastic films 100 and 102 are configured to be welded and cut in a state in which the elastic films 100 and 102 are sandwiched between the heating wire for welding 38a and the heating wire for cutting 38b and the bottom face 10d of the top member 10.

Fifteenth Embodiment

Figure 61:
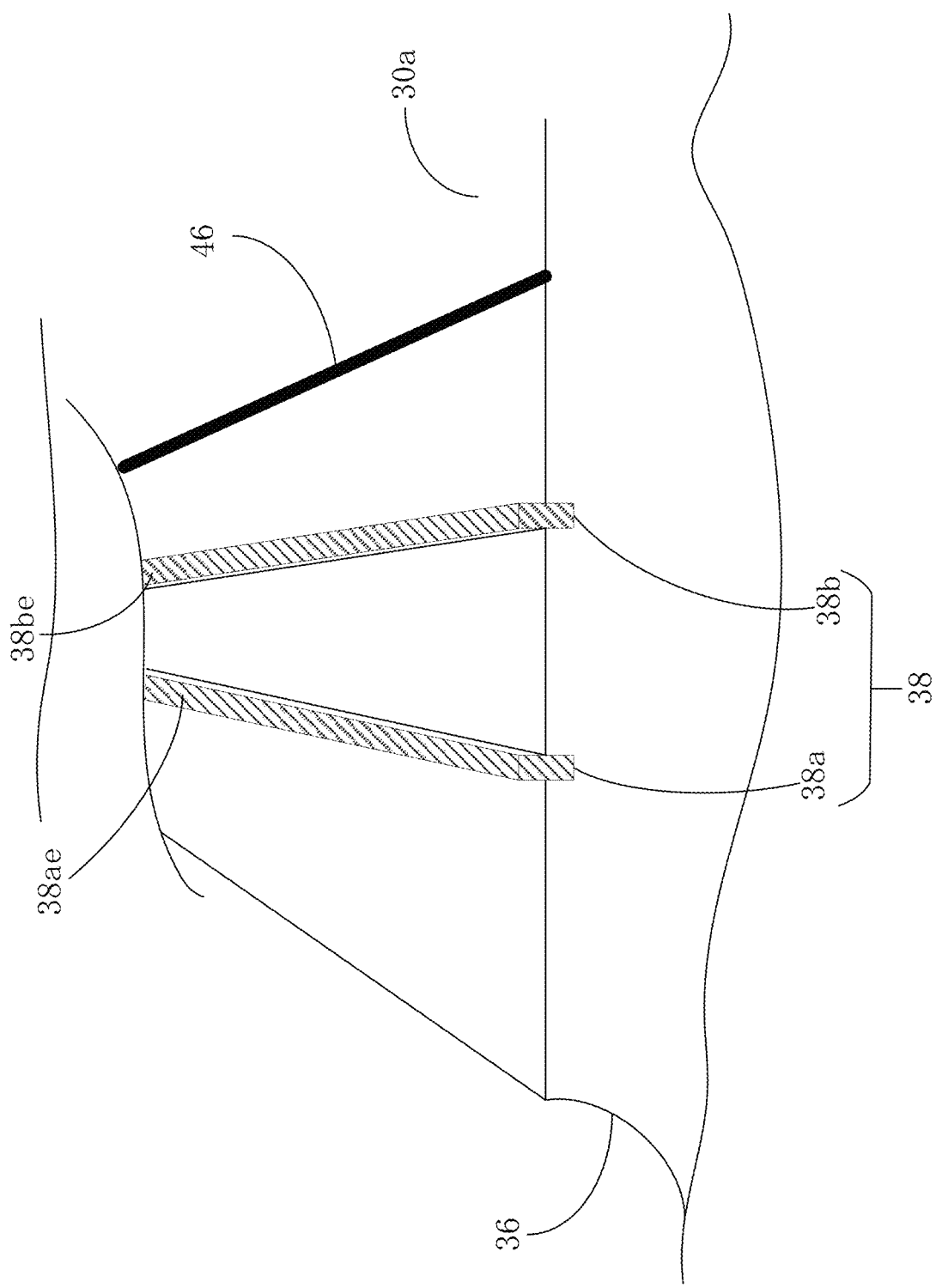
FIG. 61 is a schematic enlarged view illustrating a portion of a bottom member according to a fifteenth embodiment.

A fifteenth embodiment will be described with reference to FIG. 61. Note that description of matters common with the fourteenth embodiment is omitted.

In the fifteenth embodiment, the top end surfaces 38ae and 38be of the heating wire for welding 38a and the heating wire for cutting 38b are slightly higher than the top face 30a of the bottom member 30. That is, the top end surfaces 38ae and 38be of the heating wire for welding 38a and the heating wire for cutting 38b slightly protrude from the top face 30a of the bottom member 30. The height of the projection is, for example, 0.1 mm.

Sixteenth Embodiment

A sixteenth embodiment will be described with reference to FIG. 62. Note that description of matters common with the fourteenth embodiment is omitted.

Figure 62:
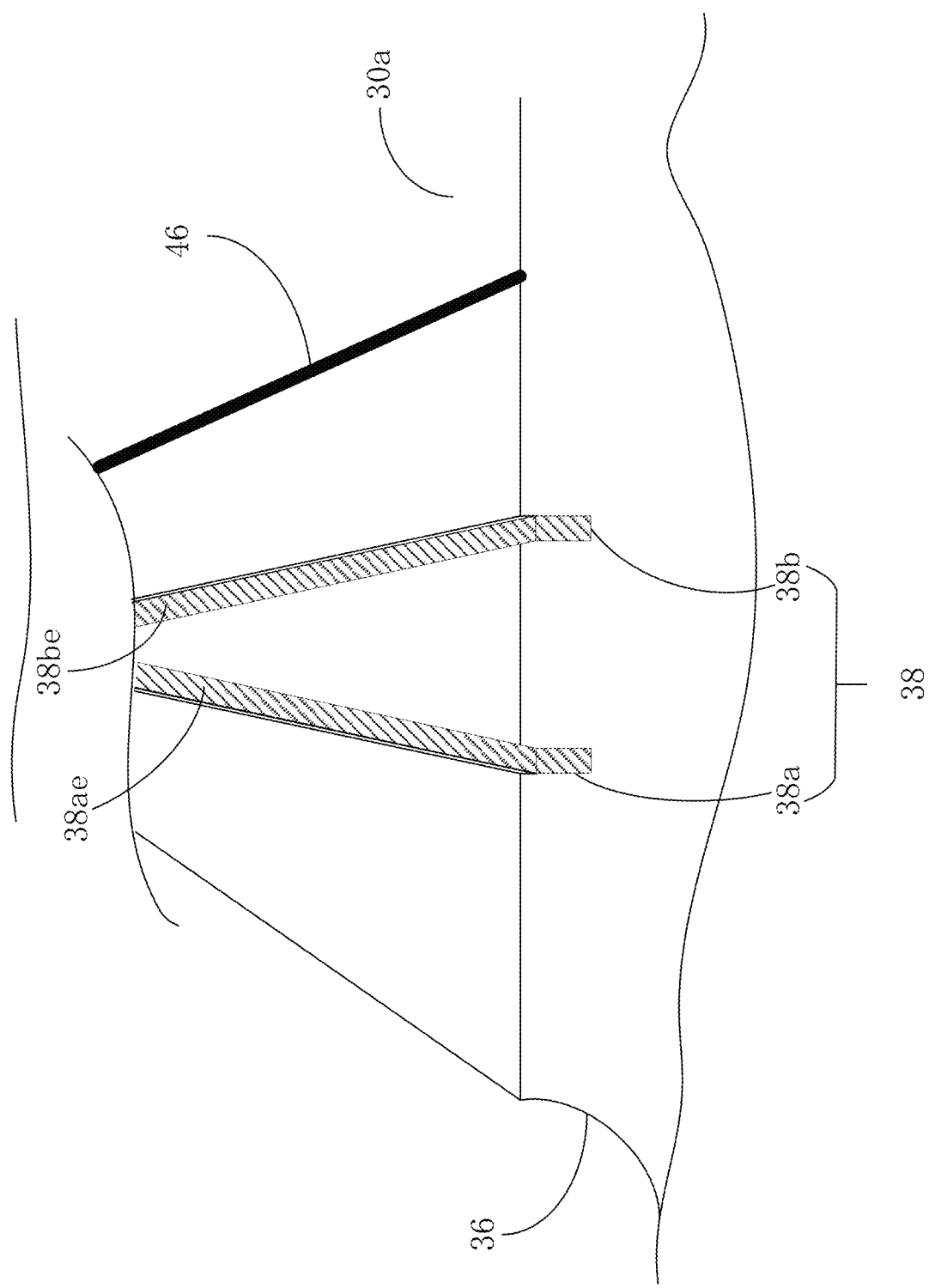
FIG. 62 is a schematic enlarged view illustrating a portion of a bottom member according to a sixteenth embodiment.

As illustrated in FIG. 62, in the sixteenth embodiment, the top end surfaces 38ae and 38be of the heating wire for welding 38a and the heating wire for cutting 38b are slightly lower than the top face 30a of the bottom member 30. That is, the top end surfaces 38ae and 38be of the heating wire for welding 38a and the heating wire for cutting 38b are slightly recessed with respect to the top face 30a of the bottom member 30. The extent of the depression is, for example, 0.1 mm.

Seventeenth Embodiment

A seventeenth embodiment will be described with reference to FIG. 63. Note that description of matters common with the fourteenth embodiment is omitted.

Figure 63:
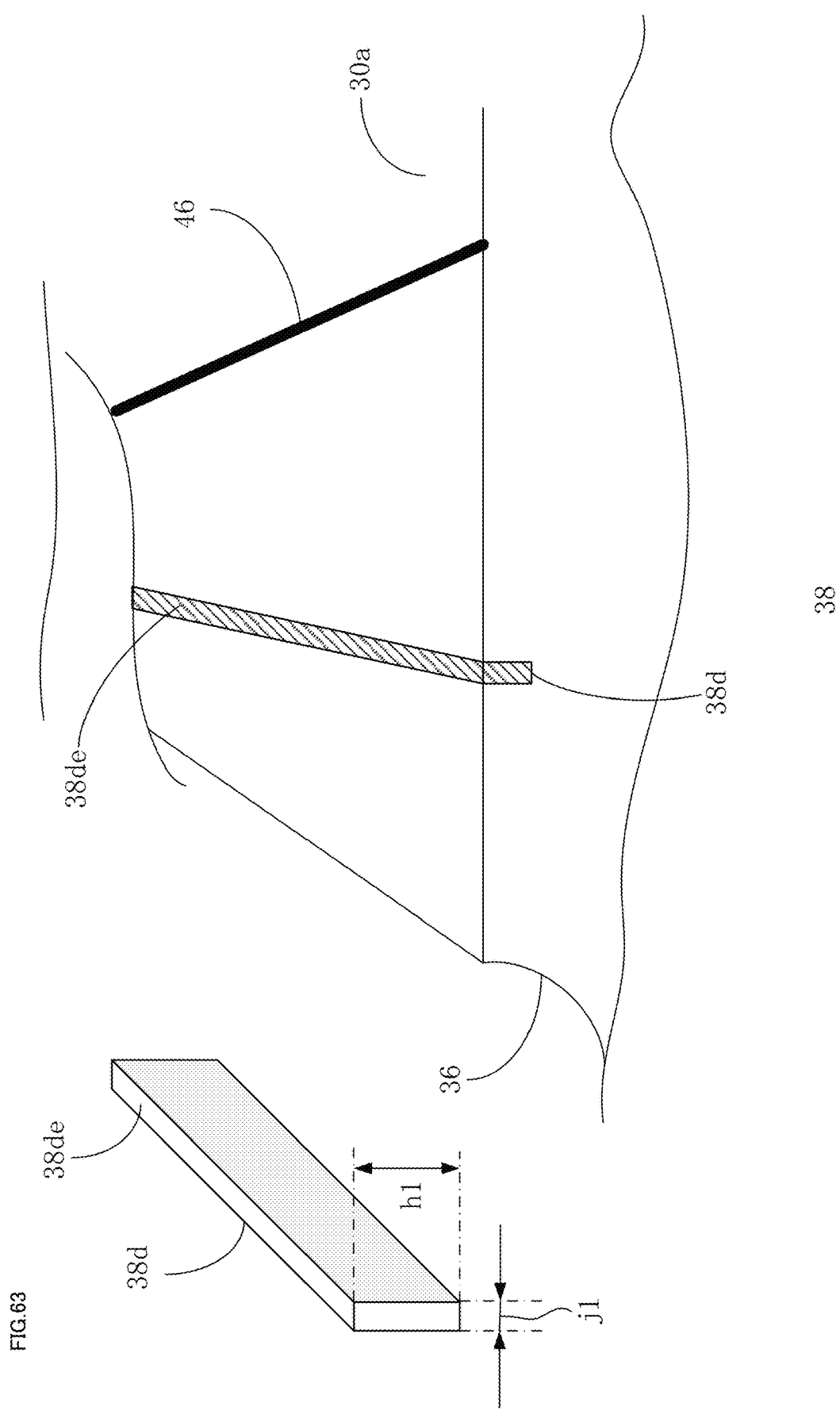
FIG. 63 is a schematic enlarged view illustrating a portion of a bottom member according to a seventeenth embodiment.

As illustrated in FIG. 63, in the seventeenth embodiment, a heating wire for welding and cutting 38d is disposed on the top face 30a of the bottom member 30. The heating wire for welding and cutting 38d is a thin plate-like nichrome wire.

For example, the heating wire for welding and cutting 38*d* has a height h1 of 5 mm and a width j1 of 0.4 mm. Welding and cutting of the elastic film 100 and the elastic film 102 are performed by the heating wire for welding and cutting 38*d* as in the seventh embodiment.

The top end face 38*de* of the heating wire for welding and cutting 38*d* has the same height as the top face 30*a* of the bottom member 30. That is, unlike the seventh embodiment, in the present embodiment, the heating wire for welding and cutting 38*d* is not disposed in the groove. Note that unlike the present embodiment, the top end face 38*de* of the heating wire for welding and cutting 38*d* may protrude slightly, for example, by 0.1 mm from the top face 30*a* of the bottom member 30, or may be recessed.

Eighteenth Embodiment

An eighteenth embodiment will be described with reference to FIGS. 64 to 77. Note that description of matters common with the first embodiment is omitted.

Figure 64:
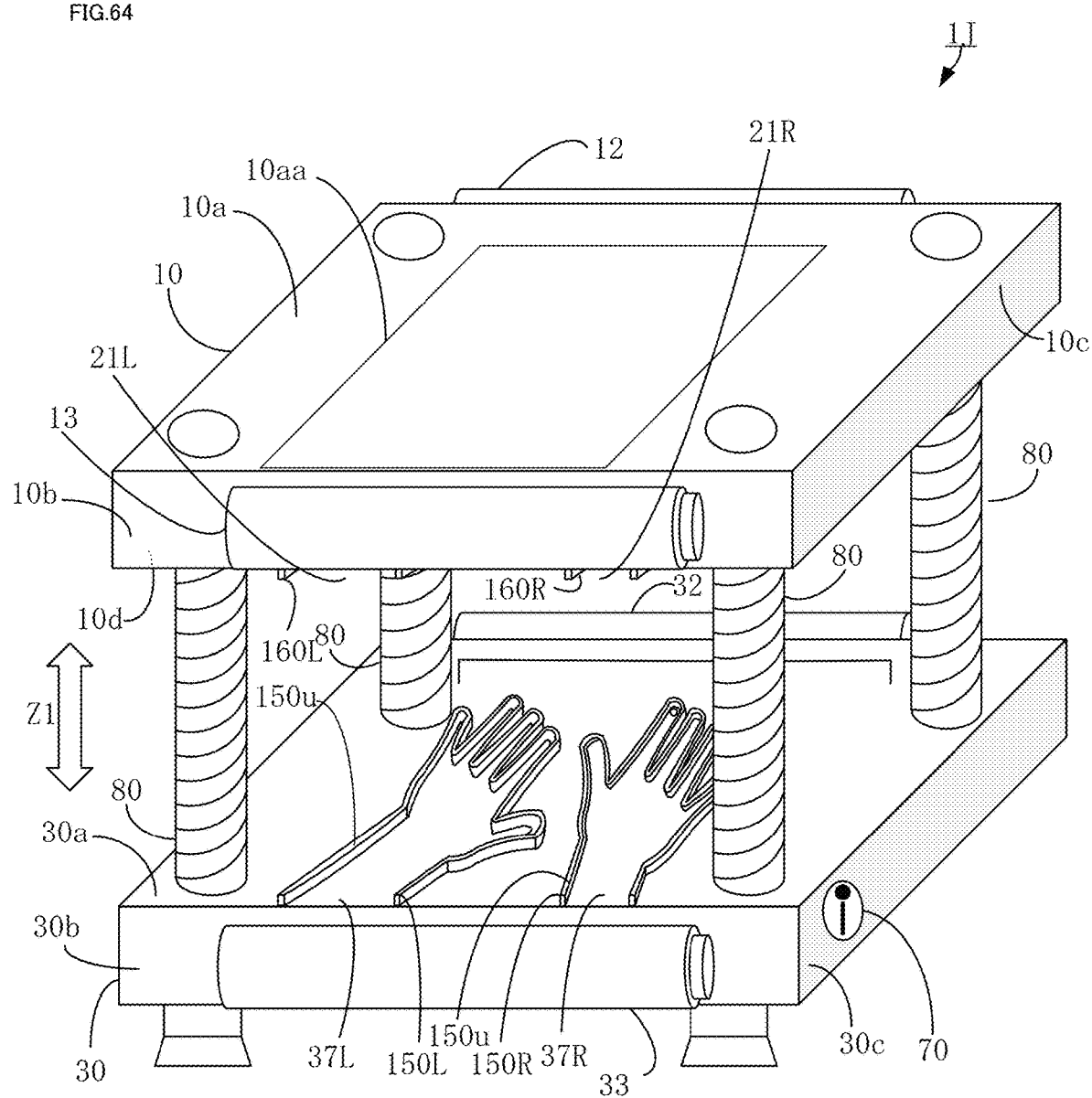
FIG. 64 is a schematic perspective view of an apparatus for producing and putting on gloves according to an eighteenth embodiment.

As illustrated in FIG. 64, in the apparatus 1J according to the eighteenth embodiment, hand holding portions 37L and 37R are formed in the bottom member 30. In the top member, hand holding portions 21L and 21R are formed. The hand holding portions 21L and 21R are examples of a first hand holding portion, and the hand holding portions 37L and 37R are an example of a second hand holding portion.

The hand holding portions 37L and 37R of the bottom member 30 are formed by the frame members 150L and 150R and the top face 30*a*. The frame members 150L and 150R are examples of a second frame member. The frame members 150L and 150R are configured in the shape of a palm (including the shape of the fingers) and the contour of a wrist. The heating wire for welding 151*a* and the heating wire for cutting 151*b* (see FIG. 69) are disposed on the top faces 150*u* of the frame members 150L and 150R. The heating wire for welding 151*a* and the heating wire for cutting 151*b* are examples of welding and cutting means.

The hand holding portions 21L and 21R of the top member 10 are formed by the frame members 160L and 160R and the bottom face 10*d*. The frame members 160L and 160R are an example of a first frame member. The frame members 160L and 160R are configured in the shape of the palm (including the shape of fingers) and the contour of the wrist. On the bottom face 160*u* (see FIG. 66) of the frame members 160L and 160R, a pressing member 161 (see FIG. 67 and FIG. 68) for pressing the elastic films 100 and 102 against the heating wire for welding 151*a* and the heating wire for cutting 151*b* (see FIG. 69) are arranged. The pressing member 161 is an example of pressing means.

In the top member 10, the central portion 10*aa* is formed of a transparent member, and the user can visually confirm the frame members 150L and 150R of the bottom member 30, the frame members 160L and 160R of the top member 10 and the hand (see FIG. 64).

Film holders 32 and 33 are disposed on the bottom member 30. The film holder 33 is disposed on the front face 30*b* and the top end of the outer periphery portion of the film holder 33 is disposed so as to be positioned lower than the position of the tangent line between the front face 30*b* and the top face 30*a*. Through this when the user's hand is held in the frame members 150L and 150R, the film holder 33 does not interfere with the hand of the user. A rotating shaft disposed in the film holder 33 and around which the elastic film 102 is wound is connected to a motor (not illustrated) disposed in the bottom member 30, and is rotated by the power of the motor. The elastic film 102 stored in the film holder 32 is wound up by the film holder 33 and arranged on the top face 30*a*. In other words, the direction from the back side to the front side is the winding direction. Further, after producing the glove, the film holder 33 winds and stores the elastic film 102 after use.

Film holders 12 and 13 are disposed on the top member 10. The bottom end of the outer periphery portion of the film holder 13 is disposed so as to be positioned higher than the position of the tangent line between the front face 10*b* and the bottom face 10*d*. Through this, when the user's hand is held in the frame members 160L and 160R, the film holder 13 does not interfere with the hand of the user. The elastic film 100 stored in the film holder 12 is wound up by the film holder 13 and arranged on the bottom face 10*d*. Further, after producing the glove, the film holder 13 winds and stores the elastic film 100 after use.

FIG. 65(A) is a schematic view illustrating the top face 30*a* of the bottom member 30. On the top face 30*a*, rectangular heating wires for cutting 35L and 35R are arranged so as to surround the frame members 150L and 150R formed in the shape of a quadrangle, respectively. In other words, the rectangular heating wires for cutting 35L and 35R are arranged so as to cut the elastic films 100 and 102 into quadrilateral shapes outside the portion where the heating wire for welding 151*a* and the heating wire for cutting 151*b* weld and cut the elastic films 100 and 102. The rectangular heating wires for cutting 35L and 35R are an example of the outer cutting means.

FIG. 65(B) is a schematic view illustrating the rectangular heating wires for cutting 35L and 35R. The rectangular heating wires for cutting 35L and 35R are composed of a left side, a right side and a top side, and there is no bottom side (a side in the front direction). That is, the end 35*a* of the left side and the end 35*b* of the right side are not connected. On the top face 30*a*, there is a predetermined distance between the rectangular heating wires for cutting 35L and 35R, there is a predetermined distance between the rectangular heating wire for cutting 35L and the left end of the elastic film 102, and there is a predetermined distance between the rectangular heating wire for cutting 35R and the right end of the elastic film 102. The rectangular heating wires for cutting 35L and 35R are configured to cut so as to leave both ends and the central portion of the elastic film 100 and the elastic film 102 in a direction perpendicular to the winding direction of the elastic film 100 and the elastic film 102.

FIG. 66 is a schematic view illustrating the bottom face 10*d* of the top member 10. As illustrated in FIG. 66, rectangular pressing members 11L and 11R are disposed on the bottom face 10*d* so as to surround the frame members 160L and 160R in a quadrilateral shape. The rectangular pressing members 11L and 11R also include a left side, a right side and a top side, and the bottom side does not exist. That is, the end 11*a* on the left side and the end 11*b* on the right side are not connected. On the bottom face 10*d*, there is a predetermined distance between the rectangular pressing members 11L and 11R, there is a predetermined distance between the rectangular pressing member 11L and the left end of the elastic film 100, and there is a predetermined distance between the rectangular pressing member 11R and the right end of the elastic film 100.

When the top member 10 is lowered, in a state where the elastic films 100 and 102 are sandwiched between the rectangular heating wires for cutting 35L and 35R and the rectangular pressing members 11L and 11R, the elastic films 100 and 102 are heated while being pressurized so as to cut the elastic films 100 and 102 into quadrangular shapes.

Figure 68:
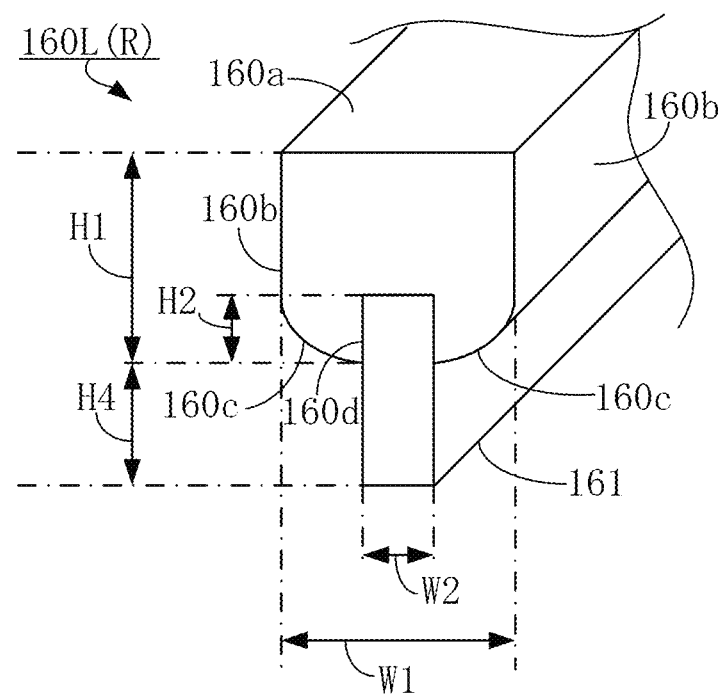
FIG. 68 is a schematic view illustrating a frame member of a top member.

The frame members 160L and 160R of the top member 10 will be described in detail while referencing FIGS. 67 and 68. FIGS. 67 and 68 are schematic enlarged views illustrating a part of the frame member 160L(R). As illustrated in FIG. 67(A), the frame member 160L(R) is comprised of a top face 160a, a side face 160b formed perpendicular to the top face 160a, a curved surface 160c continuous with the side face 160b, and a recess 160d. The top face 160u illustrated in FIG. 66 corresponds to the curved surface 160c and the recess 160d. The curved surface 160c is the outer surface of the left side portion 160cL and the right side portion 160cR. The curved surface 160c is formed so that the distance between the outer side faces of the left side portion 160cL and the right side portion 160cR becomes narrower as it goes downward. The inner side faces of the left side portion 160cL and the right side portion 160cR are formed perpendicular to the top face 160a, and form a recess 160d with the ceiling face 160da. A pressing member 161 (see FIG. 67(B)) is fixed to the recess 160d (see FIG. 68). The pressing member 161 is formed of a heat-resistant elastic material. The heat-resistant elastic material is, for example, silicone rubber.

The height H1 of the frame member 160L(R) is, for example, 30 mm. The height of the left side portion 160cL and the right side portion 160cR, that is, the height (depth) H2 of the recess 160d is, for example, 3 mm. The height H3 of the pressing member 161 is, for example, 9 mm. The height H4 at which the pressing member 161 protrudes from the recess 160d in a state where the top face 161b of the pressing member 161 is in contact with the ceiling face 160da of the recess 160d and the pressing member 161 is fixed to the recess 160d (see FIG. 68) is defined to be larger than the depth of the recess 150d of the frame member 150L(R), and is, for example, 6 mm. The width W1 of the frame member 160L(R) is, for example, 9 mm. The width W2 of the recess 160d is, for example, 3 mm, which is equal to the width of the pressing member 161.

Figure 69:
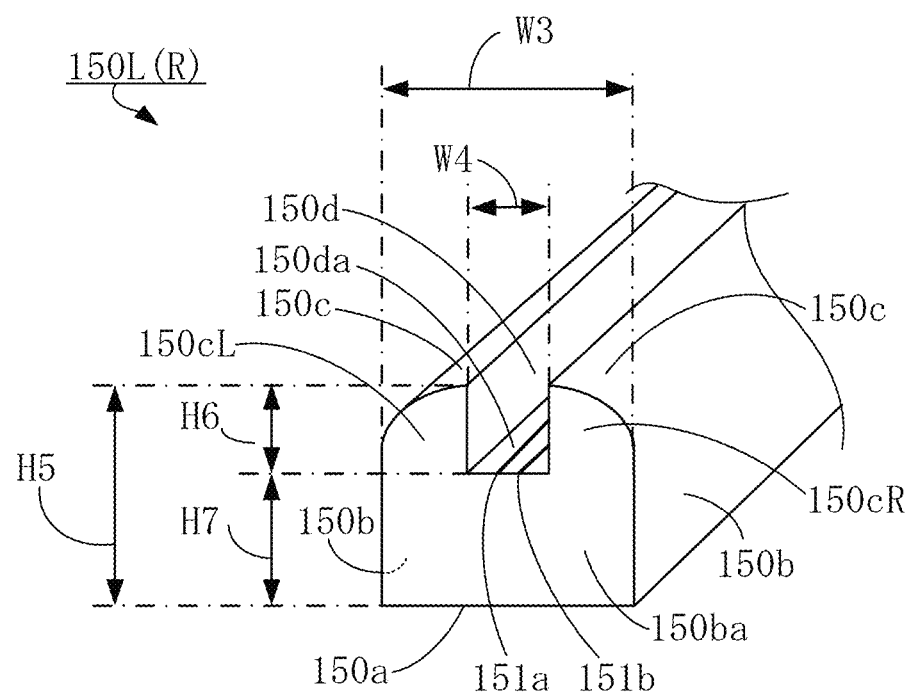
FIG. 69 is a schematic view illustrating a frame member of a bottom member.

FIG. 69 is a schematic enlarged view illustrating a part of the frame member 150L(R). The frame member 150L(R) is comprised of a bottom face 150a, a side face 150b formed perpendicular to the bottom face 150a, a curved surface 150c continuous with the side face 150b, and a recess 150d. The curved surface 150c is the outer surface of the left side portion 150cL and the right side portion 150cR. The curved surface 150c is formed so that the distance between the outer side faces of the left side portion 150cL and the right side portion 150cR becomes narrower as it goes upward. The inner side faces of the left side portion 150cL and the right side portion 150cR are formed perpendicular to the bottom face 150a, and form a recess 150d with the bottom face 150da of the recess 150d. A heating wire for welding 151a and a heating wire for cutting 151b are fixed to the bottom face 150da of the recess 150d.

The height H5 of the frame member 150L(R) is, for example, 30 mm, which is equal to the height H1 of the main body of the frame member 160L(R). The height of the left side portion 150cL and the right side portion 150cR, that is, the height (depth) H6 of the recess 150d is, for example, 4 mm. The width W3 of the frame member 150 is, for example, 9.5 mm. The width W4 of the recess 150d is, for example, 3.5 mm, which is larger than the width W2 of the pressing member 161.

As described above, since the height H4 at which the pressing member 161 protrudes from the recess 160d is defined to be greater than the depth of the recess 150d of the above-described frame member 150L(R), the frame member 150L(R) and the frame member 160L(R) are not in direct contact with each other in a state (see FIG. 73) in which the pressing member 161 enters the recess 150d and is in contact with the heating wire for welding 151a and the heating wire for cutting 151b. As described above, when the pressing member 161 protrudes from the recess 160d and the height H4 is 6 mm, and the height of the recess 150d is 4 mm, in the state where the pressing member 161 comes into contact with the heating wire for welding 151a and the heating wire for cutting 151b (see FIG. 73), the top end of the frame member 150L(R) and the bottom end of the frame member 160L(R) are deviated at least by 2 mm.

When the top member 10 is lowered toward the bottom member 30, the pressing member 161 enters the recess 150d, and the tip portion 161a of the pressing member 161 contacts the heating wire for welding 151a and the heating wire for cutting 151b disposed on the bottom face 150da of the recess 150d and can be pressed. Since the top portion of the frame member 150L(R) is a curved surface 150c and the bottom portion of the frame member 160L(R) is a curved surface 160c, the user's fingers will never be pinched between the frame member 150L(R) and the frame member 160L(R). In other words, since the shapes of the frame member 150L(R) and the frame member 160L(R) are configured to be closest to each other at a position having a predetermined distance from the hand (finger) of the user, the user's fingers will never be pinched.

Figure 70:
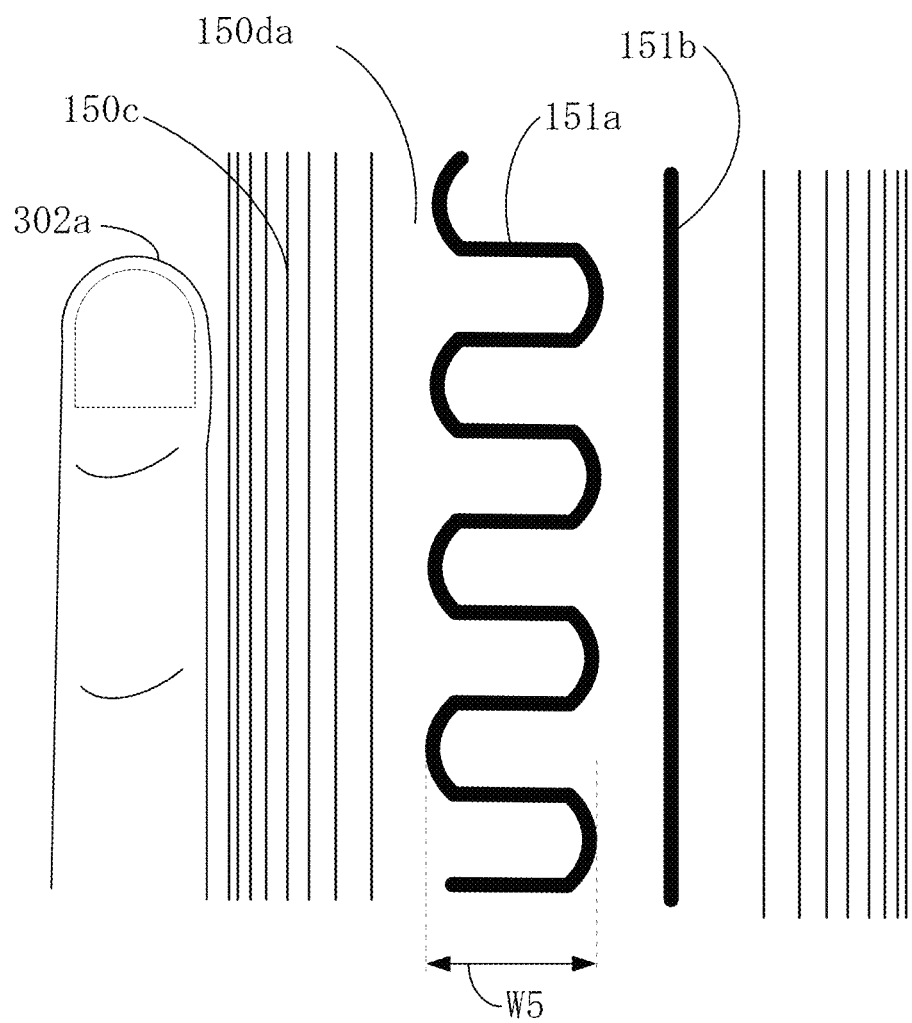
FIG. 70 is a schematic view illustrating a heating wire for welding and a heating wire for cutting.

With reference to FIG. 70 and FIG. 71, the heating wire for welding 151a and the heating wire for cutting 151b will be described. The heating wire for welding 151a and the heating wire for cutting 151b are thin plate-shaped heating wires and generate heat as current flows. The heating wire for welding 151a and the heating wire for cutting 151b are formed of, for example, stainless steel which has excellent heat generation characteristics. The heating wire for welding 151a is formed to have a predetermined width W5 and is formed, for example, in a corrugated shape. The width W5 is, for example, 2 mm. As a result, the elastic films 100 and 102 can be firmly welded together. On the other hand, the heating wire for cutting 151b is configured to cut the elastic films 100 and 102, and is formed in a straight line.

As illustrated in FIGS. 71(A) and 71(B), in the heating wire for welding 151a and the heating wire for cutting 151b, the heating wire main body 151c is sandwiched between the heat resistant films 151d and the release film 151e is arranged on the top. The heat resistant film 151d is configured to prevent the heat of the heating wire main body 151c from being directly transmitted to the bottom member 30. The release film 151e is configured so that after the elastic films 100 and 102 are welded and cut by the heating wire for welding 151a and the heating wire for cutting 151b while being pressed by the pressing member 161, it can be easily released from the welded and cut elastic film 100. The heat resistant film 151d is, for example, a heat-resistant cellophane. The release film 151e is, for example, a fluorine tape having heat resistance.

FIG. 72 illustrates a state in which the frame member 160L(R) of the top member 10 descends (in the direction of arrow Z1a) toward the frame member 150L(R) of the bottom member 30. The hand of the user is placed on the frame member 150L(R), and only the portion where the little finger 302a is arranged is illustrated. The elastic film 102 disposed on the bottom member 30 is positioned below the little finger 302a. From the state of FIG. 72(A), the elastic film 100 disposed on the top member 10 is lowered while contacting the tip of the pressing member 161 and comes into contact with the elastic film 102 (FIG. 72(B)).

Figure 73:
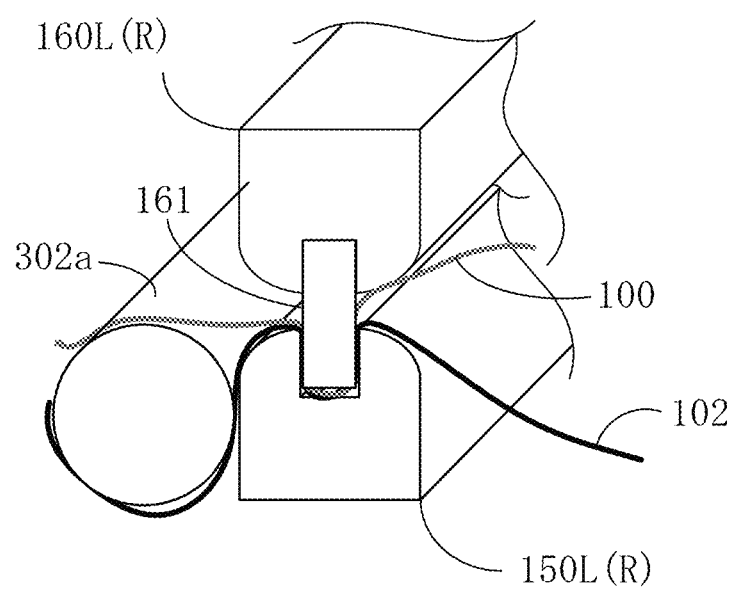
FIG. 73 is a schematic view illustrating a state in which the frame member of the top member and the frame member of the bottom member approach each other.

When the frame member 160L(R) further descends toward the frame member 150L(R) (in the direction of the arrow Z1a) from the state of FIG. 72(B), the pressing member 161 pushes the elastic films 100 and 102 into the recess 150d, and the elastic films 100 and 102 are pressed against the heating wire for welding 151a and the heating wire for cutting 151b fixed to the bottom face 150da of the recess 150d (see FIG. 73). In the state illustrated in FIG. 73, the elastic films 100 and 102 are welded and cut in the shape of the user's hand (strictly speaking, a shape similar to that of a hand).

Figure 76:
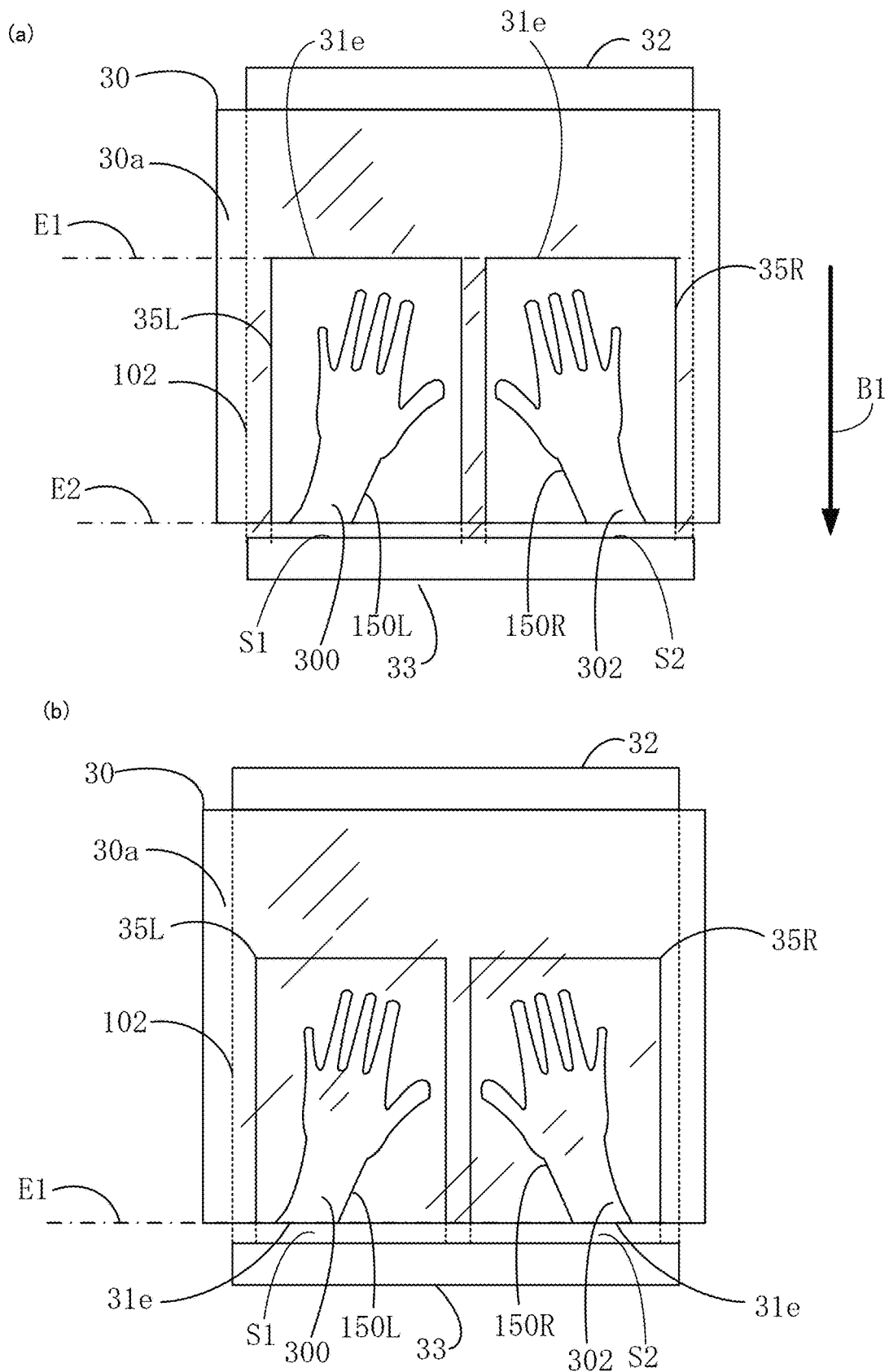
FIG. 76 is a schematic view illustrating an elastic film or the like disposed on a bottom member.

The state in which the elastic films 100 and 102 are disposed in the apparatus 1J will be described with reference to FIGS. 74 to 76. When the user produces and puts on the glove, as illustrated in FIG. 74(A), the elastic film 102 is disposed between the film holders 32 and 33 of the bottom member 30 in a state in which the elastic film 102 has a slight tension. In this state, the elastic film 102 also covers the inner portions of the rectangular heating wires for cutting 35L and 35R, and the inner portion of the frame member 150L(150R). The elastic film 100 is arranged in the same manner as the elastic film 102 in the top member 10.

In the state illustrated in FIG. 74(A), between the bottom of the bottom side portion of the rectangular heating wire for cutting 35L(R), which is the end toward the front direction of the bottom member 30 and the film holder 33, the elastic film 102 is not present and spaces S1 and S2 are formed. The same applies to the elastic film 100 disposed on the top member 10. As a result, when the elastic films 100 and 102 are welded and cut to the shape of the user's hand to produce and put on the gloves, the gloves are separated from the portions of the elastic films 100 and 102 not forming the gloves.

Following the state illustrated in FIG. 74(A), the left hand 300 and the right hand 302 of the user are placed inside the frame members 150L and 150R from above the elastic film 102 (see FIG. 74(B)). In the state illustrated in FIG. 74(B), the elastic film 102 is positioned on the palm side of the left hand 300 and the right hand 302. Subsequently, the top member 10 is lowered, and the elastic film 100 is disposed on the back side of the left hand 300 and right hand 302 of the user (see FIG. 75(A)). In FIG. 75(A), the top member 10 is omitted, and only the elastic film 100 is illustrated. The elastic film 100 overlaps with the elastic film 102.

In the state illustrated in FIG. 75(A), the elastic films 100 and 102 are welded into the hand shape and cut. Thereafter, when the top member 10 is raised, gloves are put onto the left hand 300 and the right hand 302 of the user (see FIG. 75(B)). In FIG. 75(B), the elastic films 100 and 102 are cut and welded to the shapes of the left hand 300 and the right hand 302. In addition, the elastic films 100 and 102 are cut into quadrilateral shapes. Focusing attention on the elastic film 102, it is distinguished into a part forming a glove, a part cut into a quadrilateral shape, and a part continuing with other part of the elastic film 102. Parts of the elastic film 100 are similarly distinguished.

In the state of FIG. 75(B), when the left hand 300 and the right hand 302 are removed from the apparatus 1J, gloves are put on the user's hands. When the part of the glove and the part cut into quadrilateral shape are removed, the state illustrated in FIG. 76(A) is obtained. In the state illustrated in FIG. 76(A), the elastic film 102 does not exist inside the rectangular heating wire for cutting 35L(R). The same applies to the top member 10.

When the apparatus 1J is next used, the elastic film 102 is wound in the arrow B1 direction, and the elastic film 102 is placed on the frame members 150L and 150R (see FIG. 76(B)). The same applies to the top member 10. When gloves were produced and put on the previous time, the elastic films 100 and 102 were not completely cut in the direction perpendicular to the winding direction, but the portions where the rectangular heating wire for cutting 35L(R) does not exist (that is, the uncut portions), of the elastic films 100 and 102 remain and maintain the connection with the film holder 33 (to be precise, the rotation axis), so that for the next use of the apparatus 1J, it is possible to wind the elastic films 100 and 102 in the direction of the arrow B1.

When the elastic film 102 is wound in the direction of the arrow B1 in the next use of the apparatus 1J, a portion of the back end side boundary line E1 of the rectangular heating wires for cutting 35L and 35R (FIG. 76(A)) is controlled so as to move to the position of the front side boundary line E2 of the bottom member 30 (see FIG. 76(B)). In other words, the side constituting the top end (E1) during the previous time of glove producing and putting on is configured to be disposed at the bottom end (E2) position at this time of glove producing and putting on and to allow the elastic film 100 and the elastic film 102 to be wound up. As a result, the elastic film 102 covers the frame member 150L(R) and forms the spaces S1 and S2. The same applies to the top member 10.

As illustrated in FIG. 77, the apparatus 1J includes frame members 150L(R) having a plurality of sizes. Specifically, a large-sized frame member 150LL (see FIG. 77(A)), a medium-sized frame member 150LM (see FIG. 77(B)), and a small-sized frame member 150LS (see FIG. 77(C)). In FIG. 77, only the frame member 150L is illustrated, but the same applies to the frame member 150R, and the same applies to the frame member 160L(R) disposed on the top member 10. In addition, in FIG. 77, the outline of the frame member is illustrated, and the shape of the top face, the recess, the heating wire for welding, and the heating wire for cutting are omitted.

The frame members 150LL, 150LM and 150LS have the same outer diameter HH1 and the same outer width HW1. However, the inner shape is the largest in the frame member 150LL, the frame member 150LM is the next largest, and the frame member 150LS is the smallest. For example, the wrist portion width HW2b of the frame member 150LM is smaller than the wrist portion width HW2a of the frame member 150LL, and the wrist portion width HW2c of the frame member 150LS is smaller than the wrist portion width HW2b. That is, since the frame members 150L(R) of a plurality of sizes have the same outer diameter, the positions of the pair of connecting portions 153 are also common. The connecting portion 153 is a metallic protruding portion in which a screw hole is formed. Therefore, one screw hole of the bottom member 30 may be used. The frame members 150LL, 150LM and 150LS are fixed to the bottom member 30 by screwing the male screw into the screw hole of the connecting portion 153 and the screw hole of the bottom member 30. This configuration also applies to the frame member of the top member 10.

Nineteenth Embodiment

Differences from the eighteenth embodiment will be described with respect to the nineteenth embodiment. As illustrated in FIG. 78, in the nineteenth embodiment, the widths of the outer diameters of the frame members 150LL, 150LM and 150LS also differ according to the inner shape. That is, the outer shape (length HH1 and width HW1) of the frame member 150LL is the largest, the outer shape (length HH2 and width HW2) of the frame member 150LM is next largest, and the outer shape (length HH3 and width HW3) of the frame member 150LS is the smallest. Then, the frame thickness (HW1−HW2a)/2 of the frame member 150LL, the frame thickness (HW2−HW2b)/2 of the frame member 150LM, and the frame thickness (HW3−HW2c)/2 of the frame member 150LS are equal. Connecting portions 153a, 153b, and 153c having different lengths are connected to the frame members 150LL, 150LM and 150LS, respectively. When the length of the connecting portion 153a is Lk1, the length of the connecting portion 153b is Lk2, and the length of the connecting portion 153c is Lk3, Lk1<Lk2<Lk3. Although the outer shapes of the frame members 150LL, 150LM, and 150LS are different, by defining the lengths of the connecting portions 153a, 153b, and 153c as described above, the position of the screw hole of the connecting portions 153a, 153b and 153c does not change with respect to the bottom member 30. The frame members 150LL, 150LM and 150LS can then be fixed to the bottom member 30 even if the screw member of the bottom member 30 is one set. Unlike the present embodiment, the frame thicknesses of the frame members 150LL, 150LM, and 150LS may be made different, for example, such that the frame member 150LL becomes the thickest, and in this case, the lengths Lk1, Lk2, and Lk3 of the connecting portions 153a, 153b and 153c are adjusted so that the position of the screw holes of the connecting portions 153a, 153b and 153c does not change with respect to the bottom member 30.

Twentieth Embodiment

A twentieth embodiment will be described with reference to FIGS. 79 to 81. Note that description of matters common with the eighteenth embodiment is omitted.

As illustrated in FIG. 79, the rectangular heating wires for cutting 35L and 35R are formed in a trapezoidal shape in which the side on the far side (film holder 32 side) is longer than the side on the near side (film holder 33 side). In other words, in the winding direction of the elastic film 100 and the elastic film 102, the rectangular heating wires for cutting 35L and 35R are formed in a trapezoidal shape in which the side constituting the top end is longer than the side constituting the bottom end, so as to cut the elastic film 100 and the elastic film 102. That is, the width L1 on the fingertip side is longer than the width L2 on the wrist side. Note that the rectangular heating wires for cutting 35L and 35R themselves do not exist on the side on the near side (see FIG. 79(B)).

As illustrated in FIG. 80, the rectangular pressing members 11L and 11R disposed on the bottom face 10d of the top member 10 are also configured in a trapezoidal shape. Note that the rectangular pressing members 11L and 11R themselves are not present on the side on the near side (see FIG. 80(B)).

When the user completes the production and putting on of the gloves, the top face 30a of the bottom member 30 assumes the state illustrated in FIG. 81(A). When the elastic film 102 is pulled in the direction of the arrow B1 in this state, a force shrinking toward the inside indicated by arrows V1 and V2 acts upon the far end (the portion located in the imaginary straight line E1) of the shape cut into rectangular. In this respect, since the side on the far side of the elastic film 102 is cut into a trapezoidal shape having a side longer than the side on the far side, even if the side on the back side is contracted by pulling toward the near side, the elastic film 102 has the same length as the length of the side on the near side (see FIG. 81(B)). Through this, the elastic film 102 does not exist at the end 31e of the portion where the wrists of the left hand 300 and the right hand 302 are located. This also applies to the top member 10.

Twenty-first Embodiment

Figure 82:
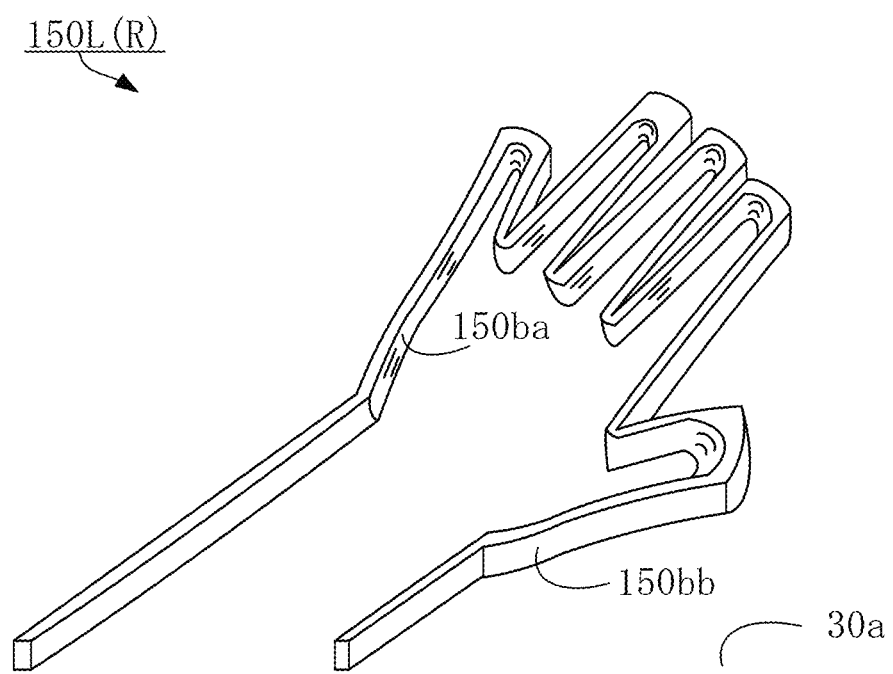
FIG. 82 is a schematic view illustrating a frame member according to a twenty-first embodiment.

A twenty-first embodiment will be described with reference to FIG. 82. Note that description of matters common with the twentieth embodiment is omitted.

In the twenty-first embodiment, the inner vertical wall of the frame member 150L(R) is formed in a curved surface according to the shape of the user's hand. In other words, in the frame member 150L(R), the shape of the portion in contact with a user's hand is configured to match the shape of the hand of the individual user. The frame member 160L(R) is configured similarly. For example, as illustrated in FIG. 82, in the frame member 150L(R) of the bottom member, the outer wall 150bb is perpendicular to the top face 30a, but the inner side face 150ba is formed with a curved surface in the shape of the user's hand. This also applies to the frame member 160L(R) of the top member 10. As a result, it is possible to produce and put on gloves that more closely match the shape of the user's hand.

It is to be noted that the apparatus for producing and putting on gloves of the present invention is not limited to the above embodiments, and various modifications can be made without departing from the gist of the present invention. For example, in the third embodiment, both the elastic film 100 and the elastic film 102 may be formed of a heat shrinkable film. By making the elastic resilience of the elastic film 100 greater than the elastic resilience of the elastic film 102 or by forming the thermal shrinkage of the elastic film 100 greater than the thermal shrinkage of the elastic film 102, it is possible to obtain the effect that the connecting portion S moves to the back side of the finger. Further, it is not limited to a heating wire used as means for cutting the elastic film 100 and the elastic film 102 into the shape of a hand, means for cutting in a straight line (refer to the heating wire for cutting 44 in FIG. 4) and/or means for cutting in a rectangular shape; other means such as a sharp blade like member such as a blade of a utility knife, a laser irradiation device for irradiating a laser, or an ultrasonic irradiation device for irradiating ultrasonic wave may also be used. In addition, the means for welding the elastic film 100 and the elastic film 102 into the shape of the hand is not limited to the heating wire; other means such as a laser irradiation device or an ultrasonic irradiation device may be used. Further, the "gloves" of the present invention may be changed to a "whole body suit" and, for example, a "whole body suit" for wrapping the body other than the head, the wrist, and the ankle may be produced and put on. Further, the "gloves" of the present invention may be changed to "socks", for example, "socks" wrapping the foot below the ankle may be produced and putting on. Alternatively, each embodiment can be combined as long as no technical inconsistency occurs.

REFERENCES SIGNS LIST 1, 1A, 1B, 1C, 1D, 1E, 1F, 1G, 1H, 1I, 1J Apparatus for producing and putting on gloves
10, 76 Top member
10e, 30d Inclined grooves
10f, 30e Spring member
10g, 30f Groove
11L, 11R Rectangular pressing member
12, 32, 53, 66 Film holder 14 Film fixing part
16 Display device
18, 74 Guide
20, 36 Depression (hand holding portion)
21L, 21R, 37L, 37R Hand holding portion
22 Projection
24, 46 Slip-preventing member
25, 35 Projecting member
26 Air intake port
28 Heat generation member
30, 60 Bottom member
31 Second depression
34 Film fixing part
35L, 35R Rectangular heating wire for cutting
38 Welding and cutting unit
38a Heating wire for welding
38b Heating wire for cutting
38c Groove
38d Heating wire for welding and cutting
38f Heat resistant mat
39 Pressure sensor
40 Operation switch
42a Contact sensor
42b Contact sensitive member
44 Heating wire for cutting
50 Substrate member
51L Left side member
51R Right side member
52 Pivoting member
53 Film holder
62L, 62R Depression
64 Switch
66 Film holder
68 Plate member
70 Power switch
72 Foreign substance sensor
80 Rotating column
81 Expandable member
90 Infrared projector
92 Infrared receiver
100, 102, 250 Elastic film
150L, 150R, 160L, 160R Frame member
151A Heating wire for welding
151B Heating wire for cutting
161 Pressing member
300 Left hand
302 Right hand
381 Wall
400 Glove

EXPLANATION IN DRAWING

Figure 9:
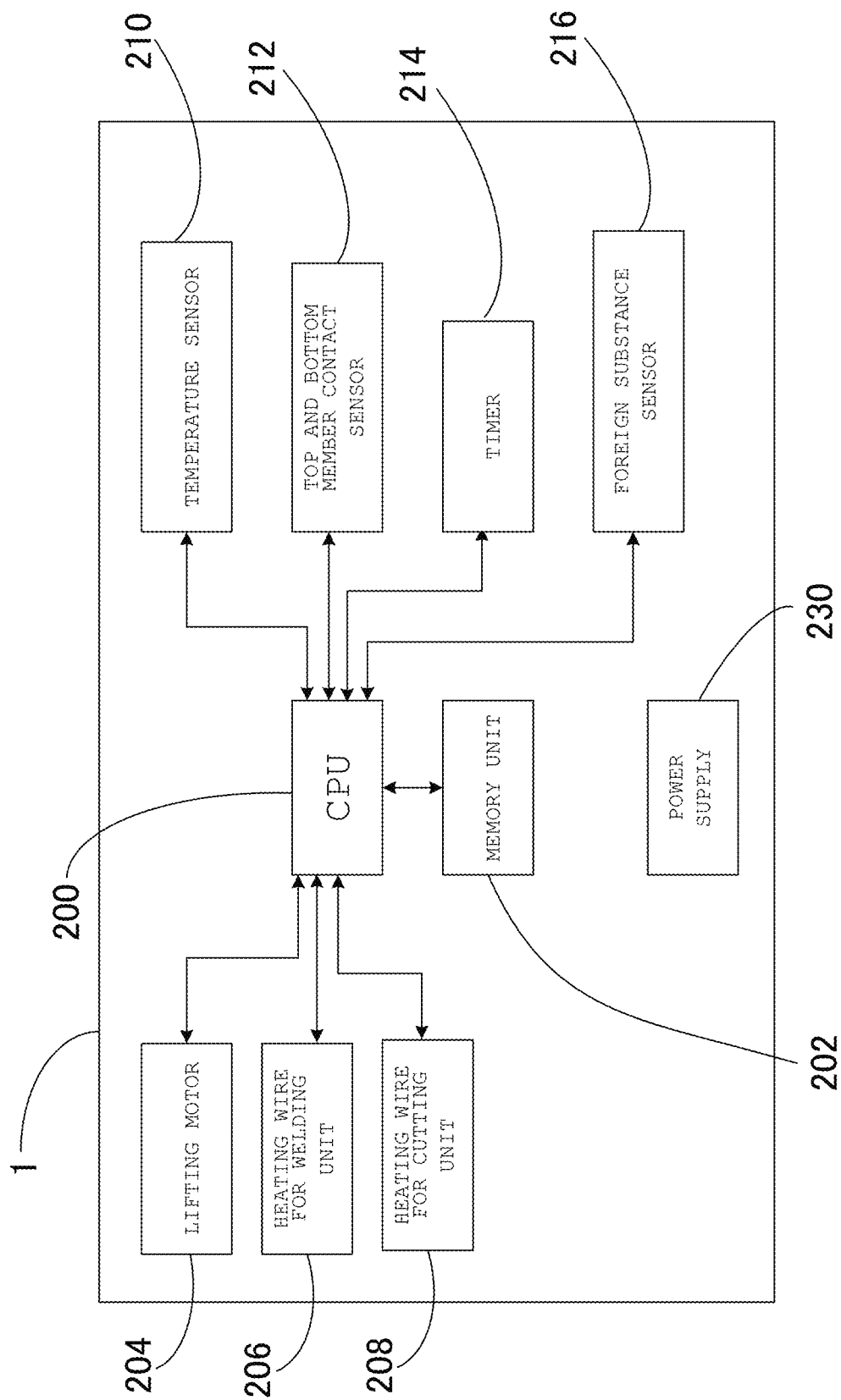
FIG. 9 is a schematic block diagram of a functional configuration of the apparatus for producing and putting on gloves.

FIG. 9
202: MEMORY UNIT
204: LIFTING MOTOR
206: HEATING WIRE FOR WELDING UNIT
208: HEATING WIRE FOR CUTTING UNIT
210: TEMPERATURE SENSOR
212: TOP AND BOTTOM MEMBER CONTACT SENSOR
214: TIMER
216: FOREIGN SUBSTANCE SENSOR
230: POWER SUPPLY
FIG. 25
Start
ST1: ARRANGE UPPER AND LOWER ELASTIC FILMS
ST2: PLACE BOTH HANDS
ST3: LOWER ELASTIC FILM IS TRANSFORMED
ST4: MOVE TOP MEMBER DOWNWARD
ST5: UPPER ELASTIC FILM MAKES CONTACT WITH HANDS
ST6: UPPER ELASTIC FILM IS TRANSFORMED
ST7: TOP AND BOTTOM MEMBERS MAKE CONTACT WITH EACH OTHER
ST8: HEAT BY HEATING WIRE FOR WELDING AND HEATING WIRE FOR CUTTING
ST9: HAS PREDETERMINED TIME ELAPSED?
ST10: MOVE TOP MEMBER UPWARD
FIG. 26
ST11: UPPER AND LOWER ELASTIC FILMS MAKE CONTRACT WITH EACH OTHER
ST12: UPPER AND LOWER ELASTIC FILMS ADHERE TO BOTH HANDS
ST13: PRODUCTION AND PUTTING ON GLOVES COMPLETE END
FIG. 31
202: MEMORY UNIT
204: LIFTING MOTOR
206: HEATING WIRE FOR WELDING UNIT
208: HEATING WIRE FOR CUTTING UNIT
210: TEMPERATURE SENSOR
212: TOP AND BOTTOM MEMBER CONTACT SENSOR
214: TIMER
216: FOREIGN SUBSTANCE SENSOR
218: AIR BLOWING MOTOR
220: AIR HEATER
230: POWER SUPPLY
FIG. 32
ST101: BLOW HEATED AIR
ST102: UPPER ELASTIC FILM THERMALLY CONTRACTS
ST103: MOVE WELDING PART UPWARD
ST12: UPPER AND LOWER ELASTIC FILMS ADHERE TO BOTH HANDS
ST13: PRODUCTION AND PUTTING ON GLOVES COMPLETE
End
FIG. 41
Start
ST1: ARRANGE UPPER AND LOWER ELASTIC FILMS
ST2: PLACE BOTH HANDS
ST3: LOWER ELASTIC FILM IS TRANSFORMED
ST4: MOVE TOP MEMBER DOWNWARD
ST5: UPPER ELASTIC FILM MAKES CONTACT WITH HANDS
ST6: UPPER ELASTIC FILM IS TRANSFORMED
ST7: TOP AND BOTTOM MEMBERS MAKE CONTACT WITH EACH OTHER
ST8A: HEAT BY HEATING WIRE FOR WELDING
ST9: HAS PREDETERMINED TIME ELAPSED?
ST10: MOVE TOP MEMBER UPWARD
FIG. 46
202: MEMORY UNIT
204: LIFTING MOTOR
206: HEATING WIRE FOR WELDING UNIT
208: HEATING WIRE FOR CUTTING UNIT
210: TEMPERATURE SENSOR
212: TOP AND BOTTOM MEMBER CONTACT SENSOR
214: TIMER
216: FOREIGN SUBSTANCE SENSOR
222: PRESSURE SENSOR UNIT
224: INTERPOSAL DETECTION UNIT
230: POWER SUPPLY
FIG. 58
202: MEMORY UNIT 204: LIFTING MOTOR
206: HEATING WIRE FOR WELDING UNIT
208: HEATING WIRE FOR CUTTING UNIT
210: TEMPERATURE SENSOR
212: TOP AND BOTTOM MEMBER CONTACT SENSOR
214: TIMER
216: FOREIGN SUBSTANCE SENSOR
226: PROJECTION DETECTION UNIT
230: POWER SUPPLY

[Document Type] Drawings
FIG. 1
FIG. 2
FIG. 3
FIG. 4
FIG. 5
FIG. 6
FIG. 7
FIG. 8
FIG. 9
FIG. 10
FIG. 11
FIG. 12
FIG. 13
FIG. 14
FIG. 15
FIG. 16
FIG. 17
FIG. 18
FIG. 19
FIG. 20
FIG. 21
FIG. 22
FIG. 23
FIG. 24
FIG. 25
FIG. 26
FIG. 27
FIG. 28
FIG. 29
FIG. 30
FIG. 31
FIG. 32
FIG. 33
FIG. 34
FIG. 35
FIG. 36
FIG. 37
FIG. 38
FIG. 39
FIG. 40
FIG. 41
FIG. 42
FIG. 43
FIG. 44
FIG. 45
FIG. 46
FIG. 47
FIG. 48
FIG. 49
FIG. 50
FIG. 51
FIG. 52
FIG. 53
FIG. 54
FIG. 55
FIG. 56
FIG. 57
FIG. 58
FIG. 59
FIG. 60
FIG. 61
FIG. 62
FIG. 63
FIG. 64
FIG. 65
FIG. 66
FIG. 67
FIG. 68
FIG. 69
FIG. 70
FIG. 71
FIG. 72
FIG. 73
FIG. 74
FIG. 75
FIG. 76
FIG. 77
FIG. 78
FIG. 79
FIG. 80
FIG. 81
FIG. 82

The invention claimed is:

1. An apparatus for producing and putting on a glove, comprising: a welding and cutting unit for welding and cutting a first elastic film and a second elastic film at a position on an outer side of a contour of a user's hand in a state in which the user's hand is sandwiched between the first elastic film and the second elastic film, wherein the welding and cutting unit includes a first heating wire for cutting and welding, or a second heating wire for welding and a third heating wire for cutting, wherein the first heating wire generates heat in a first temperature range from 40 degrees Celsius to 150 degrees Celsius, and wherein the second heating wire generates heat in a second temperature range from 40 degrees Celsius to 110 degrees Celsius and the third heating wire generates heat in a third temperature range from 60 degrees Celsius to 150 degrees Celsius.

2. The apparatus for producing and putting on glove according to claim 1 further comprising a first member on which the first elastic film is arranged and a second member on which the second elastic film is arranged and wherein the welding and cutting unit comprising:

a welding member for welding the first elastic film and the second elastic film at a first outer side position that is a position on the outer side of the contour of the user's hand in a state where the hand is sandwiched between the first elastic film and the second elastic film; and a cutting member for cutting the first elastic film and the second elastic film at a second outer side position that is a position further on the outer side than the first outer side position;

a first hand holding portion that can house a portion on a back side of the hand is formed in the first member;

a second hand holding portion that can house a portion on a palm side is formed in the second member; and a face on the back side of the hand makes contact with the first elastic film, a face on the palm side makes contact with the second elastic film, and the hand is housed in a space formed by the first hand holding portion and the second hand holding portion in a state where the hand is sandwiched between the first member and the second member, wherein the first hand holding portion is a space formed by a first frame member in an outline shape of the hand and a face of the first member and the second hand holding portion is a space formed by a second frame member in an outline shape of the hand and the face of the second member.

3. The apparatus for producing and putting on glove according to claim 2, wherein the first frame member and the second frame member are configured so as to be closest to a position having a predetermined distance from the user's hand when the first frame member and the second frame member approach to each other.

4. The apparatus for producing and putting on glove according to claim 2, wherein the welding and cutting unit is fixed to a recess formed on the second frame member and a pressing member for pressing the welding and cutting unit is disposed inserted in the recess on the second frame member.

5. The apparatus for producing and putting on a glove according to claim 1, wherein:
the welding and cutting unit, in a state where the user's hand is sandwiched between the first elastic film and the second elastic film, at a location outside of an outline of the hand, is configured to weld and cut the first elastic film and the second elastic film similar in shape to the user's hand;
the welding and cutting unit is provided with outside cutting member for cutting the first elastic film and the second elastic film into a quadrilateral shape outside a portion where the first elastic film and the second elastic film are welded and cut; and
the outside cutting member is configured to perform cutting in a direction perpendicular to a winding direction in which the first elastic film and the second elastic film are wound so that both ends and a center portion of the elastic film and the second elastic film are left.

6. The apparatus for producing and putting on a glove according to claim 5, wherein in the winding direction of the first elastic film and the second elastic film, the first elastic film and the second elastic film are wound up so that a side forming a top end of a previous cut portion cut into the quadrilateral shape when a previous glove was produced and put on is positioned at a bottom end of a current cut portion cut into the quadrilateral shape when a current glove is produced and put on.

7. The apparatus for producing and putting on a glove according to claim 6, wherein the outer side cutting member is configured to cut the first elastic film and second elastic film so that the side forming the top end is longer than the side forming the bottom end in the winding direction of the first elastic film and the second elastic film.

8. The apparatus for producing and putting on a glove according to claim 2, wherein a portion coming into contact with the user's hand in the first frame member and the second frame member is formed in a manner that the portion assigned with a shape of an individual user's hand.

9. The apparatus for producing and putting on a glove according to claim 2, wherein the welding and cutting unit is disposed at a bottom of a groove formed on the first member or the second member or the welding and cutting unit is disposed at substantially a same height as a surface of at a side of the both members facing on either the first member or the second member.

10. The apparatus for producing and putting on a glove according to claim 2, comprising a stretching unit for stretching the first elastic film and the second elastic film prior to welding and cutting the first elastic film and the second elastic film by the welding and cutting unit.

11. The apparatus for producing and putting on a glove according to claim 2, comprising an adjustment mechanism for adjusting shapes of the first hand holding portion and the second hand holding portion according to the shape of the user's hand.

12. The apparatus for producing and putting on a glove according to claim 2, wherein the welding and cutting unit is a thin plate-like electric heating member.

13. The apparatus for producing and putting on a glove according to claim 2, comprising a first emergency response unit which detects pressure due to the user's hand touching the welding and cutting unit and executes a first emergency operation to maintain user's safety.

14. The apparatus for producing and putting on a glove according to claim 13, comprising a second emergency response unit which detects that the user's hand is sandwiched between the first member and the second member at a position other than the first hand holding portion and the second hand holding portion and executes a second emergency operation to maintain the user's safety.

15. The apparatus for producing and putting on glove according to claim 14, comprising a third emergency response unit which detects if the user's hand is properly held in the first hand holding portion and/or the second hand holding portion and executes a third emergency operation to maintain the user's safety.

16. The apparatus for producing and putting on a glove according to claim 1, comprising a pressing member for pressing the first elastic film and the second elastic film in a pressurized state where the first elastic film and the second elastic film are welded and cut, wherein, when the pressing member releases the pressurized state, elastic resilience acts on the first elastic film and the second elastic film so that the first elastic film and the second elastic film are transformed so as to adhere to the user's hand.

17. The apparatus for producing and putting on a glove according to claim 1, comprising: a heat generation member for heating air; and
an air blowing device for blowing the air heated by the heat generation member,
wherein the first elastic film and the second elastic film are heat shrinkable.

18. The apparatus for producing and putting on a glove according to claim 1, wherein a welding part of the first elastic film and the second elastic film is continuously positioned with a cutting part of the first elastic film and the second elastic film.

19. The apparatus for producing and putting on a glove according to claim 1, wherein the second heating wire for welding has a width wider than that of the third heating wire for cutting.

* * * * *